United States Patent
Okubo et al.

(10) Patent No.: US 6,969,183 B2
(45) Date of Patent: Nov. 29, 2005

(54) DIGITAL LIGHTING APPARATUS FOR VEHICLE, CONTROLLER FOR DIGITAL LIGHTING APPARATUS, AND CONTROL PROGRAM FOR DIGITAL LIGHTING APPARATUS

(75) Inventors: Yasuhiro Okubo, Isehara (JP); Seiji Hayashi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 111 days.

(21) Appl. No.: 10/744,132

(22) Filed: Dec. 24, 2003

(65) Prior Publication Data

US 2004/0218401 A1    Nov. 4, 2004

(30) Foreign Application Priority Data

| Dec. 27, 2002 | (JP) | 2002-382299 |
| Dec. 27, 2002 | (JP) | 2002-382300 |
| Dec. 27, 2002 | (JP) | 2002-382301 |
| Dec. 27, 2002 | (JP) | 2002-382302 |
| Dec. 27, 2002 | (JP) | 2002-382303 |
| Dec. 27, 2002 | (JP) | 2002-382304 |
| Dec. 27, 2002 | (JP) | 2002-382305 |
| Dec. 27, 2002 | (JP) | 2002-382306 |

(51) Int. Cl.[7] .............. G05F 1/00; F21V 9/00; G06F 7/00
(52) U.S. Cl. ............. 362/466; 362/465; 362/464; 362/283; 362/324; 359/290; 359/291; 359/292; 359/295; 701/36; 340/825; 315/295
(58) Field of Search ............... 362/466, 464, 362/465, 283, 284, 324, 276; 359/290, 291, 359/292, 295; 701/36; 340/825; 315/295

(56) References Cited

U.S. PATENT DOCUMENTS

| 5,526,951 A | 6/1996 | Bailey et al. |
| 5,938,319 A | 8/1999 | Hege |
| 6,527,425 B1 | 3/2003 | Nakata |
| 6,717,376 B2 * | 4/2004 | Lys et al. ............... 315/292 |
| 6,897,624 B2 * | 5/2005 | Lys et al. ............... 315/297 |

FOREIGN PATENT DOCUMENTS

| DE | 195 30 008 A1 | 2/1997 |
| JP | 8-201708 A | 8/1996 |
| JP | 9-104288 A | 4/1997 |
| JP | 11-231234 A | 8/1999 |
| JP | 2001-35215 A | 2/2001 |

* cited by examiner

*Primary Examiner*—Thomas M. Sember
*Assistant Examiner*—James W Cranson, Jr.
(74) *Attorney, Agent, or Firm*—Foley & Lardner LLP

(57) ABSTRACT

A digital lighting apparatus for a vehicle, which employs a reflection digital light deflector, includes a storage unit that stores digital data of a plurality of light distribution patterns and a controller. The controller selects digital data corresponding to a predetermined light distribution pattern from among the digital data stored in the storage unit and controls the reflection digital light deflector, and illuminates a road surface and the like with the predetermined light distribution pattern.

46 Claims, 49 Drawing Sheets

FIG. 12
1. LIGHT DISTRIBUTION DATA FOR GENERAL ROAD, STRAIGHT ROAD, IN HIGH BEAM
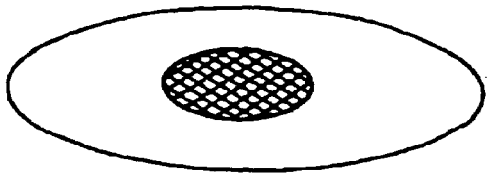
2. LIGHT DISTRIBUTION DATA FOR GENERAL ROAD, STRAIGHT ROAD, IN LOW BEAM
3. LIGHT DISTRIBUTION DATA FOR URBAN DISTRICT, STRAIGHT ROAD, IN LOW BEAM
4. LIGHT DISTRIBUTION DATA FOR HIGHWAY, STRAIGHT ROAD, IN LOW BEAM
5. LIGHT DISTRIBUTION DATA FOR HIGHWAY, CURVED ROAD, IN LOW BEAM

FIG.13

| |
|---|
| 1. LIGHT DISTRIBUTION DATA FOR GENERAL ROAD, STRAIGHT ROAD, IN HIGH BEAM |
| 2. LIGHT DISTRIBUTION DATA FOR GENERAL ROAD, STRAIGHT ROAD, IN LOW BEAM |
| 3. LIGHT DISTRIBUTION DATA FOR URBAN DISTRICT, STRAIGHT ROAD, IN LOW BEAM |
| 4. LIGHT DISTRIBUTION DATA FOR HIGHWAY, STRAIGHT ROAD, IN LOW BEAM |
| 5. LIGHT DISTRIBUTION DATA FOR HIGHWAY, CURVED ROAD, IN LOW BEAM |
| 6. LIGHT DISTRIBUTION DATA FOR HIGHWAY, STRAIGHT ROAD, IN HIGH BEAM |
| 7. LIGHT DISTRIBUTION DATA FOR HIGHWAY, CURVED ROAD, IN HIGH BEAM |
| 8. LIGHT DISTRIBUTION DATA FOR GENERAL ROAD, CURVED ROAD, IN HIGH BEAM |
| 9. LIGHT DISTRIBUTION DATA FOR GENERAL ROAD, CURVED ROAD, IN LOW BEAM |
| 10. LIGHT DISTRIBUTION DATA FOR GENERAL ROAD AND CROSSING |
| 11. LIGHT DISTRIBUTION DATA FOR URBAN DISTRICT, STRAIGHT ROAD, IN HIGH BEAM |
| 12. LIGHT DISTRIBUTION DATA FOR URBAN DISTRICT, CURVED ROAD, IN LOW BEAM |
| 13. LIGHT DISTRIBUTION DATA FOR URBAN DISTRICT, CURVED ROAD, IN HIGH BEAM |
| 14. LIGHT DISTRIBUTION DATA FOR URBAN DISTRICT AND CROSSING |
| ⋮ |

LIGHT DISTRIBUTION PATTERN FOR DAYTIME

LIGHT DISTRIBUTION PATTERN FOR NIGHTTIME

LIGHT DISTRIBUTION PATTERN FOR GENERAL ROAD

LIGHT DISTRIBUTION PATTERN FOR HIGHWAY

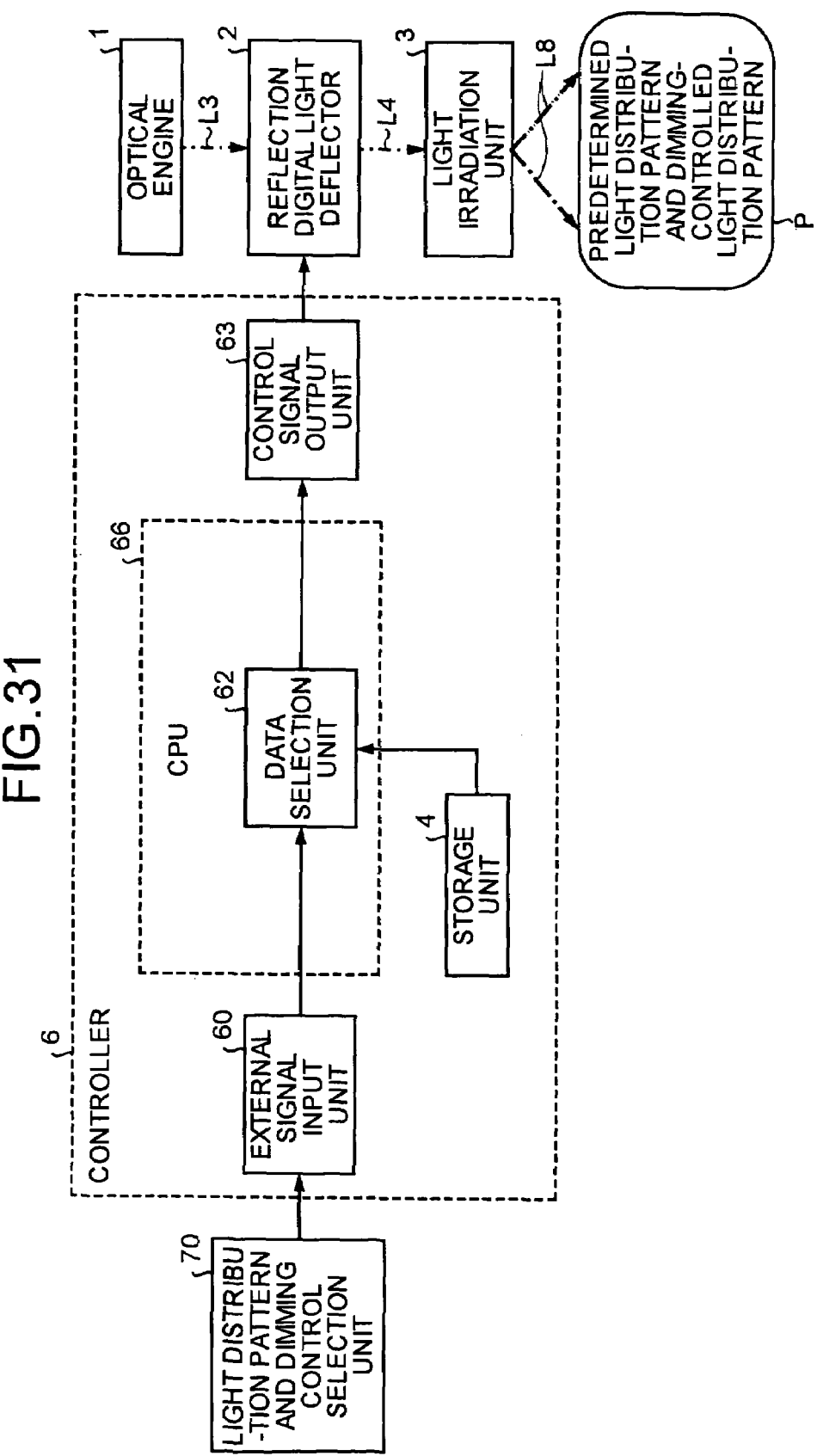

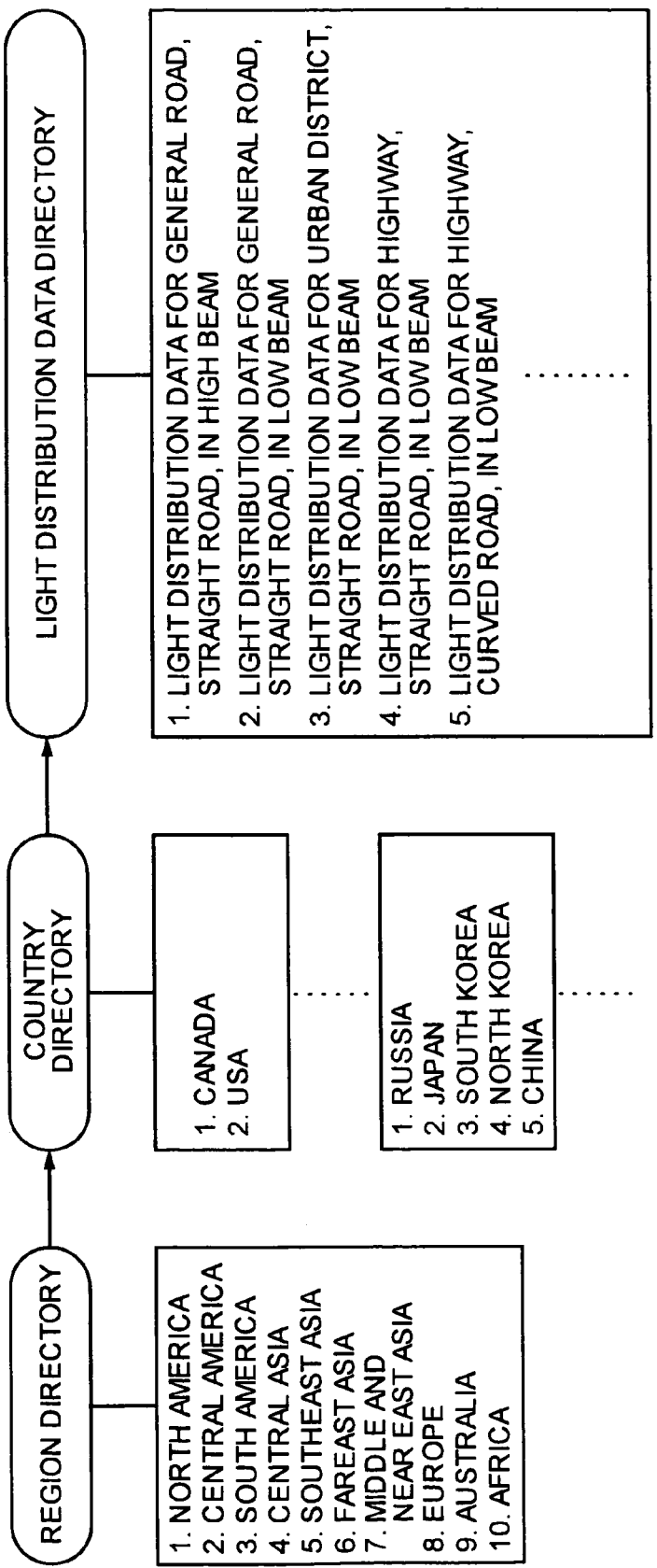

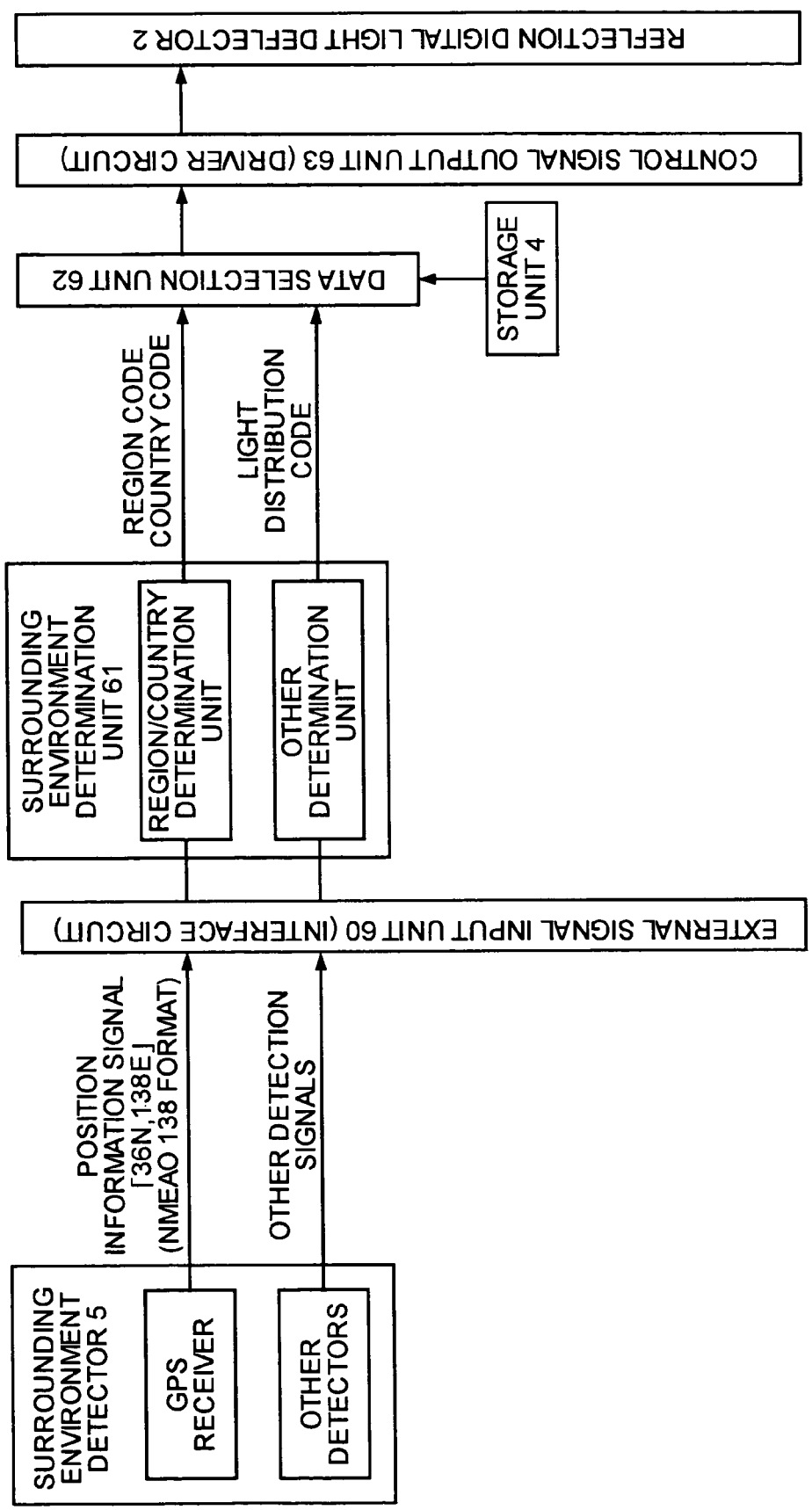

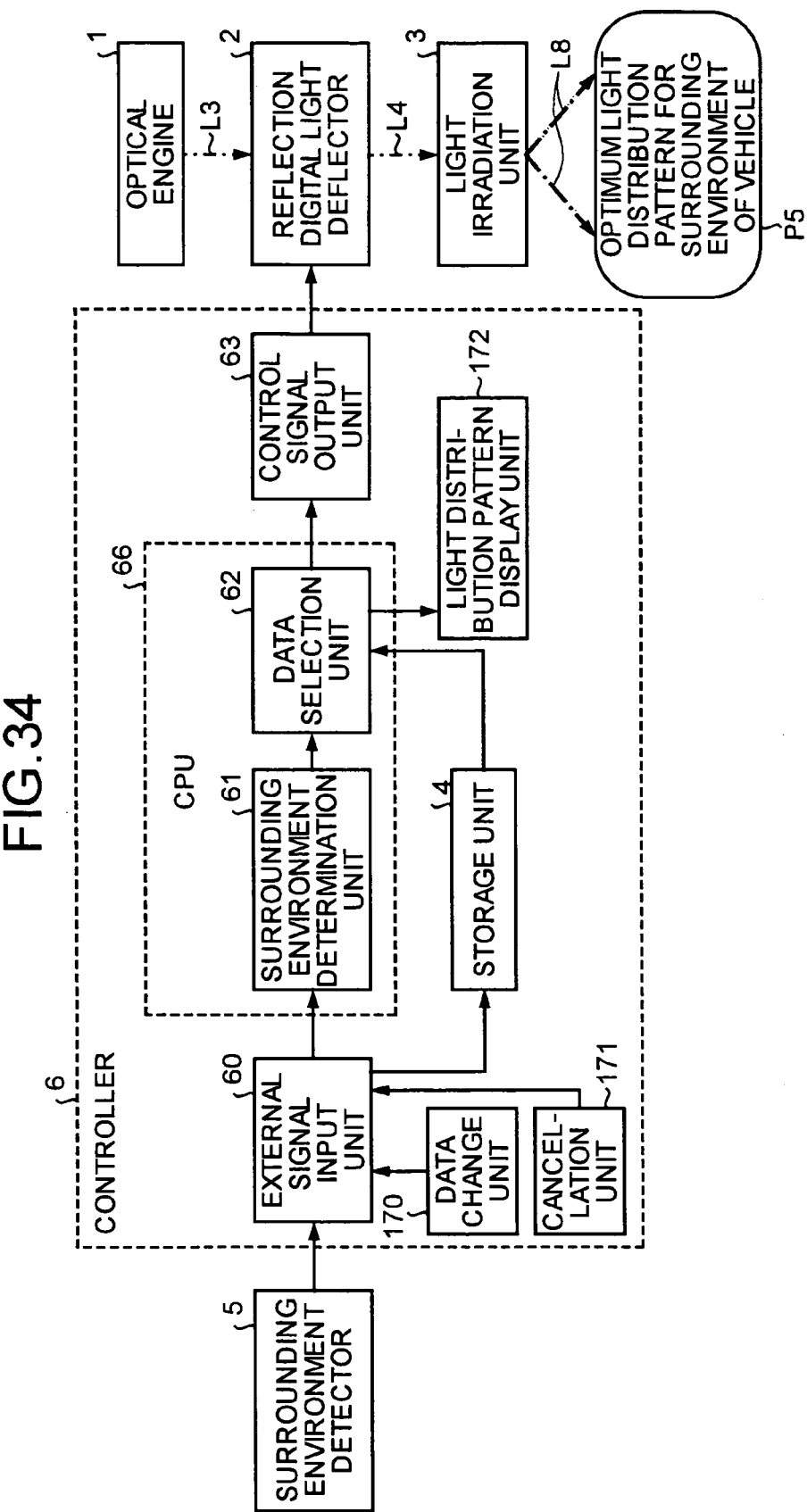

DIGITAL LIGHTING APPARATUS FOR VEHICLE, CONTROLLER FOR DIGITAL LIGHTING APPARATUS, AND CONTROL PROGRAM FOR DIGITAL LIGHTING APPARATUS

BACKGROUND OF THE INVENTION

1) Field of the Invention

The present invention relates to a digital lighting apparatus for a vehicle, a controller for the digital lighting apparatus, and a control program for the digital lighting apparatus.

2) Description of the Related Art

In this specification, "a system including a digital lighting apparatus, a digital lighting apparatus controller, and a control program of the digital lighting apparatus" will be generically referred to as "digital lighting system".

Throughout the whole specification, "a road surface and the like" refers to a road surface, a person (such as a pedestrian), and objects (such as a preceding vehicle, an oncoming vehicle, road signs, and buildings), etc.

Further, "upper", "lower", "left", "right", and "inclined" in the specification refer to directions of "upper", "lower", "left", "right", and "inclined" when the digital lighting system or the digital lighting apparatus is loaded on a vehicle, respectively.

A digital lighting apparatus that illuminates a road surface and the like in a predetermined light distribution pattern using a reflection type digital light deflector is well known. The digital lighting apparatus of this type is disclosed in, for example, Japanese Patent Application Laid-Open No. 9-104288, German Patent Publication No. DE 195 30 008 A1 or U.S. Pat. No. 5,938,319, and U.S. patent Publication No. 5,938,319.

The digital lighting apparatus includes a light source that emits light, a reflector that reflects the light from the light source, and a reflection type light guiding unit that reflects the light from the light source and the reflector. When the light source is turned on, the light emitted from the light source is reflected by the reflector and reflected light is reflected by the reflection type light guiding unit to illuminate the road surface and the like.

However, data for controlling the reflection light guiding device is not at all considered in the conventional digital lighting apparatus. For this reason, the conventional digital lighting apparatus has a disadvantage that a digitally controlled, predetermined light distribution pattern is not obtained for sure.

SUMMARY OF THE INVENTION

It is an object of the present invention to solve at least the problems in the conventional technology.

A digital lighting apparatus according to one aspect of the present invention illuminates a road surface with a predetermined light distribution pattern. The digital lighting apparatus includes an optical engine that includes a light source; a reflection type digital light deflector that has a plurality of micro mirror elements arranged to be respectively tiltable, that digitally switches a tilt angle of each of the micro mirror elements between a first tilt angle and a second tilt angle to switch a reflection direction of a light from the optical engine between a first reflection direction as an ON state and a second reflection direction as an OFF state; a light irradiation unit that irradiates an ON state light reflected from the reflection type digital light deflector on a road surface; a storage unit that stores digital data of a plurality of light distribution patterns; and a controller that selects a specific digital data corresponding to the predetermined light distribution pattern from among the digital data stored in the storage unit based on an input signal, and that digitally switches a tilt angle of each of the micro mirror elements based on the digital data selected.

A controller of a vehicle digital lighting apparatus according to another aspect of the present invention is for illuminating a road surface and the like in an optimum light distribution pattern for a surrounding environment of a vehicle by the vehicle digital lighting apparatus. The vehicle digital lighting apparatus includes an optical engine that includes a light source; a reflection digital light deflector that has a plurality of micro mirror elements respectively arranged to be tiltable, that digitally switches over a tilt angle of each of the micro mirror elements between a first tilt angle and a second tilt angle, and that thereby digitally switches over a reflection direction of a light from the optical engine between an ON or a first reflection direction and an OFF or a second reflection direction; a storage unit that stores pieces of digital data on a plurality of light distribution patterns; a surrounding environment detector that detects the surrounding environment of the vehicle and that outputs a detection signal; and a light irradiation unit that irradiates an ON reflected light emitted from the reflection digital light deflector and having the optimum light distribution pattern for the surrounding environment of the vehicle, on the road surface and the like. The controller comprises an external signal input unit that inputs an external signal such as the selection signal from the surrounding environment detector and that outputs the input external signal as a processing signal; a surrounding environment determination unit that determines the surrounding environment of the vehicle based on the processing signal from the external signal input unit and that outputs a determination signal; a data selection unit that selects the digital data on the optimum light distribution pattern for the surrounding environment of the vehicle from among the pieces of the digital data on the light distribution patterns stored in the storage unit based on the determination signal from the surrounding environment determination unit; and a control signal output unit that outputs a control signal for digitally, individually controlling the switchover of the tilt angle of each of the micro mirror element based on the digital data on the light distribution pattern optimum for the surrounding environment of the vehicle and selected by the data selection unit, to the reflection digital light deflector.

A control program of a vehicle digital lighting apparatus is a computer program for illuminating a road surface and the like in an optimum light distribution pattern for a surrounding environment of a vehicle by the vehicle digital lighting apparatus. The vehicle digital lighting apparatus includes an optical engine that includes a light source; a reflection digital light deflector that has a plurality of micro mirror elements respectively arranged to be tiltable, that digitally switches over a tilt angle of each of the micro mirror elements between a first tilt angle and a second tilt angle, and that thereby digitally switches over a reflection direction of a light from the optical engine between an ON or a first reflection direction and an OFF or a second reflection direction; a light irradiation unit that irradiates an ON reflected light emitted from the reflection digital light deflector and having the optimum light distribution pattern for the surrounding environment of the vehicle, on the road surface and the like; a surrounding environment detector that detects the surrounding environment of the vehicle and that outputs a detection signal; and a storage unit that stores pieces of digital data on a plurality of light distribution patterns. The control program makes a computer execute steps of allowing an external signal input unit to input an external signal such as the selection signal from the surrounding environment detector, and to output the input external signal as a processing signal; allowing a surrounding environment determination unit to determine the surrounding environment of the vehicle based on the processing signal from the external signal input unit, and to output a determination signal; allowing a data selection unit to select the digital data on the optimum light distribution pattern for the surrounding environment of the vehicle from among the pieces of the digital data on the light distribution patterns stored in the storage unit based on the determination signal from the surrounding environment determination unit; and allowing a control signal output unit to output a control signal for digitally, individually controlling switchover of the tilt angle of each of the micro mirror element based on the digital data on the light distribution pattern that is optimum for the surrounding environment of the vehicle and that is selected by the data selection unit, to the reflection digital light deflector.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 12 is a schematic diagram for illustrating light distribution data and corresponding light distribution;

FIG. 13 is a list of a part of the light distribution data;

FIG. 31 is a block diagram of a digital lighting apparatus according the third embodiment;

FIG. 32 is a block diagram for illustrating digital data of region directories, country directories, and light distribution data directories for light distribution patterns of a digital lighting system according to a fourth embodiment of the present invention;

FIG. 33 is a block diagram for illustrating a surrounding environment detector, a surrounding environment determination unit, etc. of the digital lighting system according to the fourth embodiment;

FIG. 34 is a block diagram of a digital lighting system according to a fifth embodiment of the present invention;

FIG. 49 is a schematic diagram for illustrating a state in which both the contrast information and the non-lighting portion are displayed in the predetermine light distribution pattern that illuminates the road surface and the like;

DETAILED DESCRIPTION

Figure 1:
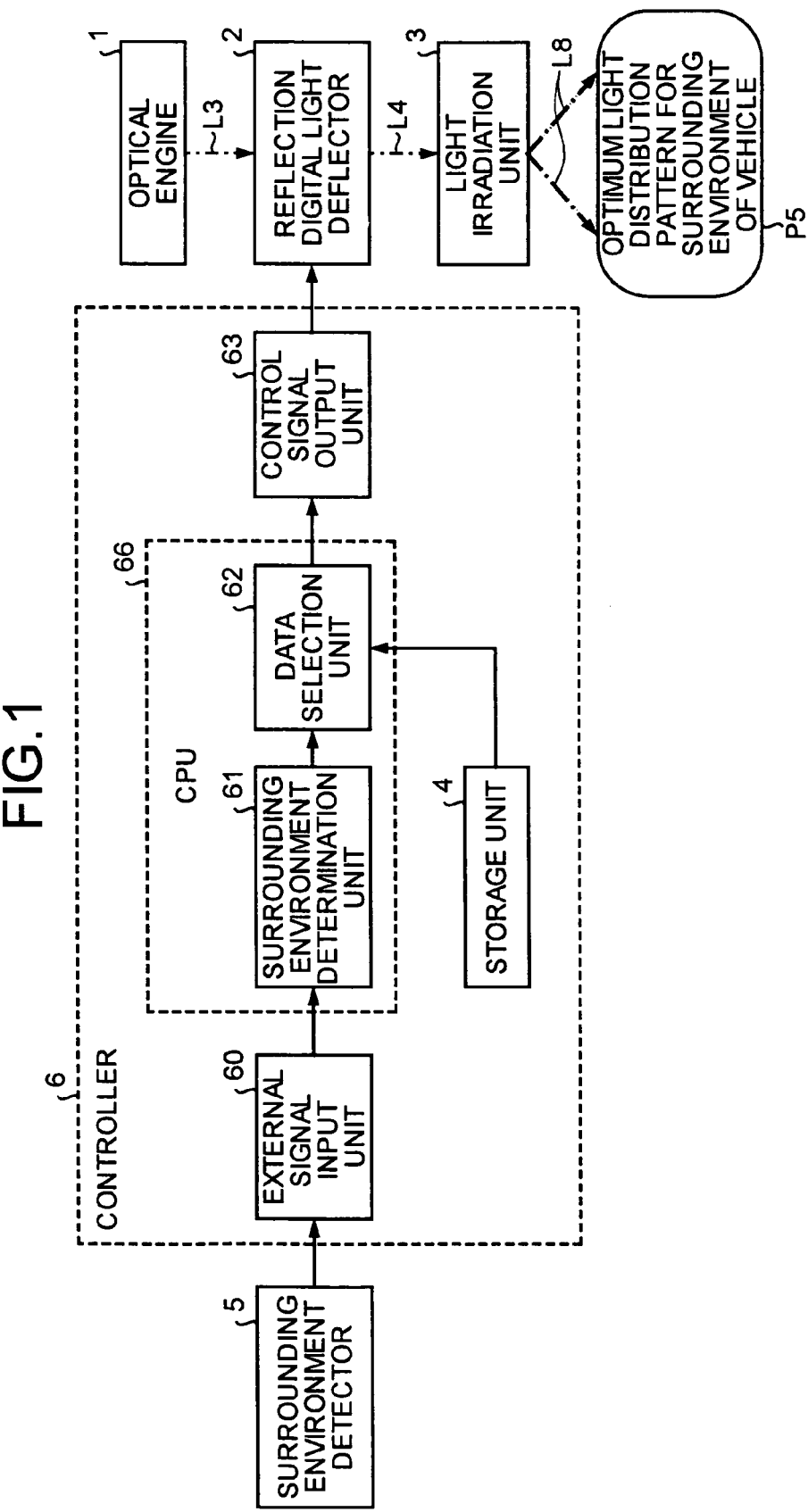
FIG. 1 is a block diagram of a digital lighting system according to a first embodiment of the present invention.

Exemplary embodiments of a digital lighting apparatus for a vehicle, a controller for the digital lighting apparatus, and a control program for the digital lighting apparatus according to the present invention are explained in detail with reference to the accompanying drawings. It should be noted that the present invention is not limited to the embodiments.

FIG. 1 to FIG. 17 are schematic diagrams for illustrating a digital lighting system according to a first embodiment of the present invention. The digital lighting system according to the first embodiment illuminates the road surface and the like in an optimum light distribution pattern P5 for a surrounding environment of a vehicle. According to the first embodiment of the digital lighting system, an instance in which the system is applied to a vehicle headlamp is explained. The symbol "VU-VD" shown in FIG. 2 denotes a vertical line of a screen. The symbol "HL-HR" denotes a horizontal line of the screen.

The digital lighting system according to the first embodiment includes an optical engine 1, a reflection digital light deflector 2, a light irradiation unit 3, a storage unit 4, a surrounding environment detector 5, and a controller 6. Vehicle digital lighting assemblies each of which includes the optical engine 1, the reflection digital light deflector 2, and the light irradiation unit 3 are respectively loaded on a left and a right in a front portion of the vehicle at predetermined intervals.

The optical engine 1 includes a discharge lamp 10 serving as a light source (output of, for example, 35 watts), a reflector 11 reflecting a light L1 emitted from the discharge lamp 10, and a collimator lens 12 emitting a reflected light L2 from the reflector 11 as a parallel light L3.

An inner surface of the reflector 11 is deposited with aluminum or coated with silver to form a reflection surface 13. The reflection surface 13 is formed out of a NURBS (Non-Uniform Rational B-splines) free-form surface (see Japanese Patent Application Laid-Open No. 2001-35215). The reflection surface 13 makes the reflected light L2 incident on an incident surface 14 of the collimator lens 12 in a luminous intensity distribution (light distribution) shown in FIG. 3 and FIG. 4. The luminous intensity distribution shown in FIG. 3 and FIG. 4 has a high luminous intensity (illuminance) at a center and a low luminous intensity (illuminance) at a circumference. Therefore, the luminous intensity distribution of the light incident on the incident surface 14 of the collimator lens 12 coincides with the luminous intensity distribution (light distribution) of a vehicle illumination, i.e., a luminous intensity distribution having a high luminous intensity (illuminance) at a center and a low luminous intensity (illuminance) at a circumference. The light L1 emitted from the discharge lamp 10 can be thereby effectively used.

The reflection type digital light deflector 2 (see Japanese Patent Application Laid-Open Nos. 8-201708 and 11-231234) is referred to as "a micro mirror element group digital drive", "a reflection optical modulator", "spatial light modulator", "an optical information processor", "an optical switch", or the like.

The reflection type digital light deflector 2 includes a complementary metal-oxide semiconductor (CMOS) substrate (for a Static random access memory (SRAM) semiconductor) 20, a conductor 21 arranged on the CMOS substrate 20, a yoke 23 arranged on the conductor 21 through a torsion hinge 22 so as to be tiltable, and a micro mirror element 25 supported by the yoke 23 through a post 24. Namely, the reflection type digital light deflector 2 includes a mechanical function, an optical function, and an electric function integrated on one semiconductor chip. The CMOS substrate 20, which serves as a drive section, includes an address transistor. The yoke 23, which serves as a movable section, includes a landing chip (spring chip, or a bouncing chip) 27.

The reflection type digital light deflector 2 has many micro mirror elements 25 arranged in a tiltable manner. The number of the micro mirror elements 25 is, for example, 720×480=345,600, 800×600=480,000, 1,024×768=786,432, 1,280×1,024=1,310,720, or an arbitrary number.

The reflection type digital light deflector 2 digitally switches over a tilt angle of each micro mirror element 25 between a first tilt angle and a second tilt angle and thereby digitally switches over a reflection direction of the parallel light L3 from the collimator lens 12 of the optical engine 1 between ON or a first reflection direction and OFF or a second reflection direction. The reflection type digital light deflector 2 performs a so-called high-speed light switching operation. A state of an orientation of each micro mirror element 25 will be explained in detail with reference to FIG. 8.

If the micro mirror element 25 is turned off, the element 25 is in a horizontal state (neutral state) referred to as "horizontal state" as indicated by a dotted line. If the element 25 is turned on, the element 25 tilts from the horizontal state to a state (ON-state) indicated by a solid line or to a state (OFF-state) indicated by a one-dot chain line by an electrostatic attracting force, depending on an output of the CMOS substrate 20 to an address memory.

The ON-state of the micro mirror element 25 indicated by the solid line is a state in which the micro mirror element 25 tilts at the first tilt angle +θ (e.g., +10 degrees or +12 degrees) against the horizontal state. The micro mirror element 25 in this ON-state reflects the light L3 from the optical engine 1 in the ON or first reflection direction indicated by a solid-line arrow. A reflected light L4 indicated by this solid-line arrow is reflected at an angle 2θ against the incident light L3 toward the light irradiation unit 3 to thereby illuminate the road surface and the like. The reflected light L4 is an ON reflected light from the reflection type digital light deflector 2.

The OFF-state of the micro mirror element 25 indicated by the one-dot chain line is a state in which the micro mirror element 25 tilts at the second tilt angle −θ (e.g., −10 degrees or −12 degrees) against the horizontal state. The micro mirror element 25 in this OFF-state reflects the light L3 from the optical engine 1 in the OFF or second reflection direction indicated by a one-dot-chain-line arrow. A reflected light L5 indicated by the one-dot-chain-line arrow is reflected at an angle 6θ against the incident light L3 toward an optical absorber 26 and invalidated. The reflected light L5 is an OFF reflected light from the reflection type digital light deflector 2.

The micro mirror element 25 in the horizontal state reflects the parallel light L3 from the optical engine 3 in a neutral or third reflection direction indicated by a dotted-line arrow. A reflected light L6 indicated by this dotted-line arrow is reflected at an angle 4θ against the incident light L3. The reflected light L6 is a reflected light (neutral reflected light) from the reflection type digital light deflector 2 when the element 25 is turned off.

The reflection type digital light deflector 2 can precisely control the micro mirror elements 25 to emit a full-white color, a full-black color, grays of intermediate multiple gradations (e.g., 256−2=254 gradations for eight bits) one by one according to a control signal output from the controller 6. ON and OFF control over the micro mirror elements 25 (that is, switch over control over the tilt angles of the micro mirror elements 25) will next be explained in detail with reference to FIG. 9 and FIG. 10.

Assuming the micro mirror elements 25 as pixels, positions of the pixels (micro mirror elements 25) in an x direction as 0, 1, 2, 3, 4, . . . , and m, and those of pixels (micro mirror elements 25) in a y direction as 0, 1, 2, . . . , and n, the number of the total micro mirror elements 25 is (m+1)×(n+1). The total number of the micro mirror elements 25 is, for example, 720×480=345,600, 800×600=480,000, 1,024×768=786,432, 1,280×1,024=1,310,720, or an arbitrary number.

It is further assumed as follows. If the control signal output from the controller 6 is "1", each micro mirror element 25 is turned on. If the control signal output from the controller 6 is "0", each micro mirror element 25 is turned off.

While scanning the (m+1)×(n+1) micro mirror elements 25 in order of (0, 0)→(1, 0)→(2, 0)→(3, 0)→ . . . →(m, 0)→(0, 1)→(1, 1)→(2, 1)→( 3,1)→ . . . →(m, 1)→(0, 2)→(1, 2)→(2, 2)→(3, 2)→ . . . →(m, 2)→ . . . →(m, n), each micro mirror element 25 is controlled to be turned on or off according to the control signal "1" or "0" output from the controller 6. As a result, the micro mirror elements 25 are ON and OFF controlled.

Figure 10:
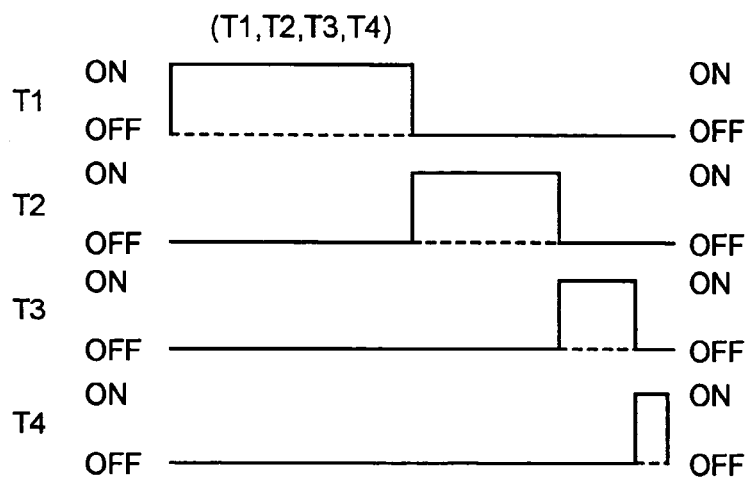
FIG. 10 depicts a pixel control of the reflection type digital light deflector.
Figure 11:
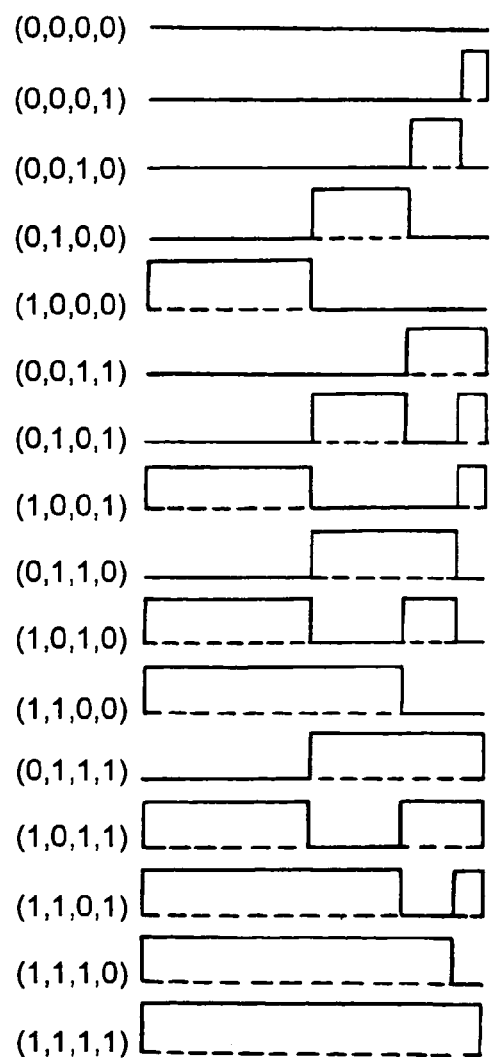
FIG. 11 depicts a 16-gradation control of the reflection type digital light deflector for four-bit data.

The control signal "1" or "0" output from the controller 6 is binary-number bit data. For example, as shown in FIG. 10, if the control signal has four bits (T1, T2, T3, and T4), $2^4$=16 control signals are output. Therefore, it is possible to precisely control full-white color, full-black color, and intermediate colors of gray scale at 16−2=14 gradations of the light. Namely, if the control signal has four bits (T1, T2, T3, and T4), it is possible to precisely control the full-white color of the pixel having a luminous intensity of 100 percent at (1, 1, 1, 1), the full-black color of the pixel having a luminous intensity of zero percent at (0, 0, 0, 0), and the gray colors of the pixels at 14 gradations at (1, 0, 0, 0), (0, 1, 0, 0), (0, 0, 1, 0), (0, 0, 0, 1), (1, 1, 0, 0), (1, 0, 1, 0), (1, 0, 0, 1), (0, 1, 1, 0), (0, 1, 0, 1), (0, 0, 1, 1), (1, 1, 1, 0), (1, 0, 1, 1), (1, 1, 0, 1), and (1; 1, 1, 0).

If the control signal includes eight bits, the number of pixels that can be controlled is $2^8$=256. Therefore, it is possible to precisely control the full-white color, the full-black color, and the intermediate gray colors at 256−2=256 gradations of the light.

As can be seen, the reflection type digital light deflector 2 controls the reflected light from each micro mirror element 25 to be turned on at a certain time to emit white and to be turned off at remaining time to emit black within a certain time while taking advantage of pulse width modulation according to gradation. If so, a person's vision senses the integrated white time as gradations (e.g., 0 to 255 gray scales for eight bits). Therefore, by controlling the ON-time per unit time, the reflection type digital light deflector 2 realizes a shade of light (luminous intensity difference and illuminance difference) in the light distribution pattern.

The light irradiation unit 3 includes a divergent lens 30 that diverges the ON light L4 from the reflection type digital light deflector 2 and a condensing lens (projection lens) 31 that irradiates an emission light L7 from the divergent lens 30 on the road surface and the like as a irradiation light L8.

This application claims priority from Japanese Patent Applications 2002-382299, 2002-382300, 2002-382301, 2002-382302, 2002-382303, 2002-382304, 2002-382305 and 2002-382306, all filed Dec. 27, 2002, of which all are incorporated herein by reference in their entirety.

The storage unit 4 is, for example, an internal storage unit (a magnetic disk such as a hard disk or a semiconductor storage unit such as a RAM or a ROM included in a computer or an external storage unit (an optical storage medium such as a CD-ROM or a semiconductor storage medium such as a memory card) exterior to the computer. The storage unit 4 stores digital data on a plurality of light distribution patterns.

The digital data on the light distribution patterns stored in the storage unit 4 is divided in units of regions or countries in which the vehicle is driven. By doing so, an optimum light distribution pattern for road conditions of the region or country where the vehicle is driven can be obtained without changing the overall vehicle lighting apparatus. Therefore, it is unnecessary to optically design or manufacture the vehicle lighting apparatus for each region or country, thereby reducing a manufacturing cost of the vehicle lighting apparatus accordingly.

The optimum light distribution pattern for the road conditions of the region or country where the vehicle is driven means a light distribution pattern optimum for the road conditions in Japan or that for the road conditions in the US. That is, Japan is a left-hand side drive country and has many narrow crossing roads and many twisty roads. Therefore, the optimum light distribution pattern for the road conditions of left-hand traffic and many narrow crossing roads and twisty roads is the optimum light distribution pattern for the Japan's road conditions. On the other hand, the U.S. is a right-hand side drive country and has many wide, straight roads. Therefore, the optimum light distribution pattern for the road conditions of right-hand traffic and many wide, straight roads is the optimum light distribution pattern for the US road conditions.

The light distribution patterns include, for example, a light distribution pattern for a vehicle passing-by the other vehicle, that for a moving vehicle, that for general roads, that for highways, that for urban districts, that for suburbs, that for straight roads, that for curved roads, that for crossings, that for mountain paths, that for winding roads, that for rainy weather, that for foggy weather, and that for snowy weather.

The digital data on the light distribution patterns is a digital data on a combination of the various light distribution patterns. For example, the digital data includes "1. light distribution data for general road, straight road in high beam", "2. light distribution data for general road, straight road in low beam", "3. light distribution data for urban district, straight road in low beam", "4. light distribution data for highway, straight road in low beam", and "5. light distribution data for highway, curved road in low beam" as well as "6. light distribution data for highway, straight road in low beam", "7. light distribution data for highway, curved road in high beam", "8. light distribution data for general road, curved road in high beam", "9. light distribution data for general road, curved road in low beam", "10. light distribution data for general road and crossing", "11. light distribution data for urban district, straight road in high beam", "12. light distribution data for urban district, curved road in low beam", "13. light distribution data for urban district, curved road in high beam", and "14. light distribution data for urban district and crossing" which are not shown in FIG. 12. The luminous intensity (illuminance) of a checkered central portion of each light distribution pattern in FIG. 12 is higher than that of a white surrounding portion.

The digital data on the light distribution patterns is data created by computer simulation so as to satisfy each standard in a light distribution design of the vehicle lighting apparatus. The digital data includes a plurality of binary-number bits for obtaining a plurality of luminous intensity gradations of many pixels, respectively. As a result, each light distribution pattern obtained based on the light distribution data shown in FIG. 12 and FIG. 13 can satisfy each standard.

Namely, it is necessary and important for the vehicle lighting apparatus (e.g., a headlamp, a fog lamp, a bent lamp (bending lamp), a curve lamp, or a side lamp) to illuminate the road surface and the like in a predetermined light distribution pattern that is set according to rules and regulations for traffic safety purposes. Therefore, the light distribution of the vehicle lighting apparatus is designed by the computer simulation so as to be able to ensure obtaining a predetermined light distribution pattern for each lamp or each function.

The light distribution design is made based on an ideal light distribution pattern that satisfies a predetermined light distribution pattern. This ideal light distribution pattern is a light distribution pattern obtained by digitally creating a light distribution pattern irradiated on a screen 10 meters head of the vehicle lighting apparatus so as to coincide with the light distribution pattern in which the lighting apparatus actually illuminates the road surface and the like. The ideal light distribution pattern thus digitally created by the computer represents a luminance intensity change in the form of a color distribution as an image visible to a person's eye, e.g., in 256-gradation scale for eight bits.

A magnitude of the screen is set so that left and right sides are respectively at 51.2 degrees against the vertical line VU-VD and upper and lower sides are respectively at 38.4 degrees against the horizontal line HL-HR. If 0.1 degree×0.1 degree of the screen is one pixel, the screen has 1,024×768=786,432 pixels. As a result, the digital data on the light distribution pattern in this embodiment is digital data of eight bits having 786,432 pixels in a 256-gradation scale created based on ideal light distribution pattern. Namely, the digital data on the light distribution pattern is very digital data on the ideal light distribution pattern.

On the other hand, the number of the micro mirror elements 25 of the reflection type digital light deflector 2 is set at 1,024×768=786,432. By so setting, one pixel of the digital data on the light distribution pattern corresponds to one of the micro mirror elements 25 of the reflection type digital light deflector 2. The reflection type digital light deflector 2 can finely control each of the 786,432 micro mirror elements 25 to emit a full-white color, a full-black color, and gray colors at intermediate multiple gradations (e.g., 254 gradations if the data includes eight bits). As a result, it is possible to finely, digitally control each of the 786,432 micro mirror elements 25 of the reflection type digital light deflector 2 to emit colors at 256 gradations based on the digital data on the light distribution pattern, i.e., the 256-gradation digital data on the 786,432 pixels of the ideal light distribution pattern.

The digital lighting system according to the first embodiment digitally forms the ideal light distribution pattern and irradiates light in the pattern. Therefore, the digital lighting system can illuminate the road surface and the like in the ideal light distribution pattern. That is, the digital lighting system and the digital lighting apparatus according to the present invention digitally form the ideal light distribution pattern using the digital data on the ideal light distribution pattern, irradiate the light in the pattern as it is, and illuminate the road surface and the like.

The surrounding environment detector 5 detects an environment surrounding the vehicle and outputs a detection signal. The surrounding environment detector 5 includes at least one of, for example, a steering sensor that detects one of or both of a steering angle and a steering speed of a steering wheel and that outputs a steering signal, a raindrop sensor that detects that it rains and that outputs a rain signal, a luminous intensity sensor that detects a brightness of surroundings of the vehicle and that outputs a luminous intensity signal, a turn sensor that detects an ON signal of a turn signal switch and that outputs a turn signal, a vehicle speed sensor that detects a vehicle speed and that outputs a vehicle speed signal, a wiper sensor that detects an ON signal of a wiper switch and that outputs a wiper signal, a radar that detects a reflected wave from a target in the surroundings of the vehicle and that outputs a radar signal, a humidity sensor that detects humidity of the surroundings of the vehicle and that outputs a humidity signal, a temperature sensor that detects temperature of the surroundings of the vehicle and that outputs a temperature signal, a light sensor that detects an ON signal of a light switch and that outputs a light signal, an orientation sensor that detects an orientation of the vehicle and that outputs an orientation signal, and an electronic toll collection (ETC) that outputs a communication signal when the vehicle enters a highway. Thus, the surrounding environment detector 5 includes either one sensor or a combination of a plurality of sensors.

The steering sensor has a plurality of slits provided equidistantly on a rotational body rotating while being interlocked with the steering of the steering wheel and a sensor such as a photo-interrupt sensor put between the slits on the rotational body. The steering sensor converts the steering angle to an electric signal based on the output of the sensor, detects a rotational direction and a position of the steering wheel, and outputs a detection signal as the steering signal to the controller 6. The raindrop sensor outputs an HI-level signal or an LO-level signal as the rain signal to the controller 6 when it rains or it does not rain, respectively. The luminous intensity sensor outputs an HI-level signal or an LO-level signal as the luminous intensity signal to the controller 6 when the brightness of the surroundings of the vehicle is equal to or higher than a predetermined brightness or equal to or lower than the predetermined brightness, respectively. The turn sensor outputs an HI-level signal or an LO-level signal as the turn signal to the controller 6 when the turn signal switch is turned on or off, respectively. The vehicle speed sensor outputs the vehicle speed signal with a pulse changing according to the vehicle speed, to the controller 6. The wiper sensor outputs an HI-level signal or an LO-level signal as the wiper signal to the controller 6 when the wiper switch is turned on or off, respectively. The imaging device, which has an image processing circuit (not shown), images the information on the surroundings of the vehicle and outputs the image signal to the image processing circuit. The image processing circuit processes the image signal and outputs an HI-level signal or an LO-level signal to the controller 6 based on whether an oncoming vehicle or a preceding vehicle is present, whether it is foggy, whether there is a crossing, and whether a road is a highway or a general road.

The controller 6 includes an external signal input unit 60, a surrounding environment determination unit 61, a data selection unit 62, and a control signal output unit 63. The external signal input unit 60 inputs an external signal such as the detection signal of the surrounding environment detector 5 or the information signal of the information acquisition unit 9 and outputs the external signal as a processing signal to the surrounding environment determination unit 61. The surrounding environment determination unit 61 determines the surrounding environment of the vehicle based on the processing signal input from the external signal input unit 60 and outputs a determination signal to the data selection unit 62. The data selection unit 62 selects digital data on the optimum light distribution pattern for the surrounding environment of the vehicle from among digital data on a plurality of light distribution patterns stored in the storage unit 4 based on the determination signal input from the surrounding environment determination unit 61, and outputs the selected digital data to the control signal output unit 63. The control signal output unit 63 outputs a control signal for individually, digitally controlling switch over of the tilt angles of the micro mirror elements 25 to the reflection type digital light deflector 2 based on the digital data on the optimum light distribution pattern for the surrounding environment of the vehicle input from the data selection unit 62.

The controller 6 employs a computer loaded on the vehicle. As the computer, a computer that controls a car navigation system, a car audio system, a cellular phone, a control circuit section, an electrical control unit (ECU) and electronic control unit and the like are included. The controller 6 may employ a computer that is not loaded on the vehicle, e.g., a portable personal computer. With the portable personal computer, by storing user's desired digital data in the portable personal computer, even if the vehicle changes to the other vehicle, the user's desired light distribution pattern can be acquired at any time when the portable personal computer is connected to the changed vehicle. The controller 6 is controlled by an ordinary operating system (OS). Thus, the controller 6 is constituted separately from the reflection type digital light deflector 2.

The controller/computer 6 includes a central processing unit (CPU) 66. The CPU 66 includes the surrounding environment determination unit 61 and the data selection unit 62. The CPU 66 includes a main storage unit that stores a control program and a buffer storage unit which are not shown in FIG. 1.

The external signal input unit 60 included in the controller 6 is, for example, an interface circuit. The control signal output unit 63 included in the controller 6 is, for example, a driver circuit.

The surrounding environment determination unit 61 includes at least one of an oncoming vehicle/preceding vehicle determination unit, a highway/general road determination unit, an urban district determination unit (urban district/suburb determination unit), a crossing determination unit, a straight/curved road determination unit, a rain determination unit, a fog determination unit, a snow determination unit, an orientation determination unit, and a wait-at-stoplight determination unit.

The oncoming vehicle/preceding vehicle determination unit determines whether an oncoming vehicle or a preceding vehicle is present based on the image signal obtained by imaging information on surroundings of the vehicle by the imaging device of the surrounding environment detector 5 and output from the imaging device, and outputs an oncoming vehicle/preceding vehicle presence signal or an oncoming vehicle/preceding vehicle absence signal.

The highway/general road determination unit determines whether the road is a highway or a general road based on at least one of the image signal obtained by imaging the information on surroundings of the vehicle (e.g., a white line or a median strip drawn on the road surface) by the imaging device of the surrounding environment detector 5 and output from the imaging device, the vehicle speed single obtained by detecting the vehicle speed by the vehicle speed sensor of the surrounding environment detector 5 and output from the vehicle sensor, the position information signal output from the GPS or the ground-based station (e.g., electronic reference point) of the surrounding environment detector 5 and received by a GPS receiver (e.g., car navigation system), and the communication signal output from the ETC of the surrounding environment detector 5, and outputs a highway signal or a general road signal.

The urban district determination unit determines whether the vehicle is in the urban district based on at least one of the image signal obtained by imaging the information on surroundings of the vehicle by the imaging device of the surrounding environment detector 5 and output from the imaging device, the luminous intensity signal obtained by detecting the brightness of the surroundings of the vehicle by the luminous intensity sensor of the surrounding environment detector 5 and output from the luminous intensity sensor, and the position information signal output from the GPS or the like of the surrounding environment detector 5, and outputs a signal indicating that the vehicle is in the urban district or a signal indicating that the vehicle is not in the urban district (e.g., a signal indicating that the vehicle is in the suburbs).

The crossing determination unit determines whether the vehicle is at a crossing based on at least one of the image signal obtained by imaging the information on surroundings of the vehicle (e.g., a white line or a median strip drawn on the road surface) by the imaging device of the surrounding environment detector 5 and output from the imaging device, the turn signal obtained by detecting the ON signal of the turn signal switch by the turn sensor of the surrounding environment detector 5 and output from the turn sensor, and the position information signal output from the GPS or the like of the surrounding environment detector 5, and outputs a signal indicating that the vehicle is at a crossing or a signal indicating that the vehicle is not at a crossing.

The straight/curved road determination unit determines whether the road is straight or curved based on at least one of the steering signal obtained by detecting one of or both of the steering angle and the steering speed of the steering wheel by the steering sensor of the surrounding environment detector 5 and output from the steering sensor, the vehicle speed obtained by detecting the vehicle speed by the vehicle speed sensor of the surrounding environment detector 5 and output from the vehicle speed sensor, the position information signal output from the GPS or the like of the surrounding environment detector 5, and the image signal obtained by imaging the information on surroundings of the vehicle (e.g., a curved white line drawn on the road surface) by the imaging device of the surrounding environment detector 5 and output from the imaging device, and outputs a straight signal or a curve signal.

The rain determination unit determines whether it rains based on at least one of the rain signal obtained by detecting that it rains by the raindrop sensor of the surrounding environment detector 5 and output from the raindrop sensor, the wiper signal obtained by detecting the ON signal of the wiper switch by the wiper sensor of the surrounding environment detector 5 and output from the wiper sensor, and the image signal obtained by imaging the information on surroundings of the vehicle (e.g., a reflectance of the road surface depending on how wet the surface is) by the imaging device of the surrounding environment detector 5 and output from the imaging device, and outputs a signal indicating that it rains or a signal indicating that it does not rain.

The fog determination unit determines whether it is foggy based on at least one of the image signal obtained by imaging the information on surroundings of the vehicle by the imaging device of the surrounding environment detector 5 and output from the imaging device, the radar signal obtained by detecting the reflected wave from the target in the surroundings of the vehicle by the radar of the surrounding environment detector 5 and output from the radar, the humidity signal obtained by detecting the humidity of the surroundings of the vehicle by the humidity sensor of the surrounding environment detector 5 and output from the humidity sensor, and the temperature signal obtained by detecting the temperature of the surroundings of the vehicle by the temperature sensor of the surrounding environment detector 5 and output from the temperature sensor, and outputs a signal indicating that it is foggy or a signal indicating that it is not foggy.

The snow determination unit determines whether it snows based on at least one of the image signal obtained by imaging the information on surroundings of the vehicle by the imaging device of the surrounding environment detector 5 and output from the imaging device, the wiper signal obtained by detecting the ON signal of the wiper switch by the wiper sensor of the surrounding environment detector 5 and output from the wiper sensor, and the temperature signal obtained by detecting the temperature of the surroundings of the vehicle by the temperature sensor of the surrounding environment detector 5 and output from the temperature sensor, and outputs a signal indicating that it snows or a signal indicating that it does not snow.

The orientation determination unit determines whether the orientation of the vehicle changes based on the orientation signal obtained by detecting the orientation of the vehicle by the orientation sensor of the surrounding environment detector 5 and output from the orientation sensor, and outputs an orientation change signal according to a variation of the orientation of the vehicle.

The wait-at-stoplight determination unit determines whether the vehicle is waiting at a stoplight based on the vehicle speed signal obtained by detecting the vehicle speed by the vehicle speed sensor of the surrounding environment detector 5 and output from the vehicle speed sensor, the position information signal output from the GPS or the like of the surrounding environment detector 5, and the image signal obtained by imaging the information on surroundings of the vehicle by the imaging device of the surrounding environment detector 5 and output from the imaging device, and outputs a signal indicating that the vehicle is waiting at a stoplight or a signal indicating that the vehicle is not waiting at a stoplight.

The surrounding environment determination unit 61 includes one determination unit or a plurality of determination units. The white line or the like drawn on the road surface and imaged by the imaging device of the surrounding environment detector 5 as the information on surroundings of the vehicle is prescribed by the Road Traffic Law. Therefore, this information can be used as high-quality information.

The data selection unit 62 includes a main data selection section and an interrupt data selection section. The main data selection section selects the digital data on the optimum light distribution pattern for the surrounding environment of the vehicle from among pieces of the digital data on the light distribution patterns stored in the storage unit 4 based on the determination signal from at least one of the oncoming vehicle/preceding vehicle determination unit, the highway/general road determination unit, the urban district determination unit, the crossing determination unit, the straight/curved road determination unit, the rain determination unit, the fog determination unit, and the snow determination unit. The interrupt data selection section halts and interrupts the selection of the main data selection section and selects the digital data on the optimum light distribution pattern for the vehicle waiting at a stoplight or the orientation of the vehicle from among pieces of digital data on the light distribution patterns stored in the storage unit 4.

Functions of the digital lighting system according to the first embodiment are explained with reference to FIG. 17. The surrounding environment detector 5 detects the surrounding environment of the vehicle (e.g., a region condition for the region in which the vehicle is running, a road condition for the road on which the vehicle is running or a weather condition) and outputs a detection signal to the controller 6 (at S1). If the detection signal is input to the controller 6, then the interface circuit of the external signal input unit 60 inputs the external signal such as each detection signal from the surrounding environment detector 5, processes the input signal to a signal that can be handled by the controller 6, and outputs the processing signal to the surrounding environment determination unit 61 (at S2). If the processing signal is input to the surrounding environment determination unit 61, the surrounding environment determination unit 61 determines the surrounding environment of the vehicle based on the processing signal from the external signal input unit 60, and outputs a determination signal to the data selection unit 62 (at S3).

The surrounding environment determination unit 61 executes the following first determination step to tenth determination step. At the first determination step, the oncoming vehicle/preceding vehicle determination unit determines whether an oncoming vehicle or a preceding vehicle is present based on the image signal of the imaging device and outputs the oncoming vehicle/preceding vehicle presence signal or the oncoming vehicle/preceding vehicle absence signal. At the second determination step, the highway/general road determination unit determines whether the road is a highway or a general road based on at least one of the image signal of the imaging device, the vehicle speed single of the vehicle speed sensor, the position information signal of the GPS or the like, and the communication signal of the ETC, and outputs the highway signal or the general road signal. At the third determination step, the urban district determination unit determines whether the vehicle is in the urban district based on at least one of the image signal of the imaging device, the luminous intensity signal of the luminous intensity sensor, and the position information signal of the GPS or the like, and outputs the signal indicating that the vehicle is in the urban district or the signal indicating that the vehicle is not in the urban district. At the fourth determination step, the crossing determination unit determines whether the vehicle is at a crossing based on at least one of the image signal of the imaging device, the turn signal of the turn sensor, and the position information signal of the GPS or the like, and outputs the signal indicating that the vehicle is at a crossing or the signal indicating that the vehicle is not at a crossing. At the fifth determination step, the straight/curved road determination unit determines whether the road is straight or curved based on at least one of the steering signal of the steering sensor and the vehicle speed signal of the vehicle speed sensor, and the position information signal of the GPS or the like and outputs the straight signal or the curve signal. At the sixth determination step, the rain determination unit determines whether it rains based on at least one of the rain signal of the raindrop sensor, the wiper signal of the wiper sensor and outputs the signal indicating that it rains or the signal indicating that it does not rain. At the seventh determination step, the fog determination unit determines whether it is foggy based on at least one of the image signal of the imaging device, the radar signal of the radar, the humidity signal of the humidity sensor, and the temperature signal of the temperature sensor, and outputs the signal indicating that it is foggy or the signal indicating that it is not foggy. At the eighth determination step, the snow determination unit determines whether it snows based on at least one of the image signal of the imaging device, the wiper signal of the wiper sensor, and the temperature signal of the temperature sensor, and outputs the signal indicating that it snows or the signal indicating that it does not snow. At the ninth determination step, the orientation determination unit determines whether the orientation of the vehicle changes based on the orientation signal of the orientation sensor, and outputs the orientation change signal according to the variation of the orientation of the vehicle. At the tenth determination step, a wait-at-stoplight determination unit determines whether the vehicle is waiting at a stoplight based on all of or one of the vehicle speed signal of the vehicle speed sensor, the position information signal of the GPS or the like, and the image signal of the imaging device, and outputs the signal indicating that the vehicle waiting at a stoplight or the signal indicating that the vehicle is not waiting at a stoplight. The determination steps executed by the surrounding environment determination unit 61 may include at least one of the first to tenth determination steps or include the other determination steps.

Referring back to FIG. 17, if the determination signal is input to the data selection unit 62, the data selection unit 62 selects the digital data on the optimum light distribution pattern for the surrounding environment of the vehicle from among pieces of digital data on the light distribution patterns stored in the storage unit 4 based on the determination signal of each determination unit in the surrounding environment determination unit 5 (at S4). The main data selection unit of the data selection unit 62 selects the digital data on the optimum light distribution pattern for the surrounding environment of the vehicle from among the pieces of digital data on the light distribution patterns stored in the storage unit 4 based on the determination signal from at least one of the oncoming vehicle/preceding vehicle determination unit, the highway/general road determination unit, the urban district determination unit, the crossing determination unit, the straight/curved road determination unit, the rain determination unit, the fog determination unit, and the snow determination unit included in the surrounding environment determination unit 61.

For example, if the highway/general road determination unit determines that the road is a general road, the straight/curved road determination unit determines that the road is straight, and the oncoming vehicle/preceding vehicle determination unit determines that no oncoming vehicle/preceding vehicle is present, the main data selection unit selects "1. Light distribution pattern data for general road, straight road, and running vehicle" shown in FIG. 12 and FIG. 13. If the highway/general road determination unit determines that the road is a general road, the straight/curved road determination unit determines that the road is straight, and the oncoming vehicle/preceding vehicle determination unit determines that an oncoming vehicle/preceding vehicle is present, the main data selection unit selects "2. light distribution pattern data for general road, straight road, and vehicle passing by the other vehicle" shown in FIG. 12 and FIG. 13. If the urban district determination unit determination unit determines that the vehicle is in an urban district, the straight/curved road determination unit determines that the road is straight, and the oncoming vehicle/preceding vehicle determination unit determines that an oncoming vehicle/preceding vehicle is present, the main data selection unit selects "3. light distribution pattern data for urban district, straight road, and vehicle passing by the other vehicle" shown in FIG. 12 and FIG. 13. If the highway/general road determination unit determines that the road is a highway, the straight/curved road determination unit determines that the road is straight, and the oncoming vehicle/preceding vehicle determination unit determines that an oncoming vehicle/preceding vehicle is present, the main data selection unit selects "4. light distribution pattern data for highway, straight road, and vehicle passing by the other vehicle" shown in FIG. 12 and FIG. 13. If the highway/general road determination unit determines that the road is a highway, the straight/curved road determination unit determines that the road is curved, and the oncoming vehicle/preceding vehicle determination unit determines that an oncoming vehicle/preceding vehicle is present, the main data selection unit selects "5. light distribution pattern data for highway, curved road, and vehicle passing by the other vehicle" shown in FIG. 12 and FIG. 13. If the highway/general road determination unit determines that the road is a highway, the straight/curved road determination unit determines that the road is straight, and the oncoming vehicle/preceding vehicle determination unit determines that no oncoming vehicle/preceding vehicle is present the main data selection unit selects "6. light distribution pattern data for highway, straight road, and vehicle passing by the other vehicle" shown in FIG. 13. If the highway/general road determination unit determines that the road is a highway, the straight/curved road determination unit determines that the road is curved, and the oncoming vehicle/preceding vehicle determination unit determines that no oncoming vehicle/preceding vehicle is present, the main data selection unit selects "7. light distribution pattern data for highway, curved road, and running vehicle" shown in FIG. 13. If the highway/general road determination unit determines that the road is a general road, the straight/curved road determination unit determines that the road is curved, and the oncoming vehicle/preceding vehicle determination unit determines that no oncoming vehicle/preceding vehicle is present, the main data selection unit selects "8. light distribution pattern data for general road, curved road, and running vehicle passing by the other vehicle" shown in FIG.

13. If the highway/general road determination unit determines that the road is a general road, the straight/curved road determination unit determines that the road is curved, and the oncoming vehicle/preceding vehicle determination unit determines that an oncoming vehicle/preceding vehicle is present, the main data selection unit selects "9. light distribution pattern data for general road, curved road, and vehicle passing by the other vehicle" shown in FIG. 13. If the highway/general road determination unit determines that the road is a general road and the crossing determination unit determines that a crossing is present, the main data selection unit selects "10. light distribution pattern data for general road and crossing" shown in FIG. 13. If the urban district determination unit determines that the vehicle is in an urban district, the straight/curved road determination unit determines that the road is straight, and the oncoming vehicle/preceding vehicle determination unit determines that no oncoming vehicle/preceding vehicle is present, the main data selection unit selects "11. light distribution pattern data for urban district, straight road, and running vehicle" shown in FIG. 13. If the urban district determination unit determines that the vehicle is in an urban district, the straight/curved road determination unit determines that the road is curved, and the oncoming vehicle/preceding vehicle determination unit determines that an oncoming vehicle/preceding vehicle is present, the main data selection unit selects "12. light distribution pattern data for urban district, curved road, and vehicle passing by the other vehicle" shown in FIG. 13. If the urban district determination unit determines that the vehicle is in an urban district, the straight/curved road determination unit determines that the road is curved, and the oncoming vehicle/preceding vehicle determination unit determines that no oncoming vehicle/preceding vehicle is present, the main data selection unit selects "13. light distribution pattern data for urban district, curved road, and running vehicle" shown in FIG. 13. If the urban district determination unit determines that the vehicle is in an urban district and the crossing determination unit determines that a crossing is present, the main data selection unit selects "14. light distribution pattern data for urban district and crossing" shown in FIG. 13. Examples of the light distribution data selected by the main data selection unit include various pieces of light distribution data depending on a combination of selection by the main data selection besides the "1. light distribution pattern data for general road, straight road, and running vehicle" to the "14. light distribution pattern data for urban district and crossing".

It is assumed herein that if the vehicle digital lighting apparatus illuminates the road surface and the like in the light distribution pattern selected by the main data selection unit of the data selection unit 62, the wait-at-stoplight determination unit of the surrounding environment determination unit 61 determines that the vehicle waiting at a stoplight or the orientation determination unit thereof determines that the orientation of the vehicle changes. If so, the interrupt data selection unit of the data selection unit 62 halts and interrupts the selection of the main data selection unit and selects the digital data on the optimum light distribution pattern for the vehicle waiting at a stoplight or the orientation of the vehicle from among pieces of digital data on the light distribution patterns stored in the storage unit 4 based on the determination signal from the wait-at-spotlight determination unit or from the orientation determination unit. In other words, an interrupt routine performed by the interrupt data selection unit is established against a main routine performed by the main data selection unit. After this interrupt routine is completed, the main data selection unit performs the main routine again.

Referring back to FIG. 17, if the data selection unit 62 selects the digital data on the optimum light distribution pattern for the surrounding environment of the vehicle based on the determination of the surrounding environment determination unit 61, the driver circuit of the control signal output unit 63 outputs the control signal for individually, digitally controlling switchover of the tilt angles of the minimum mirror elements 25 to the reflection digital light deflector 2 based on the digital data on the optimum light distribution pattern for the surrounding environment of the vehicle selected by the data selection unit 62 (at S5).

If the controller 6 outputs the control signal to the reflection digital light deflector 2, the reflection digital light deflector 2 controls ON and OFF switching of the many micro mirror elements 25 based on the control signal, i.e., the digital data on the optimum light distribution pattern for the surrounding environment of the vehicle. The digital lighting system according to the first embodiment can automatically select the optimum light distribution pattern P5 for the surrounding environment of the vehicle and illuminate the road surface and the like in this selected optimum light distribution pattern P5 for the surrounding environment of the vehicle.

The advantages of the digital lighting system according to the first embodiment, which is constituted as explained above, will be explained.

The digital lighting system according to the first embodiment controls the reflection digital light deflector 2 based on the digital data on the ideal light distribution pattern. Therefore, it is ensured that the predetermined light distribution pattern that is digitally controlled can be obtained.

The digital lighting system according to the first embodiment, in particular, can automatically select the predetermined light distribution pattern P5 optimum for the surrounding environment of the vehicle and constantly illuminate the road surface and the like RD in the optimum predetermined light distribution pattern P5 optimum for the surrounding environment of the vehicle. Hence, the advantage is preferable for traffic safety. In addition, the digital lighting system according to the first embodiment can digitally control the predetermined light distribution pattern P5 optimum for the surrounding environment of the vehicle directly using the digital data on the digitally created light distribution pattern. Therefore, it is ensured that the predetermined light distribution pattern P5 optimum for the surrounding environment of the vehicle without analogous irregularities can be obtained.

The digital lighting system according to the first embodiment can directly use the digital data on the light distribution pattern obtained in the light distribution design of the digital lighting system as the digital data on the light distribution pattern for controlling the reflection digital light deflector 2. Therefore, it is unnecessary to generate the digital data on the control light distribution pattern and manufacturing cost can be reduced, accordingly.

The digital lighting system according to the first embodiment can ensure detecting the surrounding environment of the vehicle by the surrounding environment detector 5. Therefore, it is further ensured that the light distribution pattern P5 suited for the surrounding environment of the vehicle can be obtained.

The digital lighting system according to the first embodiment can ensure controlling the reflection digital light deflector 2 by the controller 6. Therefore, it is further ensured that the light distribution pattern P5 that is the optimum predetermined light distribution pattern P5 for the surrounding environment of the vehicle and that is free from analogous irregularities can be obtained.

The digital lighting system according to the first embodiment can ensure determining the surrounding environment of the vehicle by the surrounding environment determination unit 61. Therefore, it is further ensured that the light distribution pattern P5 suited for the surrounding environment of the vehicle can be obtained.

The digital lighting system according to the first embodiment can select the digital data on the optimum light distribution pattern for the surrounding environment of the vehicle from among the main data in the pieces of digital data on the light distribution patterns by the main selection unit. Therefore, the light distribution pattern P5 optimum for the surrounding environment of the vehicle can be obtained further surely and promptly.

According to the digital lighting system according to the first embodiment, the interrupt data selection unit can establish the interrupt control routines against the main control routine performed by the main data selection unit. Therefore, the digital lighting system according to the first embodiment can select the digital data on the optimum light distribution pattern for the surrounding environment of the vehicle more finely and control the data selection accurately and promptly.

Figure 17:
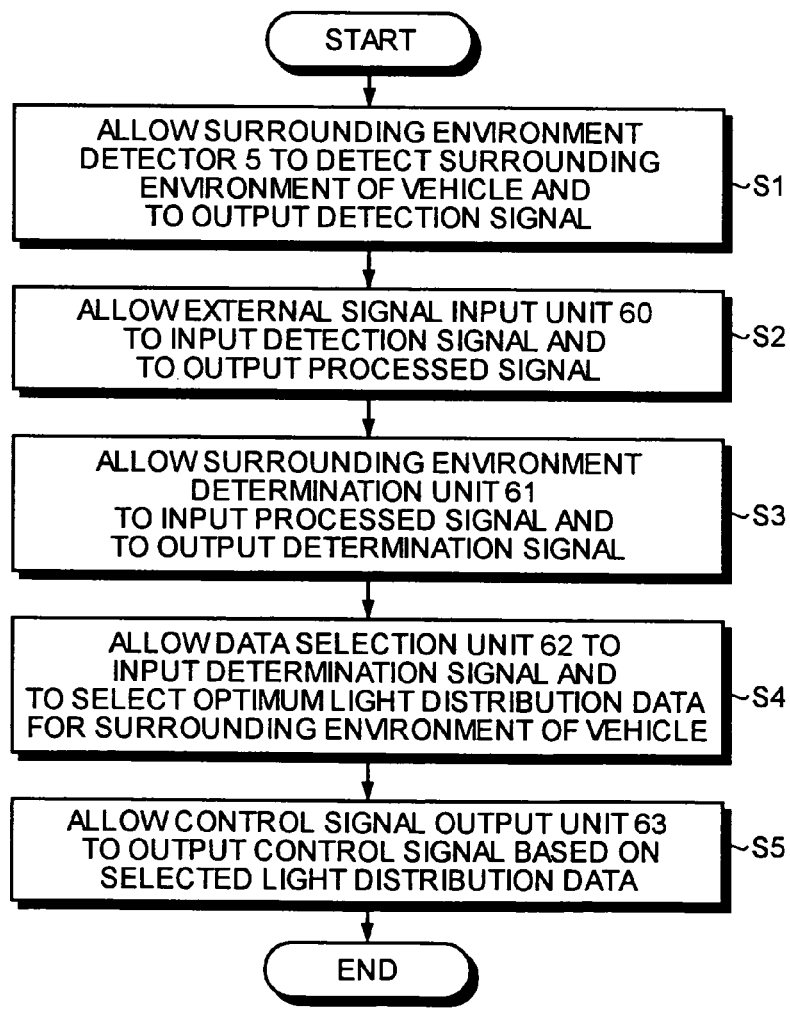
FIG. 17 is a flowchart of operation of the digital lighting system according to the first embodiment.
Figure 18:
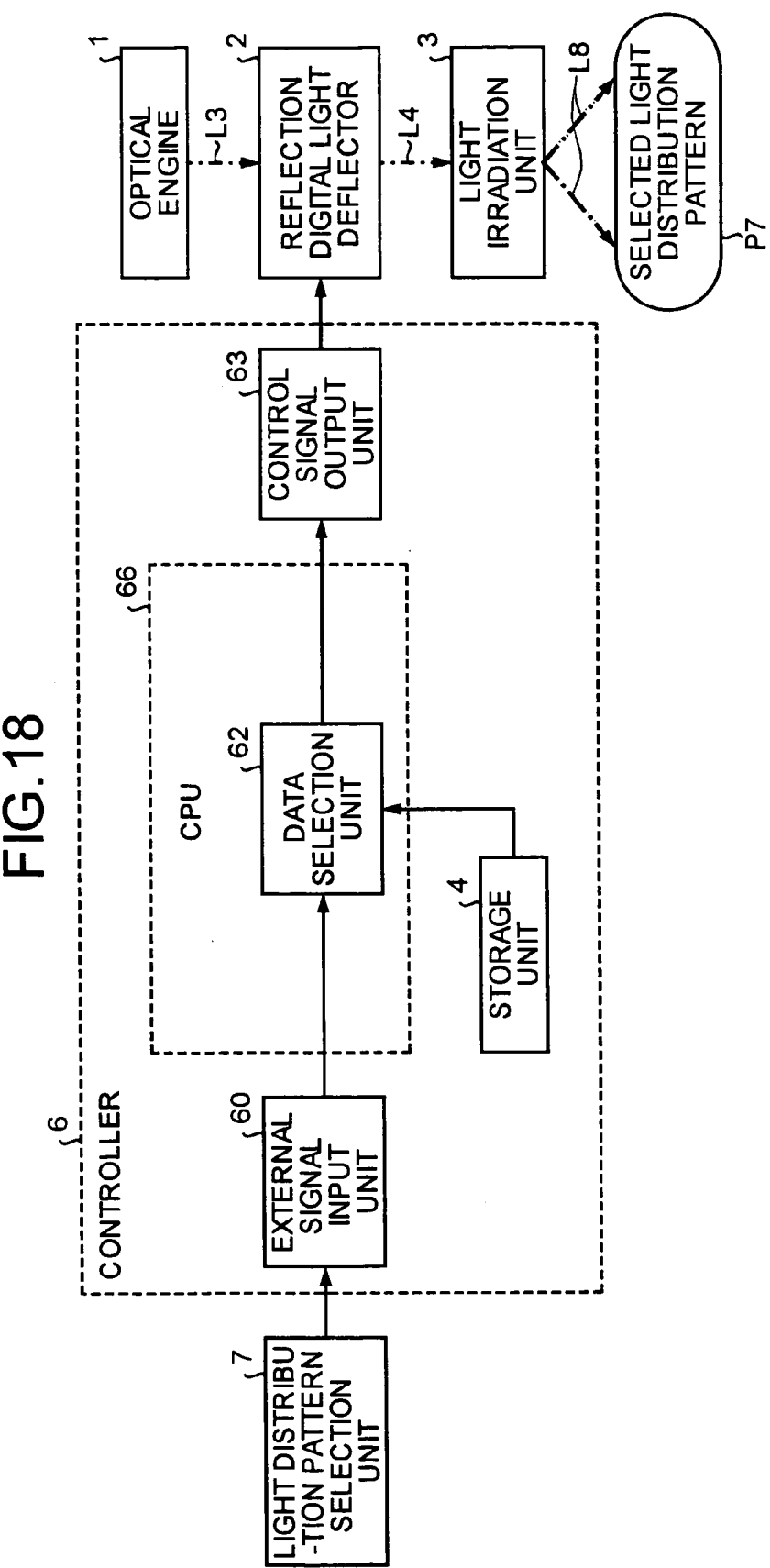
FIG. 18 is a block diagram of a digital lighting apparatus according to the first embodiment.

FIG. 18 is a block diagram of a digital lighting apparatus according to the first embodiment. The same reference symbols as those in FIG. 1 to FIG. 17 denote the same constituent elements.

The digital lighting system according to the first embodiment automatically selects the optimum predetermined light distribution pattern P5 (see FIG. 1) for the surrounding environment of the vehicle, and illuminates the road surface and the like in the selected predetermined light distribution pattern P5. The vehicle digital lighting apparatus in this first embodiment, by contrast, selects a predetermined light distribution pattern P7 and illuminates the road surface and the like in the selected predetermined light distribution pattern P7.

Namely, the digital lighting system according to the first embodiment automatically selects the optimum predetermined light distribution pattern P5 for the surrounding environment of the vehicle using the surrounding environment detector 5 (see FIG. 1), the surrounding environment determination unit 61 (see FIG. 1), and the like. The vehicle digital lighting apparatus according to the first embodiment, by contrast, allows a driver of the vehicle to select the predetermined light distribution pattern P7 using a light distribution pattern selection unit 7.

The light distribution pattern selection unit 7 is connected to the external signal input unit 60 in the controller 6 and the external signal input unit 60 is connected to the data selection unit 62 in the CPU 66. The light distribution pattern selection unit 7 allows the driver to select a light distribution pattern for illuminating the road surface and the like using the light distribution pattern selection unit 7 and thereby outputs a selection signal based on driver's selection to the external signal input unit 60 of the controller 6.

The functions and advantages of the vehicle digital lighting apparatus according to the first embodiment, which is constituted as explained above, will be explained.

The driver selects the light distribution pattern for illuminating the road surface and the like using the light distribution pattern selection unit 7. If so, the light distribution pattern selection unit 7 outputs the selection signal based on driver's selection to the external signal input unit 60. The interface circuit of the external signal input unit 60 inputs the external signal such as the selection signal from the light distribution pattern selection unit 7, processes the external signal so that the controller 6 can handle the signal, and outputs the processing signal to the data selection unit 62.

The data selection unit 62 selects digital data on the driver's selected light distribution pattern from among pieces of digital data on a plurality of light distribution patterns stored in the storage unit 4 based on the selection signal from the light distribution pattern selection unit 7 through the external signal input unit 60.

The driver circuit of the control signal output unit 63 outputs a control signal for individually, digitally controlling switchover of the tilt angles of the minimum error elements 25 (see FIG. 5 to FIG. 8) to the reflection digital light deflector 2 based on the digital data on the light distribution pattern selected by the data selection unit 62.

If the controller 6 outputs the control signal to the reflection digital light deflector 2, the reflection digital light deflector 2 controls ON and OFF switching of the many micro mirror elements 25 based on the control signal, i.e., the digital data on the driver's selected light distribution pattern. The vehicle digital lighting apparatus according to the first embodiment can thereby illuminate the road surface and the like in the light distribution pattern P7 selected by the driver. It is assumed, for example, that the driver selects the light distribution pattern for the general road, the straight road, and the running vehicle using the light distribution pattern selection unit 7. If so, the data selection unit 62 selects "1. light distribution pattern data for general road, straight road, and running vehicle" shown in FIG. 12 and FIG. 13 from among pieces of data stored in the storage unit 4. Based on this "1. light distribution pattern data for general road, straight road, and running vehicle", the reflection digital light deflector 2 is controlled, whereby the vehicle digital lighting apparatus can illuminate the road surface and the like in the light distribution pattern for the general road, the straight road, and the running vehicle selected by the driver.

The vehicle digital lighting apparatus according to the first embodiment can digitally control the predetermined light distribution pattern by directly using the digitally created light distribution pattern substantially similarly to the digital lighting system according to the first embodiment. Therefore, it is ensured that the predetermined light distribution pattern P7 without analogous irregularities can be obtained.

In particular, the vehicle digital lighting apparatus according to the first embodiment allows the driver to perform the functions of the surrounding environment detector 5 and the surrounding environment determination unit 61 in the digital lighting system according to the first embodiment. Therefore, the vehicle digital lighting apparatus according to the first embodiment can dispense with the surrounding environment detector 5 and the surrounding environment determination unit 61 and manufacturing cost can be reduced, accordingly.

Figure 19:
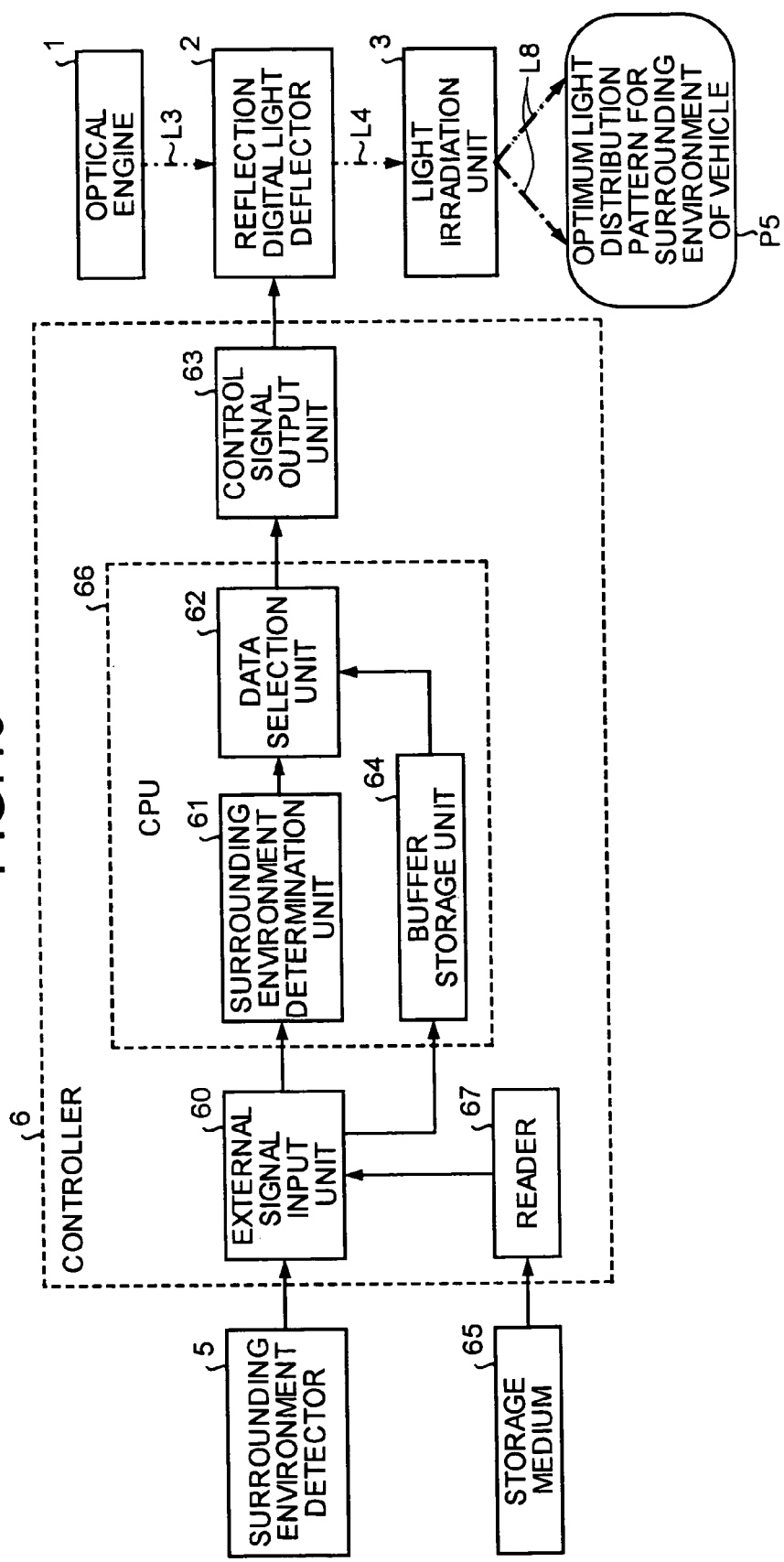
FIG. 19 is a block diagram of a digital lighting system according to a second embodiment of the present invention.
Figure 20:
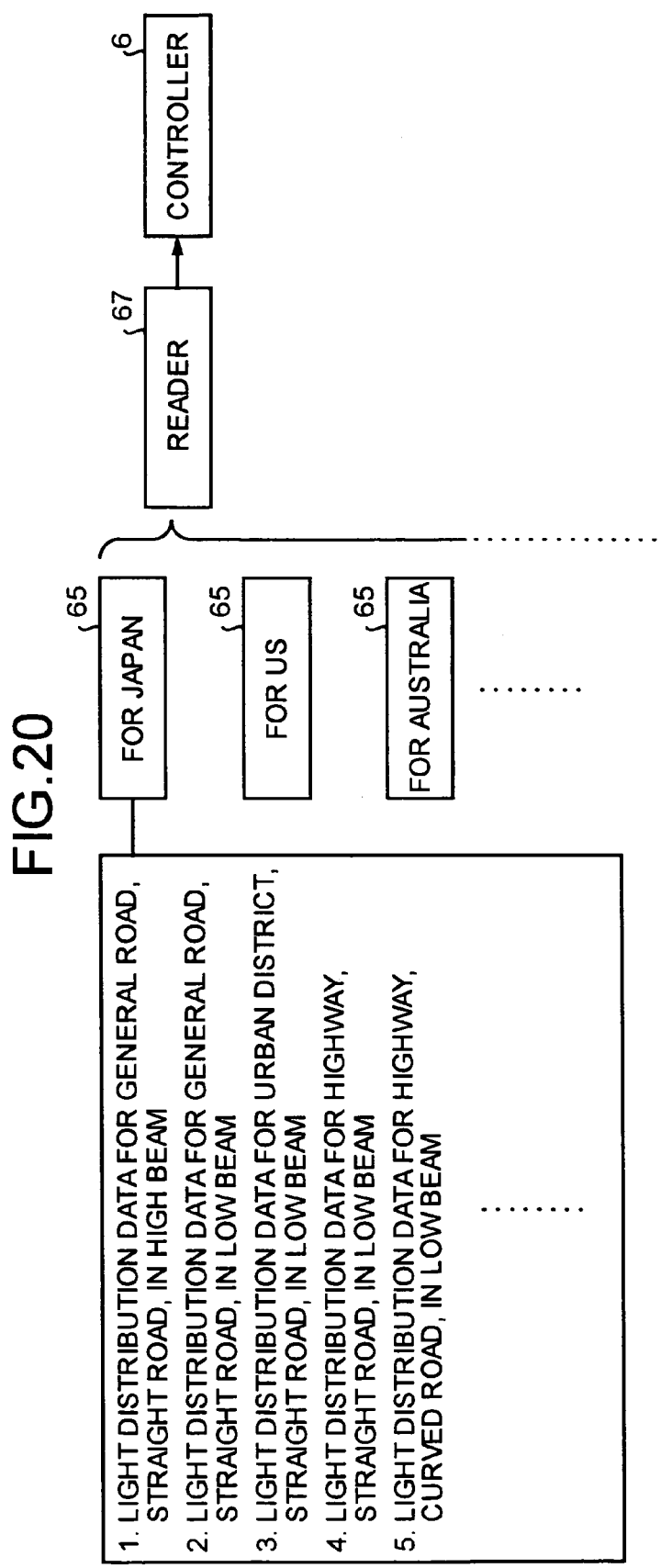
FIG. 20 is a block diagram for illustrating light distribution data, a storage medium, a reader, and a controller of the digital lighting system according to the second embodiment.

FIG. 19 and FIG. 20 are schematic diagrams for illustrating a digital lighting system according to a second embodiment of the present invention. The same reference symbols as those in FIG. 1 to FIG. 18 denote the same elements.

The vehicle digital lighting apparatus according to the second embodiment employs a buffer storage unit 64 mounted in the CPU 66 of the controller 6. The buffer storage unit 64 is connected to the external signal input unit

60 and the data selection unit 62. A reader 67 that reads the data stored in a storage medium is connected to the external signal input unit 60.

Pieces of digital data on light distribution patterns stored in the buffer storage unit 64 are stored in a semiconductor-based storage medium (hereinafter, "storage medium 65") such as a memory card. Further, digital data on light distribution patterns according to regions and countries, i.e., in units of groups of, for example, Japan, the US, Australia, etc. The pieces of digital data on the light distribution patterns in units of groups according to regions and countries that are stored in the storage medium 65 are read and stored by the buffer storage unit 64 through the reader 67 and the external signal input unit 60.

Since the digital lighting system according to the second embodiment is constituted as explained above, the following advantages can be attained. Since the pieces of digital data on the light distribution patterns according to regions and countries where vehicles are running are obtained, there is no need to design and manufacture digital lighting apparatuss for the respective regions and countries but one vehicle digital lighting apparatus can be applied to many regions and countries. Further, according to the digital lighting system according to the second embodiment, it suffices to read only the pieces of digital data on the light distribution patterns for relevant regions and countries through the reader 67 and the external signal input unit 60 from the storage medium 65 and to store them in the buffer storage unit 64. Therefore, no high-storage-capacity storage unit is required.

Figure 21:
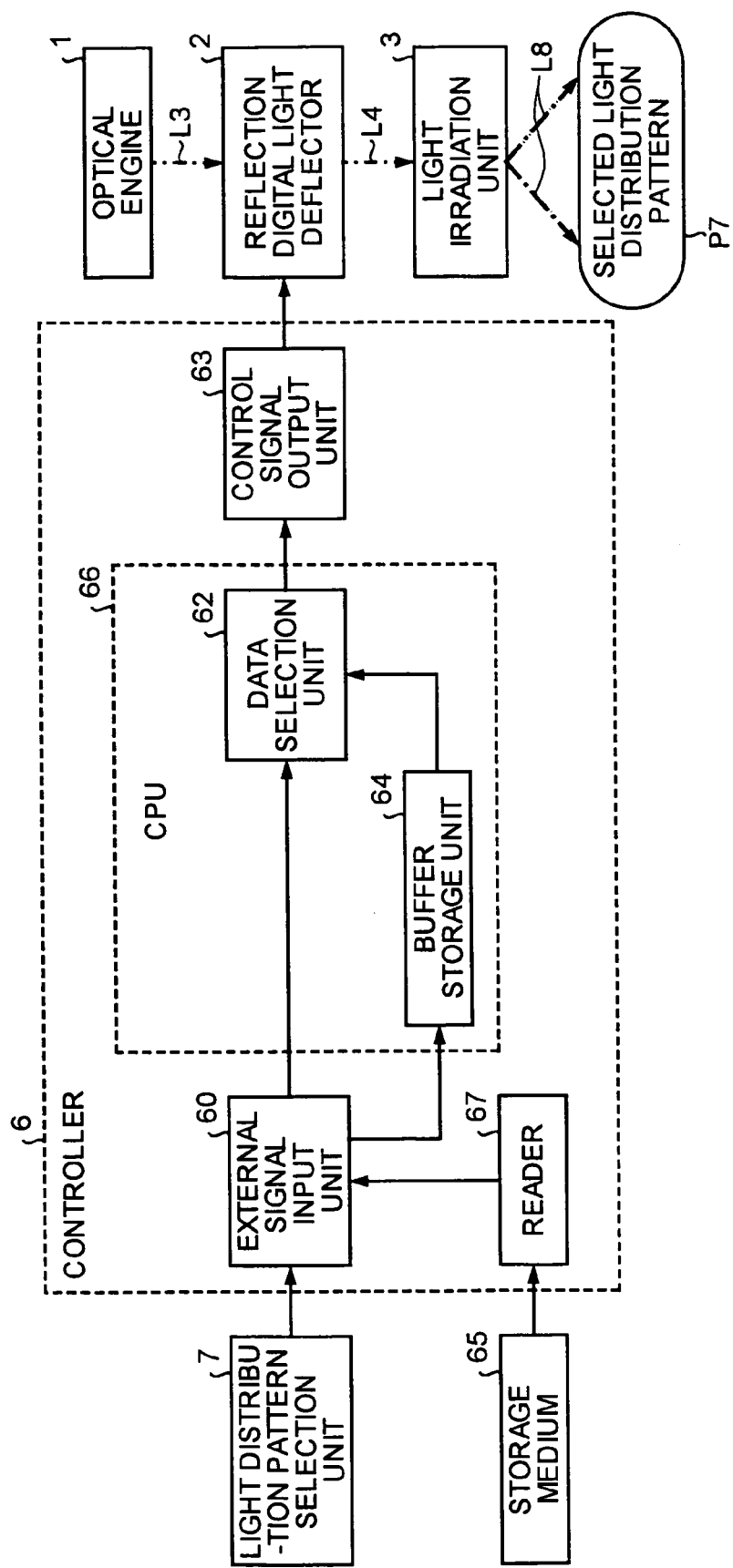
FIG. 21 is a block diagram of a digital lighting apparatus according to the second embodiment.
Figure 22:
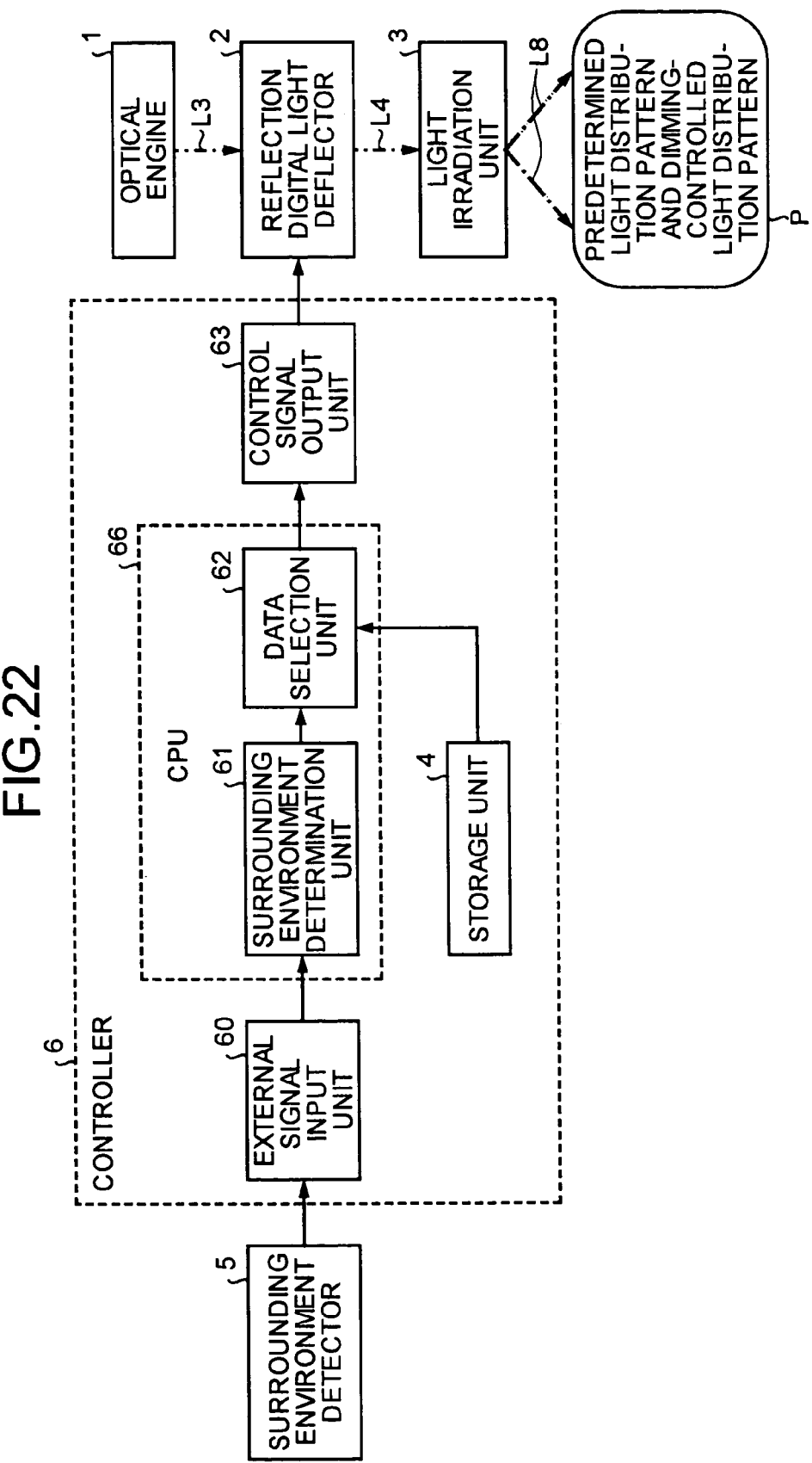
FIG. 22 is block diagram of a digital lighting system according to a third embodiment of the present invention.

FIG. 21 is a block diagram of a digital lighting apparatus according to the second embodiment. The same reference symbols as those in FIG. 1 to FIG. 20 denote the same elements.

Substantially similarly to the digital lighting system according to the second embodiment, the vehicle digital lighting apparatus according to the second embodiment employs the buffer storage unit 64 mounted in the CPU 66 of the controller 6 as the storage unit. As shown in FIG. 21, the buffer storage unit 64 is connected to the external signal input unit and the data selection unit 62. The reader 67 that reads the data stored in the storage unit 65 shown in FIG. 20 is connected to the external signal input unit 60.

Substantially similarly to the digital lighting system according to the second embodiment, the vehicle digital lighting apparatus according to the second embodiment can read and store the pieces of digital data on the light distribution patterns in groups according to regions and countries that are stored in the storage medium 65 in the buffer storage unit 64 through the reader 67 and the external signal input unit 60.

Therefore, substantially similarly to the digital lighting system according to the second embodiment, the vehicle digital lighting apparatus according to the second embodiment can attain the following advantages. Since the pieces of digital data on the light distribution patterns according to regions and countries where vehicles are running are obtained, there is no need to design and manufacture digital lighting apparatuss for the respective regions and countries but one vehicle digital lighting apparatus can be applied to many regions and countries. Further, according to the vehicle digital lighting apparatus according to the second embodiment substantially similarly to the digital lighting system according to the second embodiment, it suffices to read the pieces of digital data on the light distribution patterns for relevant regions and countries through the reader 67 and the external signal input unit 60 from the storage medium 65 and to store them in the buffer storage unit 64. Therefore, no high-storage-capacity storage unit is required.

FIG. 22 to FIG. 30B are schematic diagrams for illustrating a digital lighting system according to a third embodiment of the present invention. The same reference symbols as those in FIG. 1 to FIG. 21 denote the same elements.

The digital lighting system according to the third embodiment can decrease or increase a light intensity of a predetermined light distribution pattern, whereby the system can improve durability of the discharge lamp 10 (see FIG. 2) of the optical engine 1 and contribute to traffic safety.

The storage unit 4 stores pieces of digital data on a plurality of light distribution patterns and pieces of digital data for dimming control so as to increase or decrease the light intensity of the predetermined light distribution pattern. Examples of the dimming control digital data include digital data for the vehicle waiting at a stoplight, that for daytime, that for nighttime, that for the highway, that for the general road, that for suburbs, and that for the urban district. The pieces of digital data on the light distribution patterns store in the storage unit 4 and those for dimming control are grouped according to regions and countries where vehicles are running.

Figure 15:
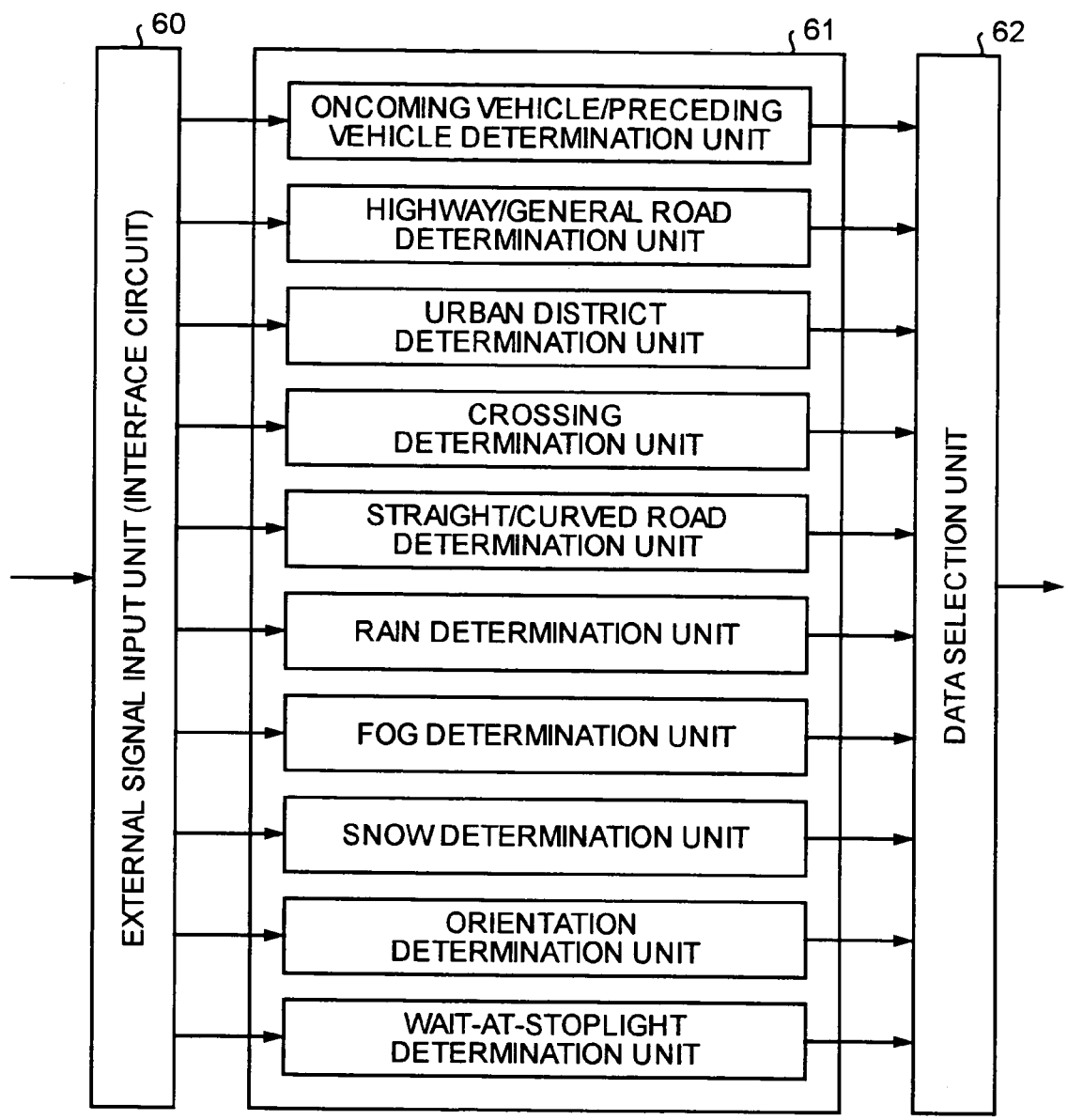
FIG. 15 is a block diagram of a surrounding environment determination unit of the digital lighting system according to the first embodiment.
Figure 16:
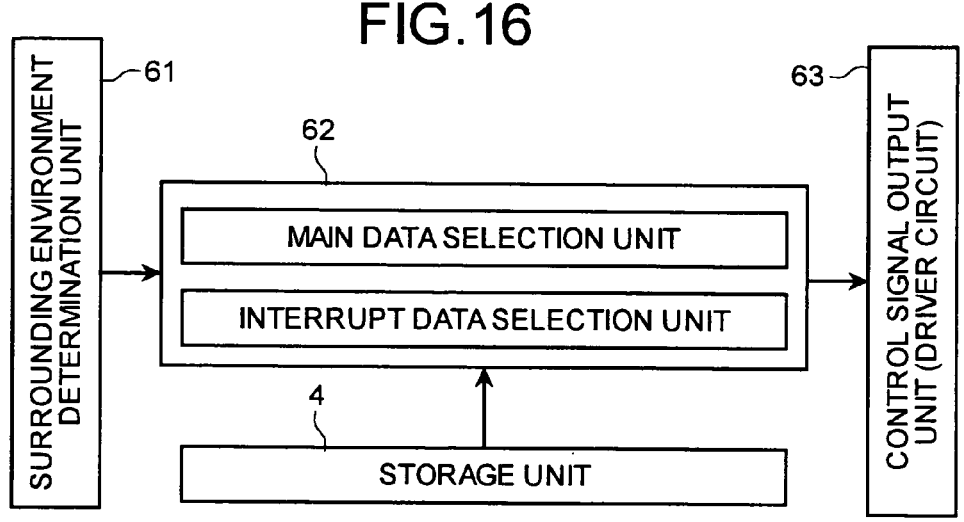
FIG. 16 is a block diagram of a data selection unit of the digital lighting system according to the first embodiment.
Figure 23:
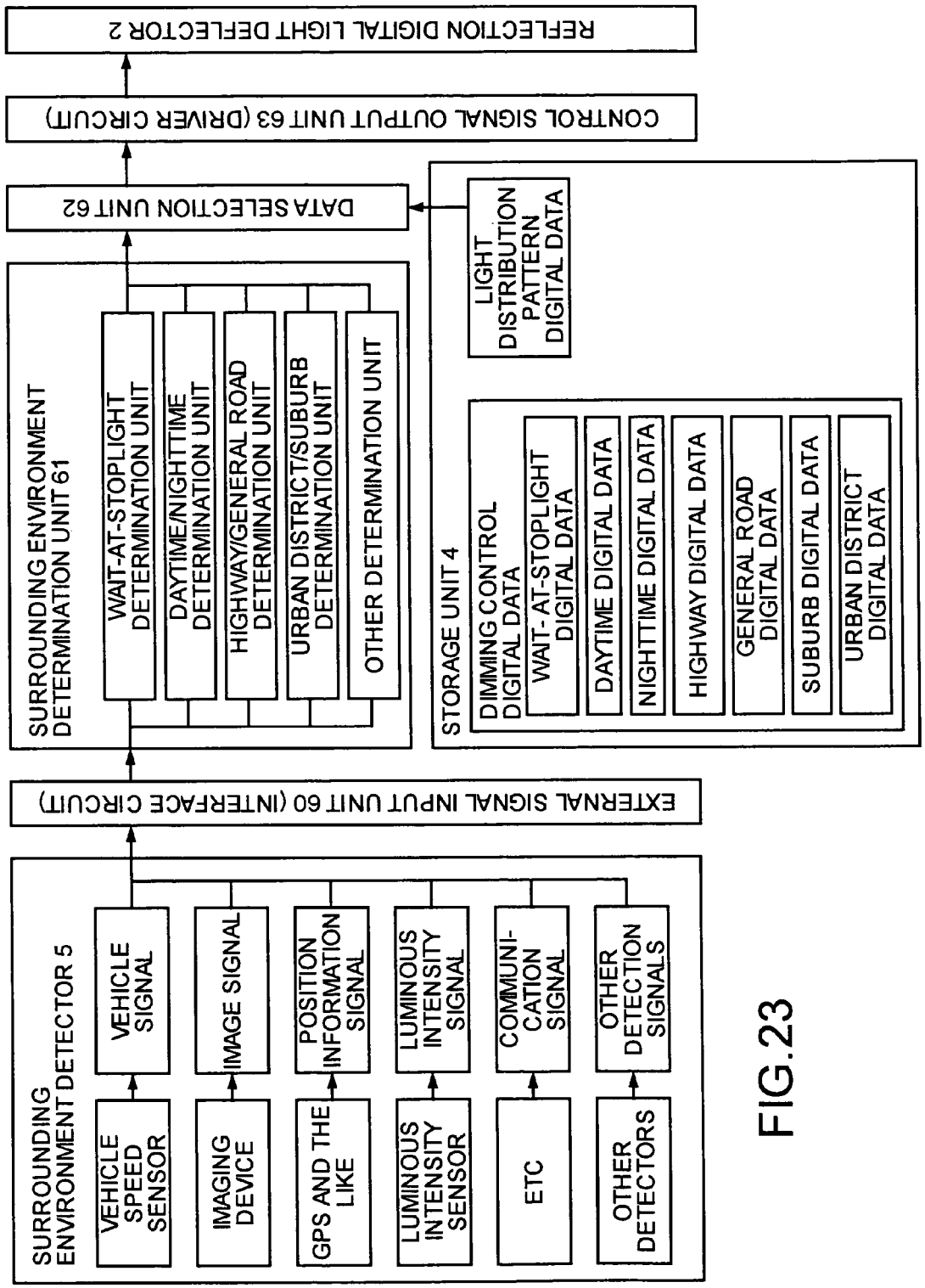
FIG. 23 is a block diagram for illustrating light distribution data, a storage medium, a reader, and a controller of the digital lighting system according to the third embodiment.
Figure 24:
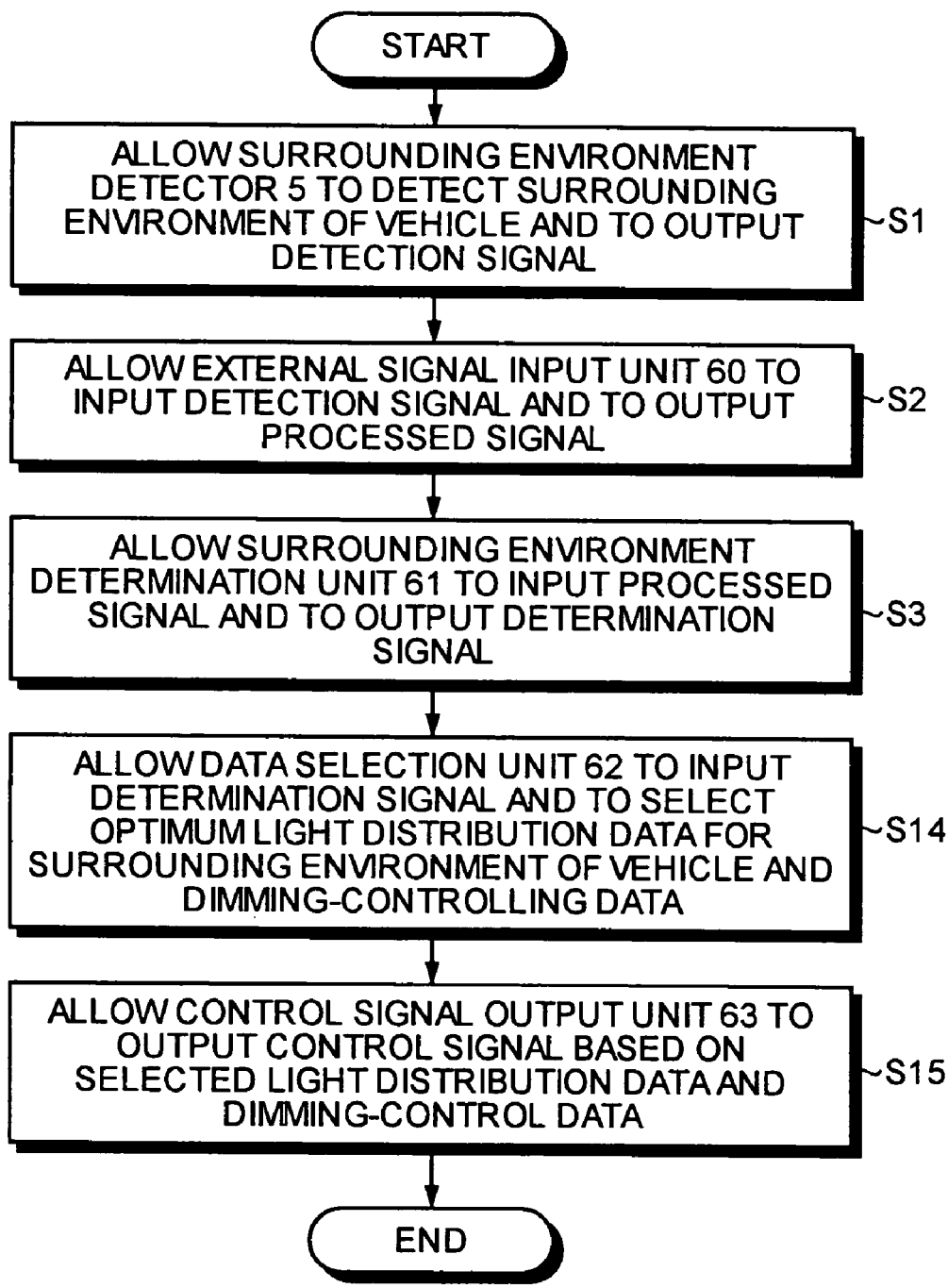
FIG. 24 is a flowchart of operation of the digital lighting system according to the third embodiment.

The surrounding environment determination unit 61 additionally includes a daytime/nighttime determination unit shown in FIG. 23 as well as the respective determination units shown in FIG. 15. The daytime/nighttime determination unit determines whether it is daytime or nighttime based on at least one of the luminous intensity signal obtained by detecting the brightness of the surroundings of the vehicle by the luminous intensity sensor of the surrounding environment detector 5 and output from the luminous intensity sensor and the image signal obtained by imaging the surrounding information on the vehicle by the imaging device of the surrounding environment detector 5 and output from the imaging device, and outputs a daytime signal or a nighttime signal.

Functions of the digital lighting system according to the third embodiment are explained with reference to FIG. 24 to FIG. 30B.

The surrounding environment detector 5 detects the surrounding environment of the vehicle and outputs the detection signal (at S1). The external signal input unit 60 inputs the detection signal and outputs the processing signal (at S3). The steps executed so far are substantially equal to the steps S1, S2, and S3 for the digital lighting system according to the first embodiment shown in FIG. 17.

At the step S3, the surrounding environment determination unit 61 executes the following first to eleventh determination steps, the first determination step executed by the wait-at-stoplight determination unit, the second determination step executed by the daytime/nighttime determination unit, the third determination step executed by the highway/general road determination unit, the fourth determination step executed by the urban district/suburb determination unit (which is denoted as the urban district determination unit in FIG. 15), the fifth determination step executed by the oncoming vehicle/preceding vehicle determination unit, the sixth determination step executed by the crossing determination unit as one of the other determination units, the seventh determination step executed by the straight/curved road determination unit as one of the other determination units, the eighth determination step executed by the rain determination unit as one of the other determination units, the ninth determination step executed by the fog determination unit as one of the other determination units, the tenth determination step executed by the snow determination unit as one of the other determination units, and the eleventh determination step executed by the orientation determination unit as one of the other determination units. These determination steps are substantially equal to the determination steps for the vehicle digital lighting apparatus according to the first embodiment shown in FIG. 15 except for the second determination step executed by the daytime/nighttime determination unit. The determination steps executed by the other determination units of the surrounding environment determination unit 61 may include at least one of the fifth to eleventh determination steps or includes the other determination steps.

If the determination signal is input to the data selection unit 62, the data selection unit 62 selects the digital data on the optimum light distribution pattern for the surrounding environment of the vehicle from among pieces of digital data on the light distribution patterns stored in the storage unit 4 based on the determination signal of each determination unit in the surrounding environment determination unit 5 (at S14). Namely, the main data selection unit of the data selection unit 62 selects the digital data on the light distribution pattern optimum for the surrounding environment of the vehicle and the dimming control digital data from among the pieces of digital data on the light distribution patterns and those for dimming control, respectively, stored in the storage unit 4 based on the determination signals from the daytime/nighttime determination unit, the highway/general road determination unit, the urban district/suburb determination unit, and the other determination units included in the surrounding environment determination unit 61. The selection of the light distribution data made by this main data selection unit is substantially equal to the selection made by the vehicle digital lighting apparatus according to the first embodiment except for "15. daytime light distribution data" and "16. nighttime light distribution data". The selection of the "15. daytime light distribution data" and "16. nighttime light distribution data" is made based on the determination of the daytime/nighttime determination unit. Namely, if the daytime/nighttime determination unit determines that it is daytime, the main data selection unit selects the "15. daytime light distribution data". If the daytime/nighttime determination unit determines that it is nighttime, the main data selection unit selects the "16. nighttime light distribution data".

It is assumed herein that if the vehicle digital lighting apparatus illuminates the road surface and the like based on the light distribution data and the dimming control data selected by the main data selection unit of the data selection unit 62, the wait-at-stoplight determination unit of the surrounding environment determination unit 61 determines that the vehicle is waiting at a stoplight. If so, the interrupt data selection unit of the data selection unit 62 halts and interrupts the selection of the main data selection unit and selects the digital data on the vehicle is waiting at a stoplight from among the pieces of digital data for dimming control stored in the storage unit 4 based on the determination signal from the wait-at-stoplight determination unit. In other words, an interrupt routine performed by the interrupt data selection unit is established against a main routine performed by the main data selection unit. After this interrupt routine is completed, the main data selection unit performs the main routine again.

Referring back to FIG. 24, if the data selection unit 62 selects the digital data on the optimum light distribution pattern for the surrounding environment of the vehicle and the dimming control digital data based on the determination of the surrounding environment determination unit 61, the driver circuit of the control signal output unit 63 outputs the control signal for individually, digitally controlling switchover of the tilt angles of the minimum mirror elements 25 (see FIG. 5 to FIG. 8) to the reflection digital light deflector 2 based on the digital data on the optimum light distribution pattern for the surrounding environment of the vehicle (light distribution data) and the digital data for dimming control (dimming control digital data) selected by the data selection unit 62 (at S15).

If the controller 6 outputs the control signal to the reflection digital light deflector 2, the reflection digital light deflector 2 controls ON and OFF switching of the many micro mirror elements 25 based on the control signal, i.e., the digital data on the optimum light distribution pattern for the surrounding environment of the vehicle and the dimming control digital data. The vehicle digital lighting apparatus according to the third embodiment can automatically select the optimum light distribution pattern for the surrounding environment of the vehicle and the dimming-controlled light distribution pattern P and illuminate the road surface and the like in the selected optimum light distribution pattern for the surrounding environment of the vehicle and the dimming-controlled light distribution pattern P.

Controlling (that is, dimming control) of the light intensity (luminous intensity) of the predetermined light distribution pattern to be decreased or increased based on the dimming control digital data will be explained. In the dimming control in this example, a duty ratio of an ON signal pulse width or that of an OFF signal pulse width of the reflection digital light deflector 2 is increased or decreased relative to the time axis by binary pulse width modulation.

The dimming control over the light distribution pattern for the vehicle is waiting at a stoplight will be explained with reference to FIG. 25 and FIG. 26.

The dimming control over the light distribution pattern for the vehicle is waiting at a stoplight is started when the vehicle that illuminates the road surface and the like in the predetermined light distribution pattern stops at the red signal. Since the vehicle starts waiting at a stoplight until predetermined luminous intensity increase time (e.g., between a fraction of a few second to a few seconds), the light intensity (luminous intensity) of the predetermined light distribution pattern is gradually decreased to zero. During this luminous intensity increase time, the dimming control is conducted so that the duty ratio of the ON signal pulse width of the reflection digital light deflector 2 is gradually decreased to zero percent relative to the time axis for one to two seconds or so that the duty ratio of the OFF signal pulse width is gradually increased to 100 percents relative to the time axis for one to two seconds.

Further, since the vehicle starts running at the green light, i.e., finishes stopping at the traffic light, until predetermined luminous intensity increase time (far shorter than the luminous intensity decrease time), the light intensity (luminous intensity) of the predetermined light distribution pattern is instantly increased from zero to its original state. During this luminous intensity increase time, the dimming control is conducted so that the duty ratio of the ON signal pulse width of the reflection digital light deflector 2 is instantly increased relative to the time axis or so that the duty ratio of the OFF signal pulse width is instantly decreased down to a predetermined value relative to the time axis by the binary pulse width modulation. This dimming control over the light distribution pattern for the vehicle waiting at a stoplight is performed by the interrupt routine by interrupting the main routine. If the interrupt routine is completed, the main routine starts again.

Thus, this dimming control over the light distribution pattern for the vehicle waiting at a stoplight enables the light intensity of the predetermined light distribution pattern to be set at a predetermined value while the vehicle is waiting at a stoplight and to return to the original state when the vehicle starts up from a standstill without changing the output of the discharge lamp 100. Therefore, it is ensured that the durability of the discharge lamp can be improved. Besides, while the vehicle is waiting at a stoplight, the vehicle does not cast any glare at the oncoming vehicle and pedestrians, which is preferable for traffic safety. The light intensity of the light distribution pattern while the vehicle is waiting at a stoplight is set at zero, close to zero or a value which is decreased from the light intensity of the moving vehicle and at which the vehicle does not cast any glare at the driver of oncoming vehicle, the driver of the preceding vehicle, and the pedestrians.

The dimming control for daytime and nighttime will be explained with reference to FIG. 27A, FIG. 27B, FIG. 28A, and FIG. 28B.

Figure 27A:
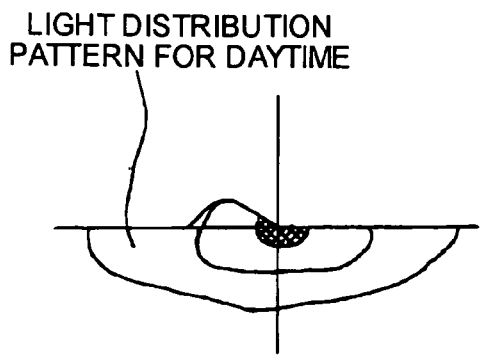
FIG. 27A is a schematic diagram of a light distribution pattern for daytime in the digital lighting system according to the third embodiment.
Figure 27B:
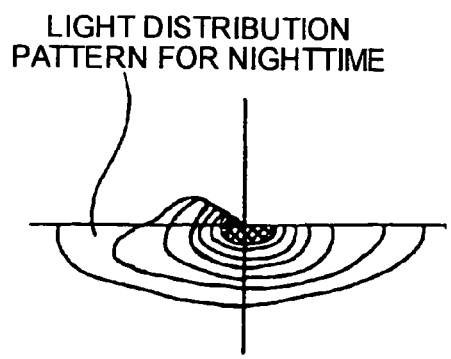
FIG. 27B is a schematic diagram of a light distribution pattern for nighttime in the digital lighting system according to the third embodiment.
Figure 28A:
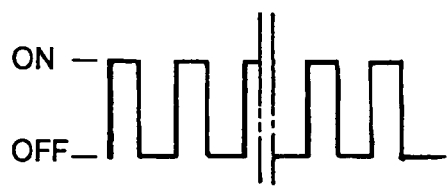
FIG. 28A is a schematic diagram for illustrating the dimming control over the light distribution pattern for daytime by increasing or decreasing the duty ratio of the ON signal pulse width or that of the OFF signal pulse width based on the binary pulse width modulation.
Figure 28B:
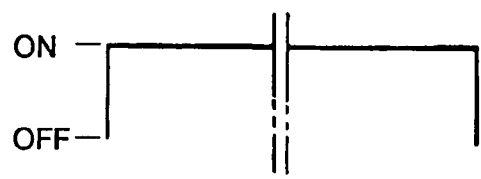
FIG. 28B is a schematic diagram for illustrating the dimming control over the light distribution pattern for nighttime by increasing or decreasing the duty ratio of the ON signal pulse width or that of the OFF signal pulse width based on the binary pulse width modulation.

At daytime, the light intensity (luminous intensity) of the predetermined light distribution pattern for nighttime shown in FIG. 27B is decreased to a predetermined value, e.g., 40 percents. To do so, the dimming control is conducted so that the duty ratio of the ON signal pulse width of the reflection digital light deflector 2 is decreased from 100 percents shown in FIG. 28B to 40 percents shown in FIG. 28A by the binary pulse width modulation.

At nighttime, the light intensity (luminous intensity) of the predetermined light distribution pattern for daytime shown in FIG. 27A is increased to a predetermined value, e.g., 100 percents. To do so, the dimming control is conducted so that the duty ratio of the ON signal pulse width of the reflection digital light deflector 2 is decreased from 100 percents shown in FIG. 28B to 40 percents shown in FIG. 28A by the binary pulse width modulation.

Thus, the dimming control for daytime and nighttime enables the light intensity (luminous intensity) of the predetermined light distribution pattern for nighttime shown in FIG. 27B to be decreased at daytime without changing the output of the discharge lamp 10 to thereby obtain the predetermined daytime-dedicated light distribution pattern shown in FIG. 27A. The dimming control for daytime and nighttime also enables the light intensity (luminous intensity) of the predetermined light distribution pattern for daytime shown in FIG. 27A to be increased at nighttime without changing the output of the discharge lamp 10 to thereby obtain the predetermined nighttime-dedicated light distribution pattern shown in FIG. 27B. Therefore, it is ensured that the durability of the discharge lamp 10 can be increased. Besides, the predetermined daytime-dedicated light distribution pattern, i.e., the light distribution pattern for a daytime running lamp (DRL) can be obtained, whereby the presence of the vehicle can be visually recognized by the drivers of the other vehicles and the pedestrians, which is preferable for traffic safety.

The dimming control for the general road and the highway will be explained with reference to FIG. 29A, FIG. 29B, FIG. 30A, and FIG. 30B. If the vehicle is running on the highway, the light intensity (luminous intensity) of the predetermined light distribution pattern for the general road shown in FIG. 29A, (e.g., the light distribution pattern for the vehicle passing by the other vehicle) is increased by a predetermined value, e.g., to 100 percents. For this increase of the luminous intensity, the dimming control is conducted so that the duty ratio of the ON signal pulse width of the reflection digital light deflector 2 is increased to 100 percents shown in FIG. 30B from 80 percents shown in FIG. 30A. The highest light intensity (highest luminous intensity) of a hot zone HZ of the light distribution pattern for the vehicle running on the highway (e.g., the light distribution pattern for the vehicle passing by the other vehicle) the luminous intensity of which pattern is thus increased is 1.5 times as high as the highest light intensity (highest luminous intensity) of a hot zone HZ of the light distribution pattern for the vehicle running on the ordinary road. In addition, the hot zone HZ of the light distribution pattern for the vehicle running on the highway the luminous intensity of which pattern is thus increased is located at a point 75 meters ahead of the vehicle.

Figure 29A:
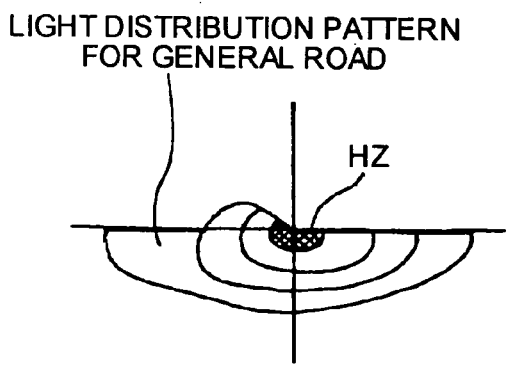
FIG. 29A is a schematic diagram of a light distribution pattern for a general road in the digital lighting system according to the third embodiment.
Figure 29B:
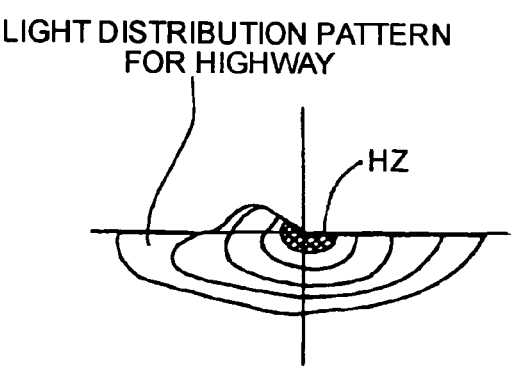
FIG. 29B is a schematic diagram of a light distribution pattern for a highway in the digital lighting system according to the third embodiment.
Figure 30A:
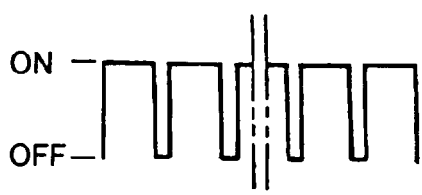
FIG. 30A is a schematic diagram for illustrating the dimming control over the light distribution pattern for the general road by increasing or decreasing the duty ratio of the ON signal pulse width or that of the OFF signal pulse width based on the binary pulse width modulation.
Figure 30B:
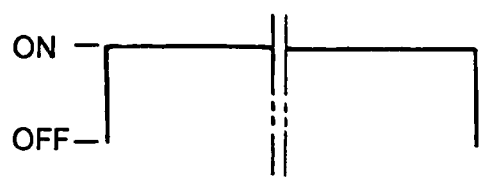
FIG. 30B is a schematic diagram for illustrating the dimming control over the light distribution pattern for the highway by increasing or decreasing the duty ratio of the ON signal pulse width or that of the OFF signal pulse width based on the binary pulse width modulation.

If the vehicle is running on the general road, the light intensity (luminous intensity) of the predetermined light distribution pattern for the highway shown in FIG. 29B is decreased to a predetermined value, e.g., to 80 percents. For this decrease of the luminous intensity, the dimming control is conducted so that the duty ratio of the ON signal pulse width of the reflection digital light deflector 2 is decreased to 80 percents shown in FIG. 30A from 100 percents shown in FIG. 30B. The dimming control for the urban district and the suburb is substantially equal to that for the general road and the highway.

Thus, the dimming control for the general road and the highway enables the light intensity of the predetermined light intensity pattern for the general road to be increased without changing the output of the discharge lamp 10 while the vehicle is running on the highway to thereby obtain the predetermined light distribution pattern for the highway. In addition, the dimming control for the general road and the highway enables the light intensity of the predetermined light intensity pattern for the highway to be decreased without changing the output of the discharge lamp 10 while the vehicle is running on the general road to thereby obtain the predetermined light distribution pattern for the general road. Therefore, it is ensured that the durability of the discharge lamp 10 can be improved. Besides, since the predetermined highway-dedicated light distribution pattern and the predetermined general road-dedicated light distribution pattern can be obtained, the predetermined light distribution pattern can be controlled finely, which is preferable for traffic safety.

The advantages of the digital lighting system according to the third embodiment, which is constituted as explained above, will be explained.

The digital lighting system according to the third embodiment can control the reflection digital light deflector 2 based on the digital data for dimming control to decrease or increase the light intensity of the predetermined light distribution pattern without changing the output of the discharge lamp 10. Therefore, the durability of the discharge lamp 10 can be improved. The digital lighting system according to the third embodiment can increase or decrease the light intensity of the predetermined light distribution pattern according to the surrounding condition of the vehicle, the road condition, or the like. Therefore, it is possible to obtain the light intensity of the light distribution pattern according to the surrounding condition of the vehicle, the road condition, or the like, which is preferable for traffic safety.

The digital lighting system according to the third embodiment can automatically select the optimum predetermined light distribution pattern for the surrounding environment of the vehicle and the light intensity of the light distribution pattern and constantly illuminate the road surface and the like in the optimum predetermined light distribution pattern for the surrounding environment of the vehicle at the light intensity of the light distribution pattern, which is preferable for traffic safety.

The digital lighting system according to the third embodiment decreases or increases the duty ratio of the ON signal pulse width or that of the OFF signal pulse width by the binary pulse width modulation. Therefore, the digital lighting system can surely, smoothly decrease or increase the light intensity of the predetermined light distribution pattern.

FIG. 31 is a block diagram of a digital lighting apparatus according to the third embodiment. The same reference symbols as those in FIG. 1 to FIG. 30 denote the same elements.

The digital lighting system according to the third embodiment automatically selects the optimum predetermined light distribution pattern for the surrounding environment of the vehicle and dimming-controlled light distribution pattern P, and illuminates the road surface and the like in the selected predetermined light distribution pattern and dimming-controlled light distribution pattern P. The vehicle digital lighting apparatus according to the third embodiment, by contrast, allows the driver to select the predetermined light distribution pattern and dimming-controlled light distribution pattern P using a light distribution pattern and dimming control selection unit 70 to thereby illuminate the road surface and the like in the selected predetermined light distribution pattern and dimming-controlled light distribution pattern P.

Namely, the digital lighting system according to the third embodiment automatically selects the optimum predetermined light distribution pattern for the surrounding environment of the vehicle and dimming-controlled light distribution pattern P using the surrounding environment detector 5 (see FIG. 22), the surrounding environment determination unit 61 (see FIG. 22), and the like. The vehicle digital lighting apparatus according to the third embodiment, by contrast, allows the driver to select the predetermined light distribution pattern and dimming-controlled light distribution pattern P using the light distribution pattern and dimming control selection unit 70.

The light distribution pattern and dimming control selection unit 70 is connected to the external signal input unit 60 in the controller 6. The external signal input unit 60 is connected to the data selection unit 62 in the CPU 66. The light distribution pattern and dimming control selection unit 70 allows the driver to select the light distribution pattern and dimming-controlled light intensity pattern P for illuminating the road surface and the like, and outputs a selection signal based on driver's selection to the external signal input unit 60 of the controller 6.

The functions and advantages of the vehicle digital lighting apparatus according to the third embodiment, which is constituted as explained above, will be explained.

The driver selects select the light distribution pattern and dimming-controlled light intensity pattern P for illuminating the road surface and the like using the light distribution pattern and dimming control selection unit 70. If so, the light distribution pattern and dimming control selection unit 70 outputs the selection signal based on the driver's selection to the external signal input unit 60. The interface circuit of this external signal input unit 60 inputs the external signal such as the selection signal from the light distribution pattern and dimming control selection unit 70, processes the signal to a signal that can be handled by the controller 6, and outputs the processing signal to the data selection unit 62.

The data selection unit 62 selects the digital data on the driver's selected light distribution pattern and the digital data for dimming control from among the pieces of digital data on the light distribution patterns and pieces of digital data for dimming control stored in the storage unit 4, respectively, based on the selection signal from the light distribution pattern and dimming control selection unit 70.

The driver circuit of the control signal output unit 63 outputs the control signal for individually, digitally controlling switchover of the tilt angles of the minimum mirror elements 25 (FIG. 5 to FIG. 8) to the reflection digital light deflector 2 based on the digital data on the light distribution pattern and dimming control data selected by the data selection unit 62.

If the controller 6 outputs the control signal to the reflection digital light deflector 2, the reflection digital light deflector 2 controls ON and OFF switching of the many micro mirror elements 25 based on the control signal, i.e., the digital data on the light distribution pattern and dimming control data selected by the driver. The vehicle digital lighting apparatus according to the third embodiment can thereby illuminate the road surface and the like in the light distribution pattern and dimming-controlled light distribution pattern P selected by the driver. For example, the driver selects the light distribution pattern for the general road, the straight road, the running vehicle, and daytime using the light distribution pattern and dimming control selection unit 70. If so, the data selection unit 62 selects "1. light distribution pattern data for general road, straight road, and running vehicle" and "digital data for daytime" from the storage unit 4. The reflection digital light deflector 2 is controlled based on the "1. light distribution pattern data for general road, straight road, and running vehicle" and the "digital data for daytime", whereby the vehicle digital lighting apparatus can illuminate the road surface and the like in the driver's selected light distribution pattern P for the general road, the straight road, the running vehicle, and daytime.

Figure 2:
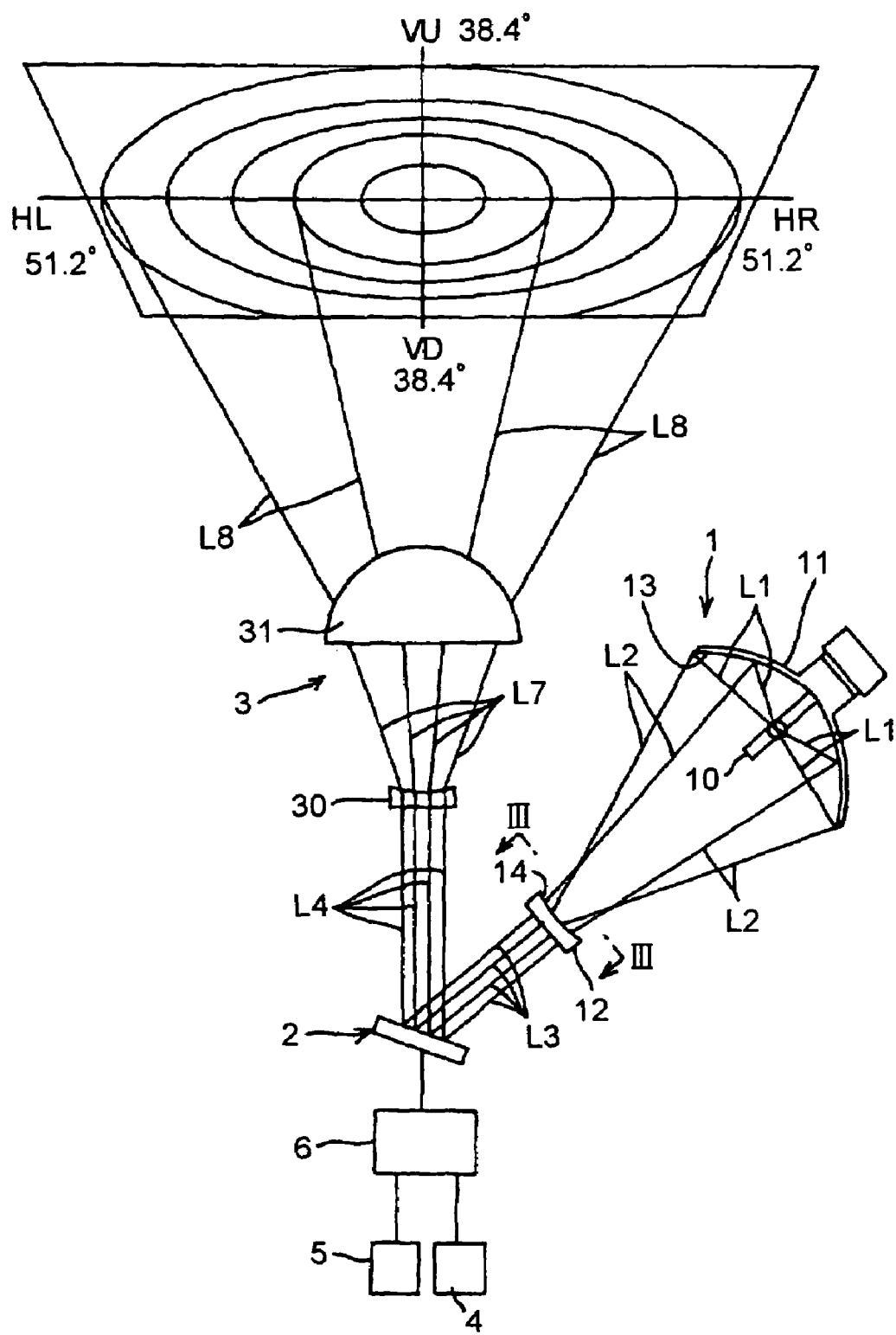
FIG. 2 is a schematic diagram of an optical engine and a light irradiation unit of the digital lighting apparatus according to the first embodiment.
Figure 3:
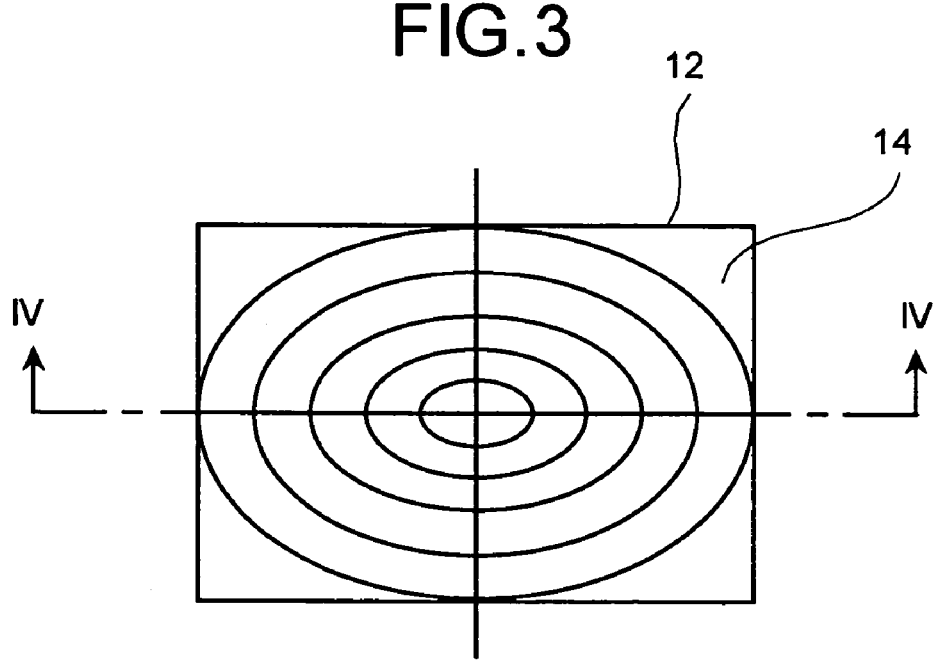
FIG. 3 is an iso-intensity diagram of a luminous intensity distribution of light along a line III—III of FIG. 2.
Figure 4:
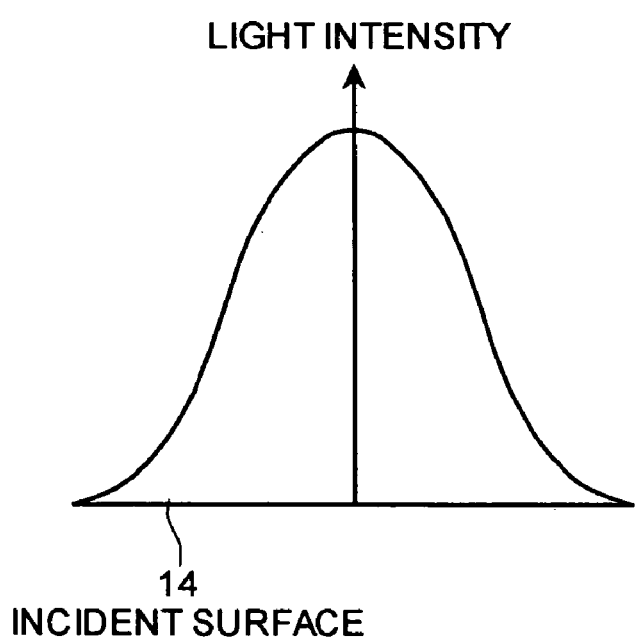
FIG. 4 is a plot of a luminous intensity distribution of the light along a line IV—IV of FIG. 3.
Figure 5:
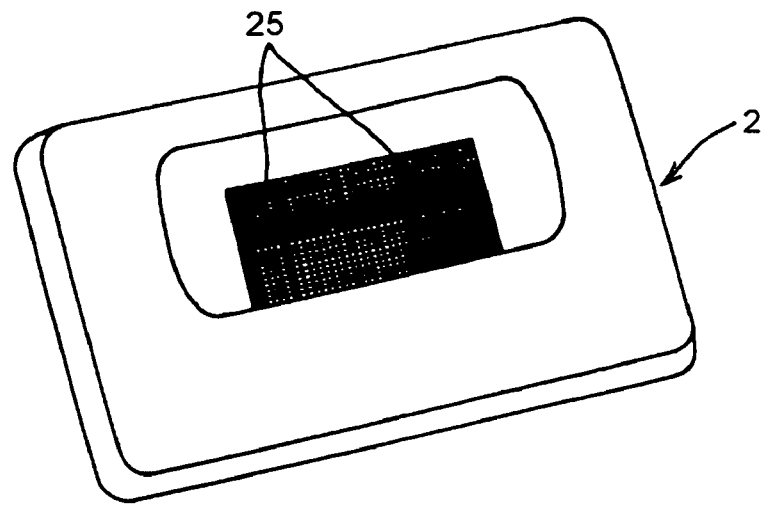
FIG. 5 is a perspective view of a reflection type digital light deflector of the digital lighting apparatus according to the first embodiment.
Figure 6:
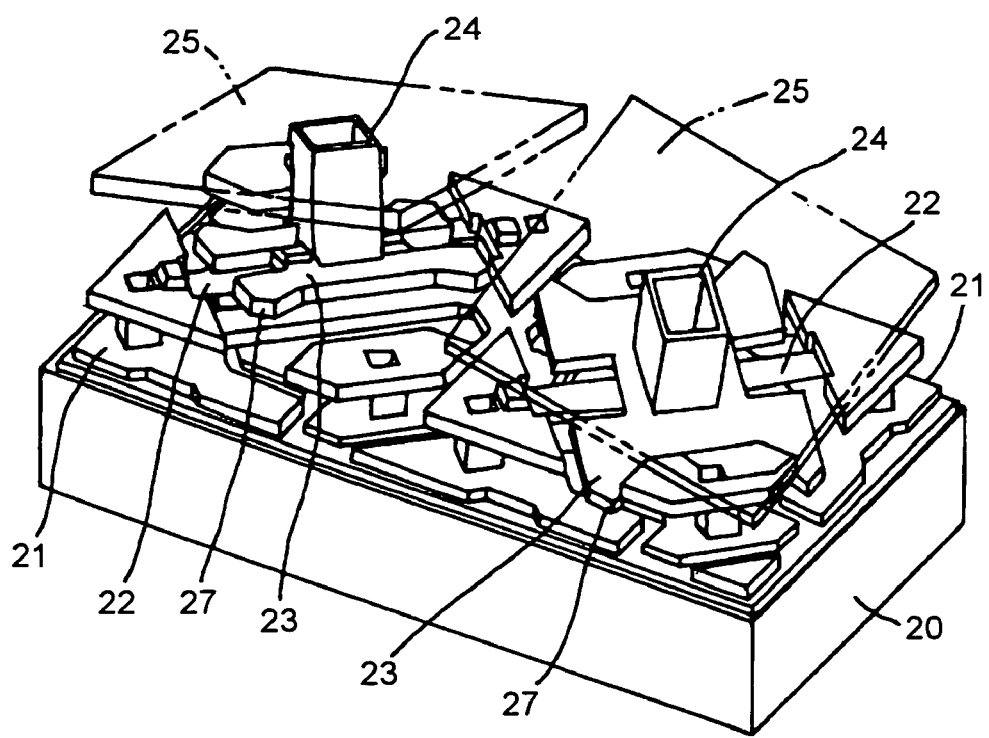
FIG. 6 is a partially enlarged view of the reflection type digital light deflector.
Figure 7:
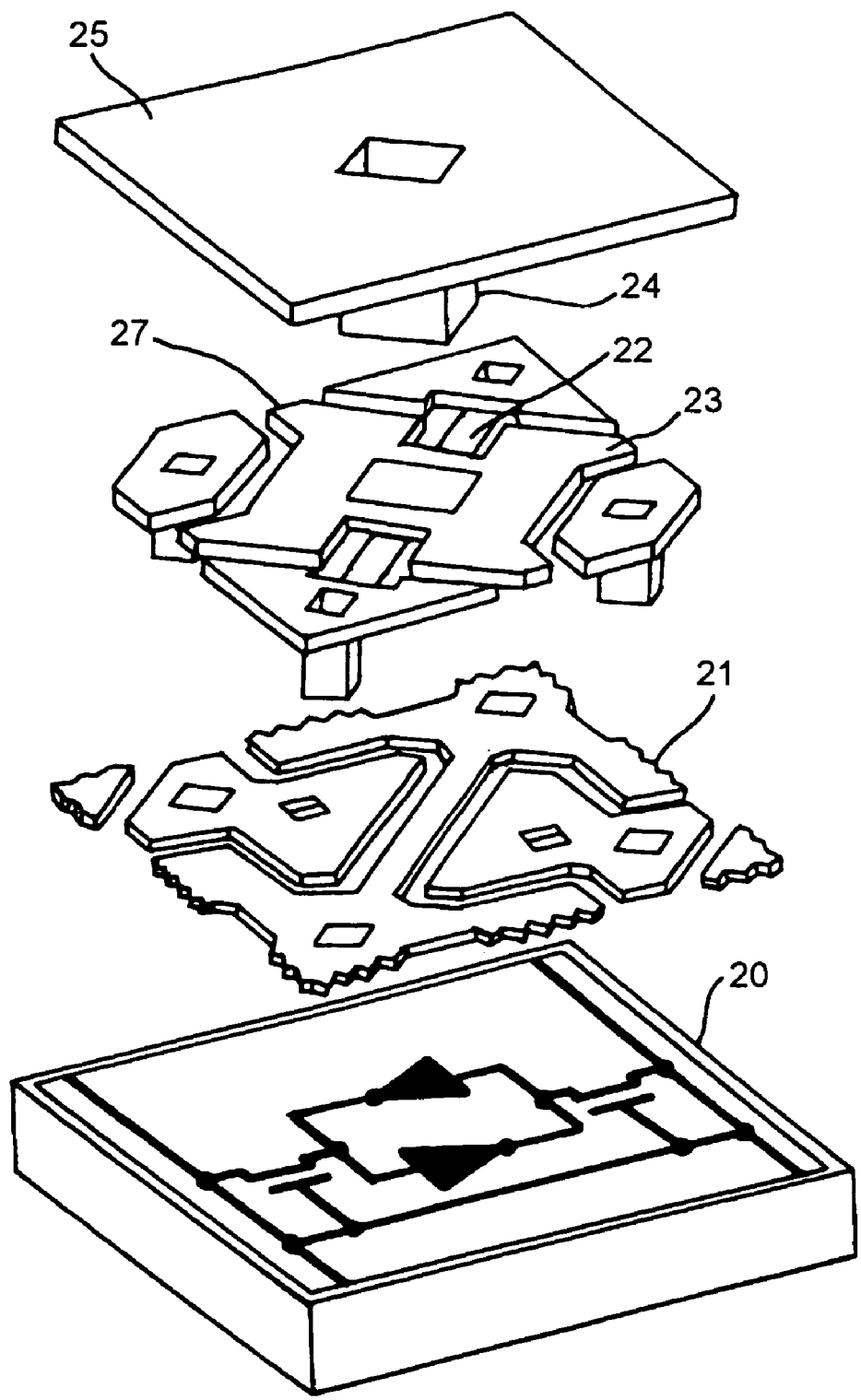
FIG. 7 is a partially enlarged assembly view of the reflection type digital light deflector.

Thus, the vehicle digital lighting apparatus according to the third embodiment can control the reflection digital light deflector 2 based on the dimming control data to decrease or increase the light intensity of the predetermined light distribution pattern without changing the output of the discharge lamp (see FIG. 2). Therefore, the durability of the discharge lamp 10, is improved. In addition, the vehicle digital lighting apparatus according to the third embodiment can increase or decrease the light intensity of the predetermined light distribution pattern according to the surrounding condition of the vehicle, the road condition of the vehicle, or the like. Therefore, it is possible to obtain the light intensity of the light distribution pattern according to the surrounding condition of the vehicle, the road condition of the vehicle, or the like, which advantage is preferable for traffic safety.

The vehicle digital lighting apparatus according to the third embodiment particularly allows the driver to conduct the functions of the surrounding environment detector 5 and the surrounding environment determination unit 61 of the digital lighting system according to the third embodiment. Therefore, the vehicle digital lighting apparatus can dispense with the surrounding environment detector 5 and the surrounding environment determination unit 61 and manufacturing cost can be reduced, accordingly.

FIG. 32 and FIG. 33 are block diagrams of the digital lighting system according to a fourth embodiment of the present invention. The same reference symbols as those in FIG. 1 to FIG. 31 denote the same elements.

Since one digital lighting system in this fourth embodiment can be applied to many regions and countries, manufacturing cost can be reduced accordingly.

The pieces of digital data on light distribution patterns stored in the storage unit 4 are stored in units of groups according to regions and countries where vehicles are running. Namely, the pieces of digital data are hierarchized to, for example, region directories, country directories, and light distribution data directories as shown in FIG. 32.

The region directories include, for example, directories of "1. North America", "2. Central America", "3. South America", "4. Southeast Asia", "6. Fareast Asia", "7. Middle and Near East Asia", "8. Europe", "9. Australia", "10. Africa", etc. Numbers "1" to "10" are region codes. The country directories include, for example, directories of "1. Canada" and "2. USA" in the region of "1. North America", and "1. Russia", "2. Japan", "3. South Korea", "4. North Korea", "5. China", etc. in the region of "6. Fareast Asia". Numbers "1" to "5" are country codes. Further, the pieces of digital data on the light distribution patterns are digital data on a combination of various light distribution patterns. For example, "1. light distribution pattern data for general road, straight road, and running vehicle", "2. light distribution pattern data for general road, straight road, and vehicle passing by the other vehicle", "3. light distribution pattern data for urban district, straight road, and vehicle passing by the other vehicle", "4. light distribution pattern data for highway, straight road, and vehicle passing by the other vehicle", "5. light distribution pattern data for highway, curved road, and vehicle passing by the other vehicle", etc. Numbers "1" to "5" are region codes.

The surrounding environment detector 5 includes a GPS receiver (e.g., a car navigation system) that receives a position information signal output from a GPS or a terrestrial station (e.g., an electronic reference point) and other detection units.

The surrounding environment determination unit 61 includes a region and country determination unit that determines a region and a country based on the position information signal received by the GPS receiver of the surrounding environment detector 5 and that outputs a region code or a country code, and other determination units. The other determination units include at least one of, for example, the oncoming vehicle/preceding vehicle determination unit, the highway/general road determination unit, the urban district determination unit, the crossing determination unit, the straight/curved road determination unit, the rain determination unit, the fog determination unit, and the snow determination unit as shown in, for example, FIG. 15.

The data selection unit 62 selects the optimum light distribution pattern for the surrounding environment of the vehicle from among the pieces of digital data on the light distribution patterns stored in the storage unit 4 according to the region code and country code from the region and country determination unit and the light distribution code based on the determination signals from the other determination units in order of the region directory, the country directory, and the light distribution directory.

The functions of the digital lighting system according to the fourth embodiment, which is constituted as explained above, will be explained with reference to FIG. 33.

The surrounding environment detector 5 detects the surrounding environment of the vehicle, e.g., the region and the country where the vehicle is running, the region condition, the road condition, and the weather condition, and outputs the detection signal to the controller 6 (see FIG. 1) (see the step S1 shown in FIG. 17). The detection signal includes the position information signal from the GPS receiver and the other detection signals. If the vehicle is located in a region, for example, at 36 degrees of a north latitude and 138 degrees of east longitude, the position information signal is "36N, 138E" (in NMEAO 183 format).

If the detection signal is input to the controller 6, the interface circuit of the external signal input unit 60 inputs the external signal such as each detection signal of the surrounding environment detector 5, processes the signal to a signal that can be handled by the controller 6, and outputs the processing signal to the surrounding environment determination unit 61 (see the step S2 shown in FIG. 17). If the processing signal is input to the surrounding environment determination unit 61, the surrounding environment determination unit 61 determines the surrounding environment of the vehicle based on the processing signal of the external signal input unit 60 and outputs the determination signal to the data selection unit 62 (see the step S3 shown in FIG. 17). That is, the region and country determination unit searches the region where the vehicle is located, determines that the region is "6. Fareast Asia" from the region directory, and outputs the region code "6". In addition, the region and country determination unit searches the country where the vehicle is located, determines that the country is "2. Japan" from the country directory, and outputs the country code "2". The other determination units execute the first to tenth (or eleventh) determination steps based on the other detection signals, respectively, and output, for example, the light distribution code "1" of "1. light distribution pattern data for general road, straight road, and running vehicle" based on the determination.

Alternatively, the other determination units output the region code "2" of "2. light distribution pattern data for general road, straight road, and vehicle passing by the other vehicle", "3" of "3. light distribution pattern data for urban district, straight road, and vehicle passing by the other vehicle", "4" of "4. light distribution pattern data for highway, straight road, and vehicle passing by the other vehicle", "5" of "5. light distribution pattern data for highway, curved road, and vehicle passing by the other vehicle", "6" of "6. light distribution pattern data for highway, straight road, and vehicle passing by the other vehicle", "7" of "7. light distribution pattern data for highway, curved road, and running vehicle", "8" of "8. light distribution pattern data for general road, curved road, and running vehicle passing by the other vehicle", "9" of "9. light distribution pattern data for general road, curved road, and vehicle passing by the other vehicle", "10" of "10. light distribution pattern data for general road and crossing", "11" of "11. light distribution pattern data for urban district, straight road, and running vehicle", "12" of "12. light distribution pattern data for urban district, curved road, and vehicle passing by the other vehicle", "13" of "13. light distribution pattern data for urban district, curved road, and running vehicle", or "14" of "14. light distribution pattern data for urban district and crossing". Examples of the light distribution code obtained by executing the determination step by each of the other determination units of the surrounding environment determination unit 61 and output therefrom include light distribution codes of various light distribution data depending on a combination of the executed determination steps besides the "1" to "14" codes.

If the determination signal is input to the data selection unit 62, the data selection unit 62 selects the digital data on the optimum light distribution pattern for the surrounding environment of the vehicle from among the pieces of digital data on the light distribution patterns stored in the storage unit 4 based on the determination signal of each determination unit of the surrounding environment detector 5, e.g., the region code "6" and the country code "2" from the region and country determination unit and the light distribution code "1" from the other determination units (see the step S4 shown in FIG. 17).

If the data selection unit 62 selects the digital data on the optimum light distribution pattern for the surrounding environment of the vehicle based on the determination of the surrounding environment determination unit 61, the driver circuit of the control signal output unit 63 outputs the control signal for individually, digitally controlling switchover of the tilt angles of the minimum mirror elements 25 (see FIG. 5 to FIG. 8) to the reflection digital light deflector 2 based on the digital data on the optimum light distribution pattern for the surrounding environment of the vehicle selected by the data selection unit 62 (see the step S5 shown in FIG. 17).

If the controller 6 outputs the control signal to the reflection digital light deflector 2, the reflection digital light deflector 2 controls ON and OFF switching of the many micro mirror elements 25 based on the control signal, i.e., the digital data on the optimum light distribution pattern for the surrounding environment of the vehicle. The digital lighting system according to the fourth embodiment can thereby automatically select the optimum light distribution pattern P5 (see FIG. 1) for the surrounding environment of the vehicle and illuminate the road surface and the like in this selected optimum light distribution pattern P5 for the surrounding environment of the vehicle.

The advantages of the digital lighting system according to the fourth embodiment, which is constituted as explained above, will be explained.

The digital lighting system according to the fourth embodiment obtains pieces of digital data on the light distribution patterns for each region or country where the vehicle is running. Therefore, it is unnecessary to design and manufacture the digital lighting system for each region or country and one digital lighting system can be applied to many regions and countries. Since the pieces of digital data on the light distribution patterns are obtained as groups of regions and countries where vehicles are running, the processing for selecting the digital data on the predetermined light distribution pattern can be promptly performed and the switchover of the light distribution pattern for illuminating the road surface and the like can be promptly performed. These respects are preferable for traffic safety. Further, only by changing the digital data on the light distribution pattern, the optimum light distribution pattern for the road condition of the region and country where the vehicle is running can be obtained. Therefore, it is unnecessary to optically design and manufacture the digital lighting system for each region or country and manufacturing cost can be reduced, accordingly. Besides, the digital lighting system according to the fourth embodiment can switch over between a right-hand drive region/country and a left-hand drive region/country if the vehicle crosses region or national boundaries. This switchover is preferable for traffic safety.

The digital lighting system according to the fourth embodiment can automatically obtain the pieces of digital data on the light distribution patterns for each region or country where the vehicle is running based on the position information signal from the GPS or the like. Therefore, the system can dispense with labor for changing the pieces of digital data on the light distribution patterns for each region or country where the vehicle is running.

The digital lighting system according to the fourth embodiment can ensure detecting the surrounding environment of the vehicle using the surrounding environment detector 5. Therefore, it is further ensured that the pattern P5 suited for the surrounding environment of the vehicle can be obtained.

The digital lighting system according to the fourth embodiment automatically selects the optimum predetermined light distribution pattern P5 (see FIG. 1) for the surrounding environment of the vehicle and illuminates the road surface and the like in the selected, optimum predetermined light distribution pattern. Alternatively, similarly to the vehicle digital display unit according to the first embodiment shown in FIG. 18, by contrast, such a device (the vehicle digital lighting apparatus according to the fourth embodiment) that allows the driver to select the predetermined light distribution pattern P7 (see FIG. 18) and illuminates the road surface and the like in the selected, predetermined light distribution pattern P7 may be provided.

Namely, the digital lighting system according to the fourth embodiment automatically selects the optimum predetermined light distribution pattern P5 for the surrounding environment of the vehicle using the surrounding environment detector 5 (see FIG. 33), the surrounding environment determination unit 61 (see FIG. 33), and the like. The vehicle digital lighting apparatus in this fourth embodiment, by contrast, allows the driver to select the predetermined light distribution pattern P7 using the light distribution pattern selection unit 7 (see FIG. 18).

The light distribution pattern selection unit 7 is connected to the external signal input unit 60 (see FIG. 18) of the controller 6 (see FIG. 18). The external signal input unit 60 is connected to the data selection unit 62 (see FIG. 18) of the CPU 66 (see FIG. 18). The light distribution pattern selection unit 7 allows the driver to select the light distribution pattern for illuminating the road surface and the like and outputs the region code, the country code, and the light distribution code as the selection signal based on driver's selection to the external signal input unit 60.

The functions of this vehicle digital lighting apparatus will be explained. The driver selects the light distribution pattern for illuminating the road surface and the like using the light distribution pattern selection unit 7. If so, the light distribution pattern selection unit 7 outputs the region code, the country code, and the light distribution code as the selection signal based on the driver's selection to the external signal input unit 60. The interface circuit of the external signal input unit 60 inputs the external signal such as the selection signal from the light distribution pattern selection unit 7, processes the input signal to a signal that can be handled by the controller 6, and outputs the processing signal to the data selection unit 62.

The data selection unit 62 selects digital data on the driver's selected light distribution pattern from among the pieces of digital data on the light distribution patterns stored in the storage unit 4 based on the region code, the country code, and the light distribution code as the selection signal from the light distribution pattern selection unit 7 through the external signal input unit 60.

The driver circuit of the control signal output unit 63 outputs the control signal for individually, digitally controlling the switchover of the many micro mirror elements 25 (see FIG. 5 to FIG. 8) based on the digital data on the light distribution pattern selected by the data selection unit 6, to the reflection digital light deflector 2 (see FIG. 18).

If the controller 6 outputs the control signal to the reflection digital light deflector 2, the reflection digital light deflector 2 controls ON and OFF switching of the many micro mirror elements 25 based on the control signal, i.e., the digital data on the light distribution pattern selected by the driver. The vehicle digital lighting apparatus according to the fourth embodiment can thereby illuminate the road surface and the like in the driver's selected light distribution pattern.

The driver selects, for example, the region code "6" of "6. Fareast Asia" for the region, the country code "2" of "2. Japan" for the country, and the light distribution code "1" of "1. light distribution pattern data for general road, straight road, and running vehicle" for the light distribution using the light distribution pattern selection unit 7. If so, the data selection unit 62 selects "6. Fareast Asia", "2. Japan", and "1. light distribution pattern data for general road, straight road, and running vehicle" shown in FIG. 32 from those stored in the storage unit 5 (see FIG. 18). Based on "6. Fareast Asia", "2. Japan", and "1. light distribution pattern data for general road, straight road, and running vehicle", the reflection digital light deflector 2 is controlled, whereby the vehicle digital lighting apparatus can illuminate the road surface and the like in the driver's selected light distribution pattern for Fareast Asia, Japan, the ordinary road, the straight road, and for the running vehicle. The pieces of digital data on the light distribution patterns are stored in groups according to regions and countries in the storage unit 4. Therefore, it suffices to select only the light distribution code until the region code and the country code are newly selected after they are selected once.

Thus, the vehicle digital lighting apparatus according to the fourth embodiment allows the driver to conduct the functions of the surrounding environment detector 5 and the surrounding environment determination unit 61 of the digital lighting system according to the fourth embodiment. Therefore, the vehicle digital lighting apparatus can dispense with the surrounding environment detector 5 and the surrounding environment determination unit 61 and manufacturing cost can be reduced, accordingly.

Figure 35:
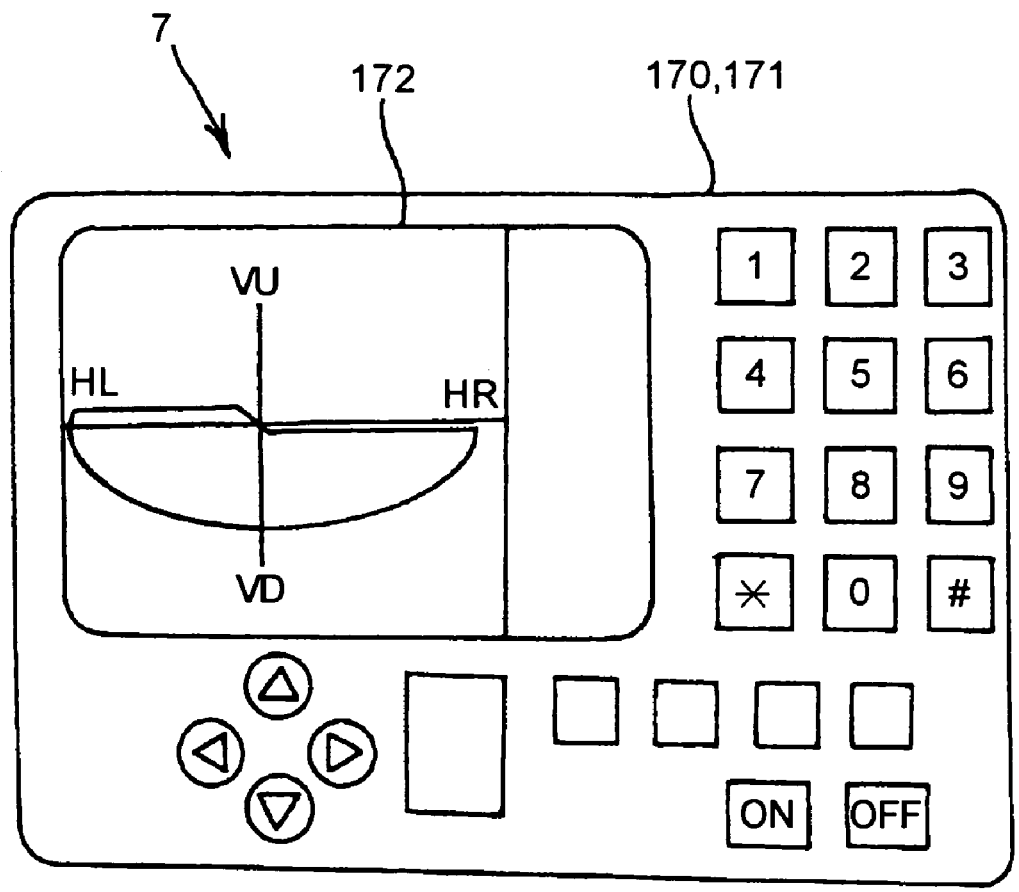
FIG. 35 is a schematic diagram of a display unit of the digital lighting system according to the fifth embodiment.

FIG. 34 and FIG. 35 are schematic diagrams for illustrating a digital lighting system according to a fifth embodiment of the present invention. The same reference symbols as those in FIG. 1 to FIG. 33 denote the same elements.

The vehicle digital lighting apparatus in this fifth embodiment can obtain a driver's desired light distribution pattern and contribute to traffic safety.

The controller 6 has a data change device (a manual editor) 170 provided therein. This data change device 170 can change the pieces of digital data on the light distribution patterns stored in the storage unit 4 and is connected to the external signal input unit 60.

The surrounding environment determination unit 61 of the controller 6 has a cancellation device 171 provided therein. This cancellation device 171 can cancel determinations of the oncoming vehicle/preceding vehicle determination unit, the highway/general road determination unit, the urban district determination unit, the crossing determination unit, the straight/curved road determination unit, the rain determination unit, the fog determination unit, the snow determination unit, the orientation determination unit, and the wait-at-stoplight determination unit in the surrounding environment determination unit 61. This cancellation device 171 is connected to the surrounding environment determination unit 61 through the external signal input unit 60.

Each of the data change device 170 and the cancellation device 171 has a storage unit (not shown) provided therein. This storage unit holds digital data on the light distribution pattern changed by the data change device 170 and the determination cancelled by the cancellation device 171. Although this storage unit is not shown in FIG. 34, the device is a storage unit (memory) of the CPU 66 and the changed digital data on the light distribution pattern and the cancelled determination of the determination unit (a determination program) can be registered in and reproduced from the memory.

The controller 6 has a display unit 172 provided therein. As shown in FIG. 35, this display unit 172 includes, for example, a liquid crystal display, is connected to the data selection unit 62, converts the digital data on the light distribution pattern selected by the data selection unit 62 to image data, and displays this image data as an image. Further, this display unit 172 can display a content of the digital data on the light distribution pattern changed by the data change device 171, that of the determination of the determination unit in the surrounding environment determination unit 61 to be cancelled by the cancellation device 170, that of the changed digital data on the light distribution pattern stored in the storage unit, and that of the cancelled determination of the determination unit.

The display unit 172 as well as the data change device 170, the cancellation device 171, and the storage unit constitutes the light distribution pattern selection unit 7 to be explained later. In addition, as shown in FIG. 35, each of the data change device 170, the cancellation device 171, and the storage unit includes an operation unit of a touch panel structure.

The functions of the vehicle digital lighting apparatus according to the fifth embodiment, which is constituted as explained above, will be explained.

The surrounding environment detector 5 detects the surrounding environment of the vehicle and outputs the detection signal (see the step S1 shown in FIG. 17). The external signal input unit 60 inputs the detection signal and outputs the detection signal as a processing signal (see the step S2 shown in FIG. 17). The surrounding environment determination unit 61 inputs the processing signal and outputs the determination signal (see the step S3 shown in FIG. 17). The data selection unit 62 inputs the determination signal and selects the optimum light distribution data for the surrounding environment of the vehicle (see the step S4 shown in FIG. 17). The control signal output unit 63 outputs the control signal based on the selected light distribution data (see the step S5 shown in FIG. 17).

If the controller 6 outputs the control signal to the reflection digital light deflector 2, the reflection digital light deflector 2 controls the ON and OFF switching of the many micro mirror elements 25 based on the control signal, i.e., the digital data on the optimum light distribution pattern for the surrounding environment of the vehicle. The digital lighting system according to the fifth embodiment can thereby automatically select the optimum light distribution pattern P5 for the surrounding environment of the vehicle and illuminate the road surface and the like in the selected optimum light distribution pattern P5 for the surrounding environment of the vehicle.

The digital lighting system according to the fifth embodiment can arbitrarily change the digital data on the light distribution pattern by driver's operation of the operation unit of the touch panel structure, shown in FIG. 35, of the data change device 170. For example, for the dimming control for the vehicle waiting at a stoplight to decrease the light intensity of the light distribution pattern (control for generally decreasing the light intensity of the light distribution pattern to zero since the vehicle starts waiting at a stoplight), the time required for the light intensity to be decreased from a predetermined value to zero can be arbitrarily changed. In addition, the shape, the light intensity, and the like of the light distribution pattern for the running vehicle or for the vehicle passing by the other vehicle can be arbitrarily changed. The change of the light distribution pattern is made within a range satisfying each standard.

Further, by driver's operation of the operation unit of the touch panel structure, shown in FIG. 35, of the cancellation device, the digital lighting system according to the fifth embodiment can cancel the determination of the surrounding environment determination unit 61. For example, based on the determination as to whether an oncoming vehicle or a preceding vehicle is present made by the oncoming vehicle/preceding vehicle determination unit, a low beam for the vehicle passing by the other vehicle and a high beam for the running vehicle are switched over therebetween. However, if the driver feels that it is unnecessary to switch over the low beam to the high beam even thought no oncoming or preceding vehicle is present, the determination of the oncoming vehicle/preceding vehicle determination unit can be cancelled.

Figure 25:
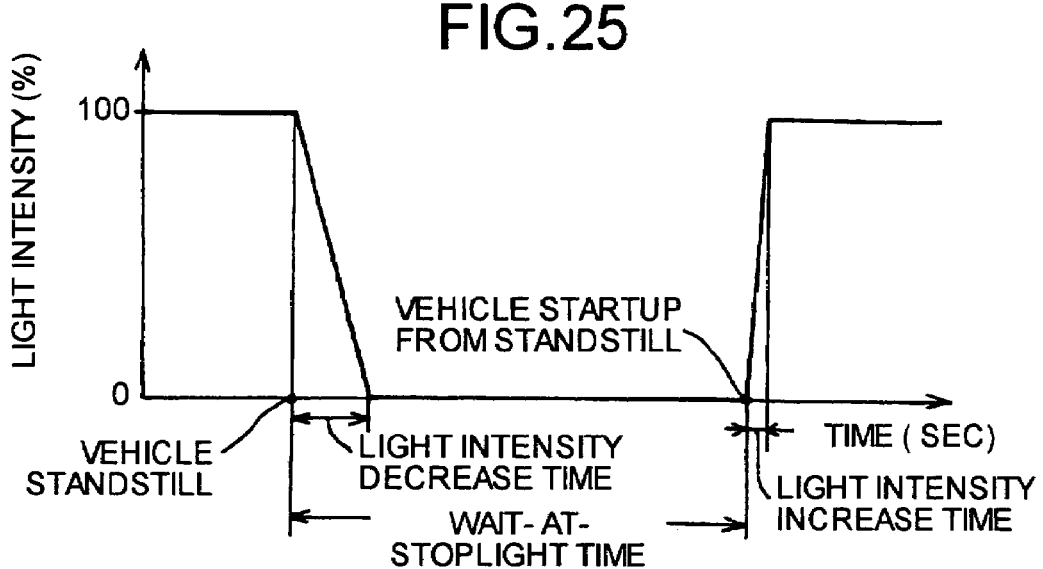
FIG. 25 is a graph for illustrating a dimming control over a light distribution pattern for waiting at a stop light.
Figure 26:
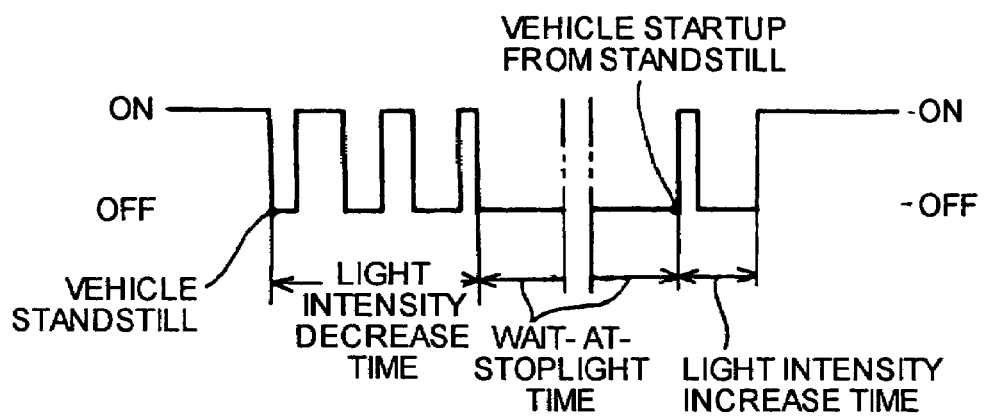
FIG. 26 is a schematic diagram for illustrating the dimming control over a light distribution pattern for waiting at the stop light by increasing or decreasing a duty ratio of an ON signal pulse width or that of an OFF signal pulse width based on binary pulse width modulation.

Furthermore, by driver's operation of the operation unit of the touch panel structure, shown in FIG. 25, of the storage unit, the digital lighting system according to the fifth embodiment can store the changed digital data on the light distribution pattern or the cancelled determination of the determination unit in the storage unit. The driver can operate the data change device 170, the cancellation device 171, and the storage unit on a touch panel while viewing the display of the display unit 172.

The advantages of the vehicle digital lighting apparatus in this fifth embodiment, which is constituted as explained above, will be explained.

The digital lighting system according to the fifth embodiment can rewrite the light distribution pattern as desired by the driver and can cancel the determination of the determination unit. Therefore, the driver's desired light distribution pattern can be obtained, which is preferable for traffic safety.

The digital lighting system according to the fifth embodiment has the storage units that store the digital data on the changed light distribution pattern and the cancelled determination in the data change device 170 and the cancellation device 171, respectively. Therefore, by activating the digital lighting system according to the fifth embodiment, the driver's desired light distribution pattern can be constantly, instantly obtained.

The digital lighting system according to the fifth embodiment can automatically select the optimum predetermined light distribution pattern P5 for the surrounding environment of the vehicle and constantly illuminate the road surface and the like in the selected, optimum predetermined light distribution pattern P5 for the surrounding environment of the vehicle. Therefore, the system is preferable for traffic safety.

The digital lighting system according to the fifth embodiment displays the selected, predetermined light distribution pattern by the display unit 172. Therefore, the driver can visually recognize the selected, predetermined light distribution pattern for illuminating the road surface and the like. In addition, if the driver changes the digital data on the light distribution pattern using the data change device 170, cancels the determination of the surrounding environment determination unit 61 that the driver consider unnecessary using the cancellation device 171, or store the changed digital data on the light distribution pattern or the cancelled determination in the storage unit, the driver can operate the relevant device while visually recognizing the operation using the display unit 172.

Figure 36:
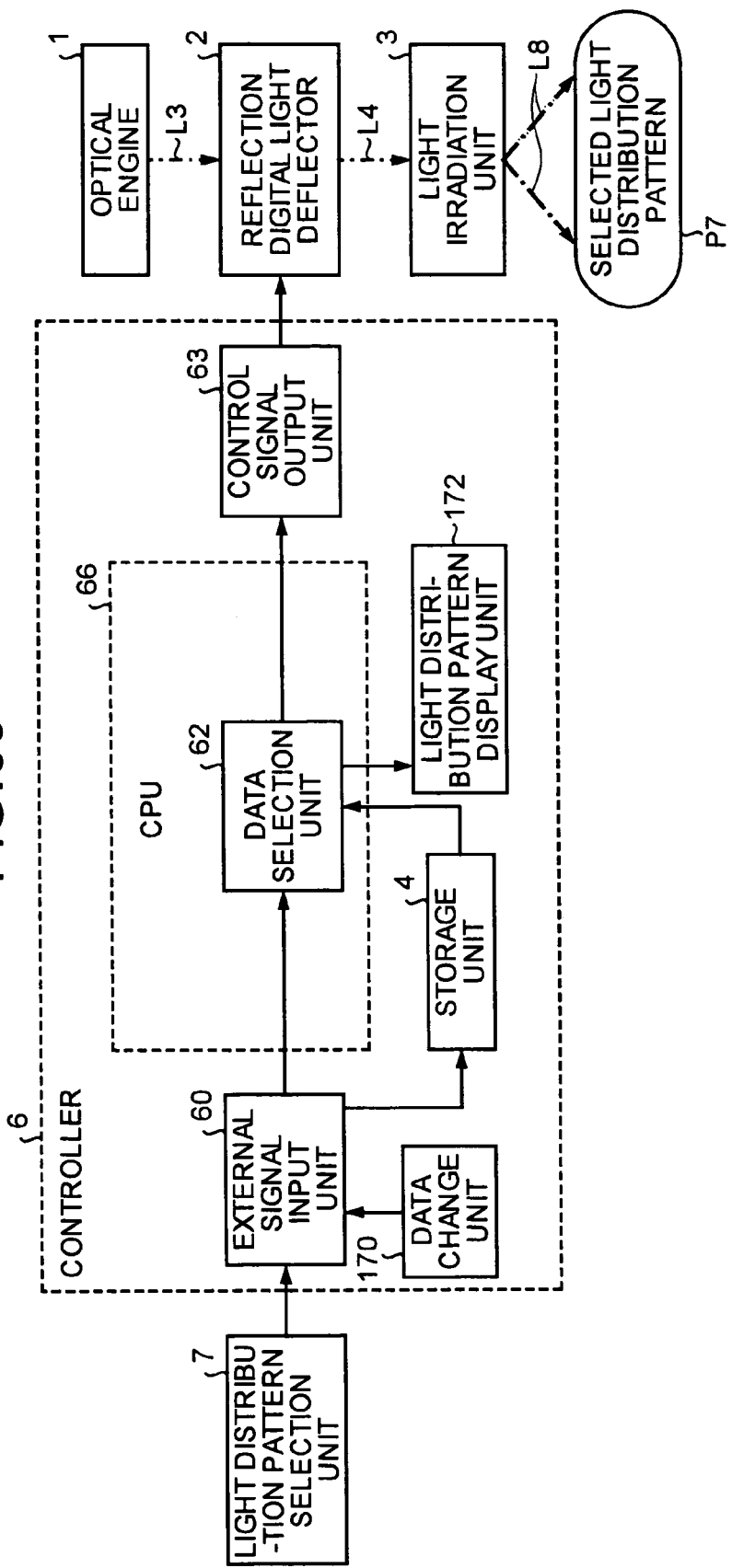
FIG. 36 is a block diagram of the digital lighting apparatus according to the fifth embodiment.

FIG. 36 is a block diagram of a digital lighting apparatus according to the fifth embodiment. The same reference symbols as those in FIG. 1 to FIG. 35 denote the same elements.

The digital lighting system according to the fifth embodiment automatically selects the optimum predetermined light distribution pattern P5 (see FIG. 34) for the surrounding environment of the vehicle and illuminate the road surface and the like in the selected, predetermined light distribution pattern P5. The vehicle digital lighting apparatus in this fifth embodiment, by contrast, selects the predetermined light distribution pattern P7 and illuminates the road surface and the like in the selected, predetermined light distribution pattern P7.

Namely, the digital lighting system according to the fifth embodiment automatically selects the optimum predetermined light distribution pattern P5 for the surrounding environment of the vehicle using the surrounding environment detector 5 (see FIG. 34), the surrounding environment determination unit 61 (see FIG. 34), and the like. The vehicle digital lighting apparatus according to the fifth embodiment, by contrast, allows the driver to select the predetermined light distribution pattern P7 using the light distribution pattern selection unit 7.

The light distribution pattern selection unit 7 is connected to the external signal input unit 60 in the controller 6 and the external signal input unit 60 is connected to the data selection unit 62 in the CPU 66. The light distribution pattern selection unit 7 allows the driver to select the light distribution pattern for illuminating the road surface and the like using the light distribution pattern selection unit 7 and thereby outputs the selection signal based on driver's selection to the external signal input unit 60 in the controller 6. As shown in FIG. 35, the light distribution pattern selection unit 7 is integral with the data change device 170, the cancellation device 171, the storage unit, and the display unit 172.

The functions and advantages of the vehicle digital lighting apparatus according to the fifth embodiment, which is constituted as explained above, will be explained.

The driver selects the light distribution pattern for illuminating the road surface and the like using the light distribution pattern selection unit 7. If so, the light distribution pattern selection unit 7 outputs the selection signal based on driver's selection to the external signal input unit 60. The interface circuit of the external signal input unit 60 inputs the external signal such as the selection signal from the light distribution pattern selection unit 7, processes the external signal so that the controller 6 can handle the signal, and outputs the processing signal to the data selection unit 62.

The data selection unit 62 selects digital data on the driver's selected light distribution pattern from among the pieces of digital data on the light distribution patterns stored in the storage unit 4 based on the selection signal from the light distribution pattern selection unit 7 through the external signal input unit 60.

The driver circuit of the control signal output unit 63 outputs the control signal for individually, digitally controlling switchover of the tilt angles of the minimum error elements 25 (see FIG. 5 to FIG. 8) to the reflection digital light deflector 2 based on the digital data on the light distribution pattern selected by the data selection unit 62.

If the controller 6 outputs the control signal to the reflection digital light deflector 2, the reflection digital light deflector 2 controls ON and OFF switching of the many micro mirror elements 25 based on the control signal, i.e., the digital data on the driver's selected light distribution pattern. The vehicle digital lighting apparatus according to the fifth embodiment can thereby illuminate the road surface and the like in the light distribution pattern P7 selected by the driver.

The vehicle digital lighting apparatus according to the fifth embodiment can attain the functions and advantages substantially equal to those of the digital lighting system according to the fifth embodiment. For example, since the vehicle digital lighting apparatus according to the fifth embodiment can rewrite the light distribution pattern as desired by the driver. Therefore, the driver's desired light distribution pattern can be obtained, which is preferable for traffic safety. The digital lighting system according to the fifth embodiment can store the digital data on the changed light distribution pattern in the storage unit. Therefore, by activating the vehicle digital lighting apparatus according to the fifth embodiment, the driver's desired light distribution pattern can be constantly, instantly obtained. Further, the selected, predetermined light distribution pattern is displayed on the display unit 172. If the driver changes the digital data on the light distribution pattern using the data change device 170 or store the digital data on the changed light distribution pattern in the storage unit, the driver can operate the relevant device while visually recognizing the operation using the display unit 172. According to the vehicle digital lighting apparatus according to the fifth embodiment, the driver selects the light distribution pattern using the light distribution pattern selection unit 7. Therefore, the vehicle digital lighting apparatus according to the fifth embodiment can dispense with the cancellation device (see FIG. 34) of the digital lighting system according to the fifth embodiment. Accordingly, the structure of the device is simplified and manufacturing cost can be reduced.

The vehicle digital lighting apparatus according to the fifth embodiment particularly allows the driver to conduct the functions of the surrounding environment detector 5 and the surrounding environment determination unit 61 of the digital lighting system according to the fifth embodiment. Therefore, the vehicle digital lighting apparatus can dispense with the surrounding environment detector 5 and the surrounding environment determination unit 61 and manufacturing cost can be reduced, accordingly.

Figure 37:
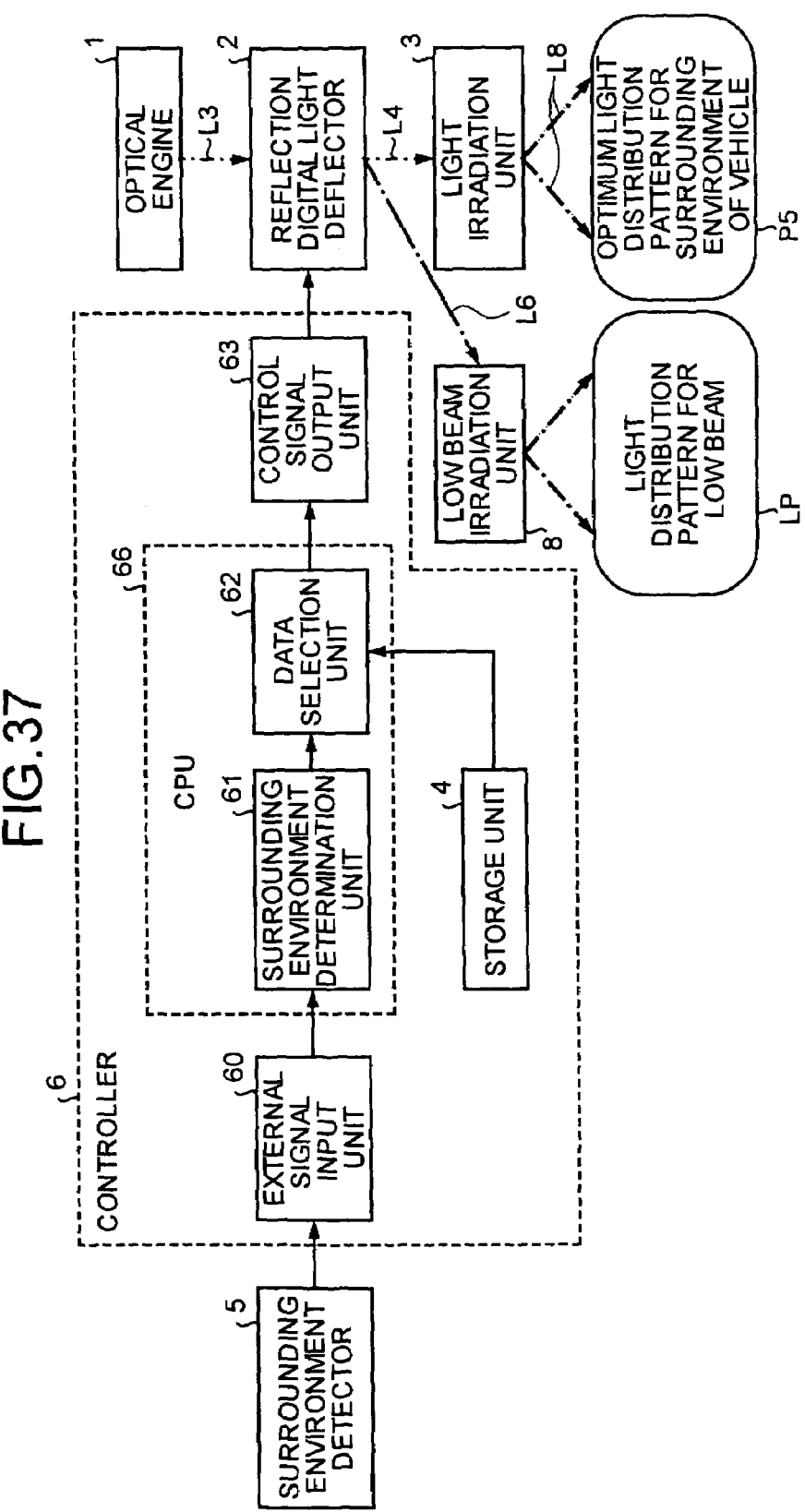
FIG. 37 is a block diagram of a digital lighting system according to a sixth embodiment of the present invention.
Figure 38:
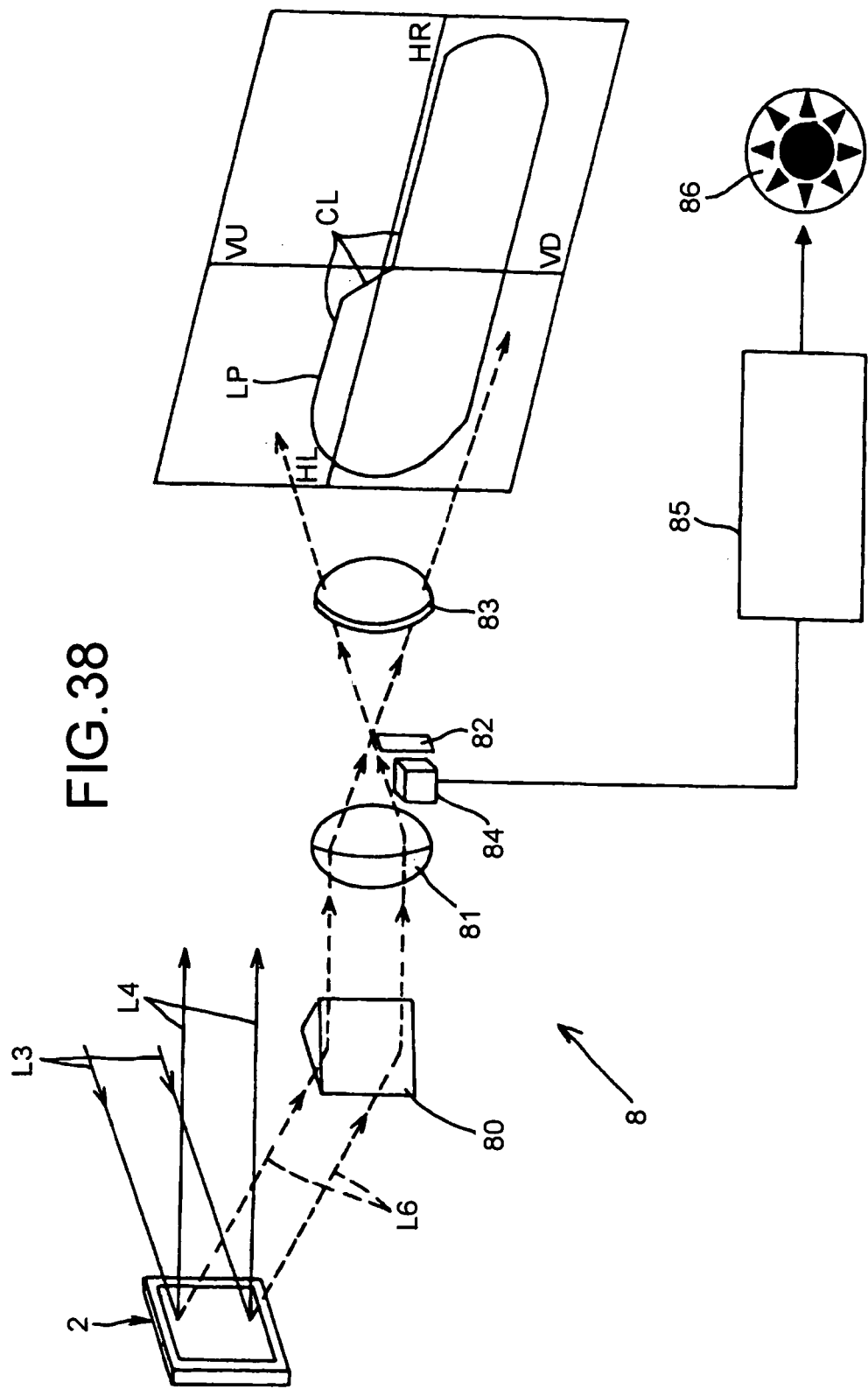
FIG. 38 is a schematic diagram of a low beam irradiation unit and a failure detection display unit of the digital lighting system according to the sixth embodiment.

FIG. 37 and FIG. 38 are schematic diagrams for illustrating a digital lighting system according to a sixth embodiment of the present invention. The same reference symbols as those in FIG. 1 to FIG. 33 denote the same elements.

The digital lighting system in this sixth embodiment has a fail-safe function capable of preventing the moving-vehicle without a light by irradiating the light distribution pattern LP for the vehicle passing by the other vehicle during a failure, i.e., against a failure.

The digital lighting system according to the sixth embodiment includes the optical engine 1, the reflection digital light deflector 2, the light irradiation unit 3, the storage unit 4, the surrounding environment detector 5, the controller 6, and a low-beam irradiation unit 8.

Figures 8, 9:
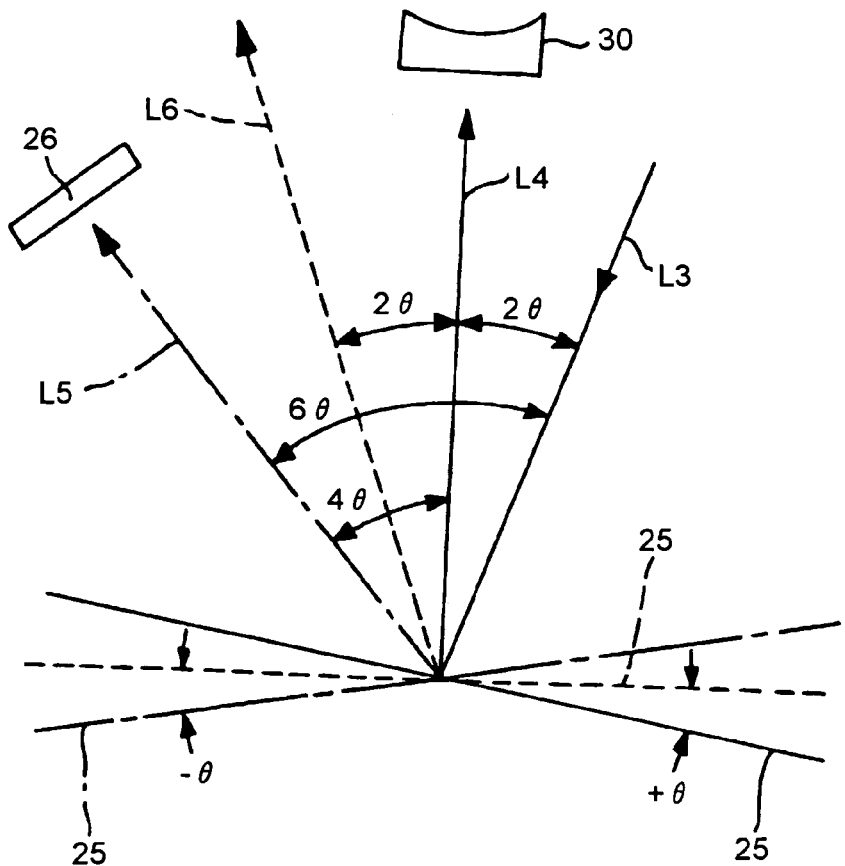
FIG. 8 depicts working of the reflection type digital light deflector.
FIG. 9 is a schematic diagram for illustrating positions of pixels of the reflection type digital light deflector.

In the reflection digital light deflector 2, If each of the micro mirror elements 25 (see FIG. 5 to FIG. 8) is not turned on, i.e., in a horizontal state (neutral state) indicated by the dotted line in FIG. 8, the state often indicates a failure state of the digital lighting system. The failure state of the digital lighting system mainly indicates a failure of the controller and not that of each micro mirror element 25.

As shown in FIG. 8, each micro mirror element 25 in the horizontal state (neutral state) reflects the parallel light L3 from the optical engine 1 in a third reflection direction indicated by a dotted arrow. The reflected light L6 indicated by this dotted arrow is reflected at an angle 4θ against the incident light L3. The low-beam irradiation unit 8 is arranged on an optical path of the reflected light L6 from the reflection digital light deflector 2 when a failure occurs, i.e., the system is turned off.

The low-beam irradiation unit 8 illuminates the reflected light L6 from the reflection digital light deflector 2 when the system is turned off on the road surface and the like in the light distribution pattern LP for the vehicle passing by the other vehicle.

The low-beam irradiation unit 8 includes an optical prism (wedge prism) 80, an optical lens (a convex lens) 81, a shield 82, a projection lens 83, an optical sensor 84, a dedicated alarming lamp circuit (dedicated interface circuit) 85, and a failure alarm indicator lamp 86.

The optical prism 80 is arranged on the optical path of the reflected light L6 from the reflection digital light deflector 2 when a failure, occurs, i.e., the system is turned off. This optical prism 80 corrects a deviation (see FIG. 8, at an angle of 2θ such as 20 degrees or 24 degrees) in the reflection direction between the reflected light L4 from the micro mirror element 25 in the reflection digital light deflector 2 in an ON state and the reflected light L6 from the reflection digital light deflector 2 when the system is turned off.

The optical lens 81 is arranged on an optical path of a light (indicated by a dotted line in FIG. 38) from the optical prism 80. This optical prism 81 converges the light from the optical prism 80 on a focal point (not shown).

The shield 82 is arranged near the focal point of the optical lens 81. This shield 82 partially cuts off a light (indicated by a dotted line in FIG. 38) from the optical lens 81 and forms a low beam in the light distribution pattern LP for the vehicle passing by the other vehicle from, for example, a high beam in the light distribution pattern for the running vehicle. As shown in FIG. 38, this shield 83 particularly cuts off a part of the light above a cut line CL of the light distribution pattern LP for the vehicle passing by the other vehicle.

The projection lens 83 is arranged on an optical path from a light (indicated by a dotted line in FIG. 38) from the shield 82. This projection lens 83 projects the light from the shield 82 as a low beam and illuminates the road surface and the like in the light distribution pattern LP for the vehicle passing by the other vehicle.

The optical sensor 84 is arranged on the reflection digital light deflector 2 side relative to the shield 82. This optical sensor 84 detects the part of the light cut off by the shield 82 in the reflected light L6 from the reflection digital light deflector 2 when the system is turned off, converts the detected light to an electric signal, and outputs the electric signal.

The dedicated alarming lamp circuit 85 is connected to the optical sensor 84. This dedicated alarming lamp circuit 85 is a dedicated circuit separated from the circuit of the digital lighting system according to the sixth embodiment. The dedicated alarming lamp circuit 85 inputs the electric signal from the optical sensor 84 and thereby turns on the indicator lamp 86.

The indicator lamp 86 is connected to the dedicated alarming lamp circuit 85 and arranged within a range of a driver's field of view. This indicator lamp 86 is turned on by the dedicated alarming lamp circuit 85 that inputs the electric signal from the optical sensor 84. The optical sensor 84, the dedicated alarming lamp circuit 85, and the indicator lamp 86 constitute a failure detection and display unit. This failure detection and display unit is not necessarily provided in the system.

The functions of the digital lighting system in this sixth embodiment, which is constituted as explained above, will be explained.

The surrounding environment detector 5 detects the surrounding environment of the vehicle and outputs the detection signal (see the step S1 shown in FIG. 17). The external signal input unit 60 inputs the detection signal and outputs the detection signal as a processing signal (see the step S2 shown in FIG. 17). The surrounding environment determination unit 61 inputs the processing signal and outputs the determination signal (see the step S3 shown in FIG. 17). The data selection unit 62 inputs the determination signal and selects the optimum light distribution data for the surrounding environment of the vehicle (see the step S4 shown in FIG. 17). The control signal output unit 63 outputs the control signal based on the selected light distribution data (see the step S5 shown in FIG. 17).

If the controller 6 outputs the control signal to the reflection digital light deflector 2, the reflection digital light deflector 2 controls the ON and OFF switching of the many micro mirror elements 25 based on the control signal, i.e., the digital data on the optimum light distribution pattern for the surrounding environment of the vehicle. The digital lighting system according to the sixth embodiment can thereby automatically select the optimum light distribution pattern P5 for the surrounding environment of the vehicle and illuminate the road surface and the like in the selected optimum light distribution pattern P5 for the surrounding environment of the vehicle.

If the digital lighting system in this sixth embodiment, particularly a control system such as the controller 6 fails, the reflection digital light deflector 2 turns into a state in which no current is carried. If so, almost all the micro mirror elements 25 of the reflection digital light deflector 2 turn into the neutral state indicated by the dotted line shown in FIG. 8 and the light L3 from the optical engine 1 is reflected by almost all the micro mirror elements 25 in the neutral state and transformed to the reflected light L6 indicated by the dotted line shown in FIG. 8. This reflected light L6 is deviated at the angle of 2θ (e.g., 20 degrees or 24 degrees) from the reflected light L4 (used for illuminating the road surface and the like) reflected by the micro mirror elements 25 in the ON state. The conventional vehicle digital lighting apparatus regards the reflected light L6 reflected by the micro mirror elements 25 in the neutral state as non-control target and does not employ the reflected light L6. Therefore, when a failure occurs, the light of the vehicle is turned off. According to the digital lighting system in this sixth embodiment, by contrast, the low-beam irradiation unit 8 controls and uses the reflected light L6 as the light distribution pattern LP for the vehicle passing by the other vehicle for illuminating the road surface and the like as shown in FIG. 38.

Namely, as shown in FIG. 38, the reflected light L6 reflected by the micro mirror elements 25 in the neutral state is refracted first by the optical prism 80 and the deviation of the angle of 2θ of the reflected light L6 from the reflected light L4 reflected by the micro mirror elements 25 in the ON state is corrected. The deviation-corrected light is converted on the focal point by the optical lens 81. A part of the light converged on the focal point is cut off by the shield 82 to thereby form the low beam in the light distribution pattern P for the vehicle passing by the other vehicle from the high beam in the light distribution pattern for the running vehicle. The light thus cut off is transmitted, as the low beam, by the projection lens 83 and illuminated on the road surface and the like in the light distribution pattern for the vehicle passing by the other vehicle. Thus, the digital lighting system according to the sixth embodiment can prevent the light of the moving-vehicle from being turned off and exhibit the fail-safe function against the failure.

Further, during the failure, if the light distribution pattern LP for the vehicle passing by the other vehicle is irradiated, the optical sensor 84 located in front of the shield 84 (on the reflection digital light deflector 2 side) detects the part of the light cut off by the shield 82 in the reflected light L6 from the micro mirror elements 25 in the neutral state. The optical sensor 8 then converts the detected light to an electric signal and outputs the electric signal to the dedicated alarming lamp circuit 85. This dedicated alarming lamp circuit 85 turns on the indicator lamp 86 in response to the electric signal from the optical sensor 84. By turning on the indicator lamp 86, the driver can recognize that a failure occurs to the digital lighting system according to the sixth embodiment.

The advantages of the digital lighting system according to the sixth embodiment, which is constituted as explained above, will be explained.

The digital lighting system according to the sixth embodiment can control the reflected light L6 from the reflection digital light deflector 2 in the state in which no current is carried to use the reflected light L6 as the light in the light distribution pattern LP for the vehicle passing by the other vehicle, and illuminate the road surface and the like in the pattern LP using the low-beam irradiation unit 8 if a failure occurs. Therefore, the digital lighting system according to the sixth embodiment can prevent the light of the moving-vehicle from being turned off during the failure and exhibit the fail-safe function against the failure.

The digital lighting system according to the sixth embodiment includes the failure detection and display unit that detects the reflected light L6 from the reflection digital light deflector 2 in the state in which no current is carried and that displays that the digital lighting system fails. Therefore, the driver can instantly recognize that the digital lighting system fails and instantly deals with the failure, accordingly.

In the digital lighting system according to the sixth embodiment, the optical sensor 84 arranged on the reflection digital light deflector 2 side relative to the shield 82 detects the part of the light cut off by the shield 82 in the reflected light L6 from the reflection digital light deflector 2 in the state in which no current is carried. Therefore, the digital lighting system according to the sixth embodiment can ensure irradiating the light in the light distribution pattern LP for the vehicle passing by the other vehicle on the road surface and the like without giving any influence on the light distribution pattern LP for the vehicle passing by the other vehicle irradiated from the low-beam irradiation unit 8 and without fear of glare.

The digital lighting system according to the sixth embodiment can automatically select the optimum predetermined light distribution pattern P5 for the surrounding environment of the vehicle and constantly illuminate the road surface and the like in the selected, optimum predetermined light distribution pattern P5 for the surrounding environment of the vehicle. Therefore, the digital lighting system according to the sixth embodiment is preferable for traffic safety.

Figure 39:
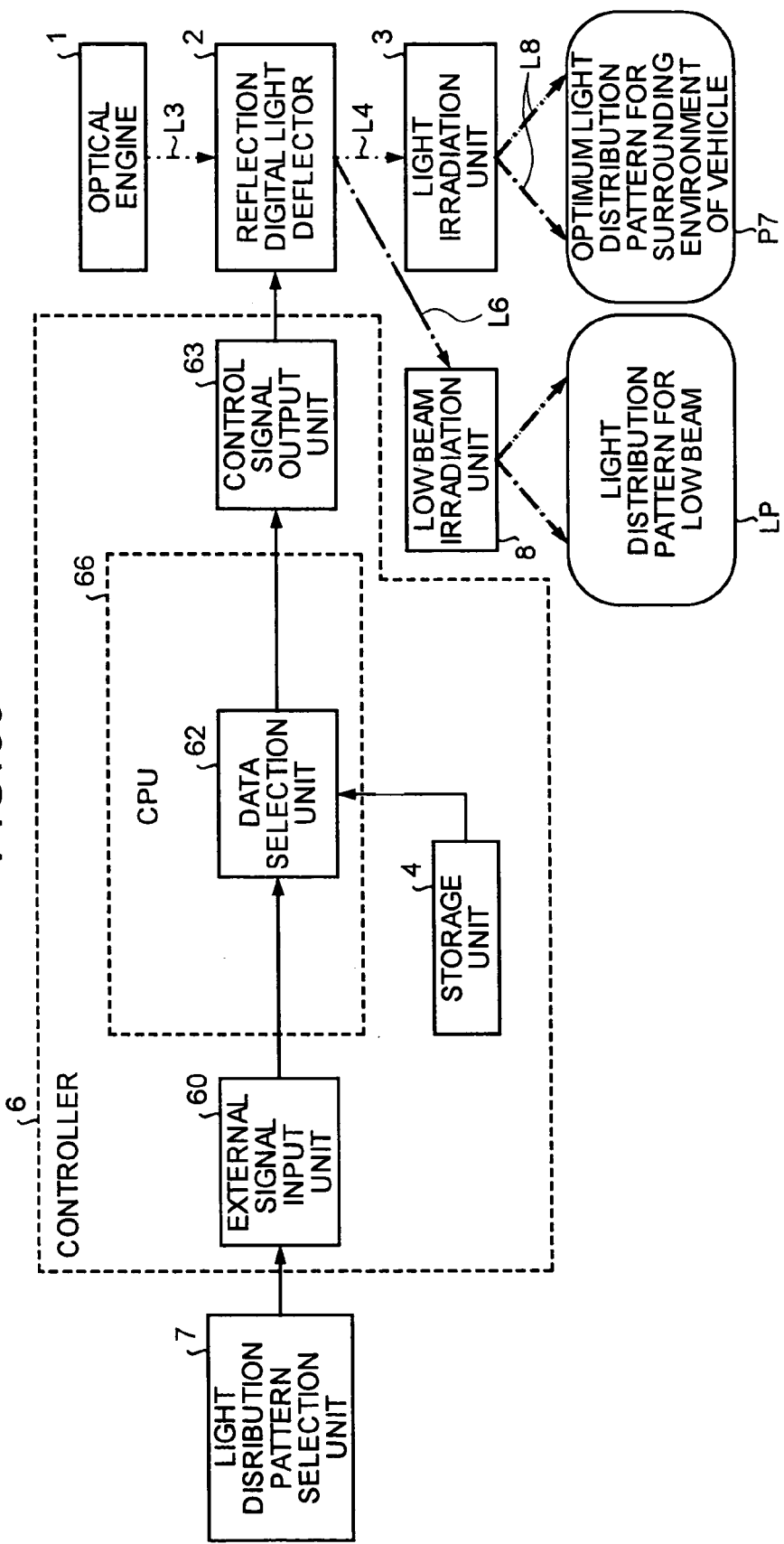
FIG. 39 is a block diagram of the digital lighting apparatus according to the sixth embodiment.

FIG. 39 is a block diagram of a digital lighting apparatus according to the sixth embodiment. The same reference symbols as those in FIG. 1 to FIG. 38 denote the same elements.

The digital lighting system according to the sixth embodiment automatically selects the optimum predetermined light distribution pattern P5 (see FIG. 37) for the surrounding environment of the vehicle and constantly illuminates the road surface and the like in the selected, optimum predetermined light distribution pattern P5. The vehicle digital lighting apparatus according to the sixth embodiment, by contrast, selects the predetermined light distribution pattern P7 and illuminates the road surface and the like in the selected predetermined light distribution pattern P7.

Namely, the digital lighting system according to the sixth embodiment automatically selects the optimum predetermined light distribution pattern P5 for the surrounding environment of the vehicle using the surrounding environment detector 5 (see FIG. 37), the surrounding environment determination unit 61 (see FIG. 37), and the like. The vehicle digital lighting apparatus according to the sixth embodiment, by contrast, allows the driver to select the predetermined light distribution pattern P7 using the light distribution pattern selection unit 7.

The light distribution pattern selection unit 7 is connected to the external signal input unit 60 in the controller 6 and the external signal input unit 60 is connected to the data selection unit 62 in the CPU 66. The light distribution pattern selection unit 7 allows the driver to select a light distribution pattern for illuminating the road surface and the like using the light distribution pattern selection unit 7 and thereby outputs a selection signal based on driver's selection to the external signal input unit 60 in the controller 6.

The functions and advantages of the vehicle digital lighting apparatus according to the sixth embodiment, which is constituted as explained above, will be explained.

The driver selects the light distribution pattern for illuminating the road surface and the like using the light distribution pattern selection unit 7. If so, the light distribution pattern selection unit 7 outputs the selection signal based on driver's selection to the external signal input unit 60. The interface circuit of the external signal input unit 60 inputs the external signal such as the selection signal from the light distribution pattern selection unit 7, processes the external signal so that the controller 6 can handle the signal, and outputs the processing signal to the data selection unit 62.

The data selection unit 62 selects digital data on the driver's selected light distribution pattern from among pieces of digital data on a plurality of light distribution patterns stored in the storage unit 4 based on the selection signal from the light distribution pattern selection unit 7 through the external signal input unit 60.

The driver circuit of the control signal output unit 63 outputs a control signal for individually, digitally controlling switchover of the tilt angles of the minimum error elements 25 (see FIG. 5 to FIG. 8) to the reflection digital light deflector 2 based on the digital data on the light distribution pattern selected by the data selection unit 62.

If the controller 6 outputs the control signal to the reflection digital light deflector 2, the reflection digital light deflector 2 controls ON and OFF switching of the many micro mirror elements 25 based on the control signal, i.e., the digital data on the driver's selected light distribution pattern. The vehicle digital lighting apparatus according to the sixth embodiment can thereby illuminate the road surface and the like in the light distribution pattern P7 selected by the driver.

If a control system such as the controller 6 fails, the reflection digital light deflector 2 turns into a state in which no current is carried. If so, the micro mirror elements 25 turn into the neutral state indicated by the dotted line shown in FIG. 8 and the light L3 from the optical engine 1 is transformed to the reflected light L6 indicated by the dotted line shown in FIG. 8. The low-beam irradiation unit 8 controls and uses the reflected light L6 as the light distribution pattern LP for the vehicle passing by the other vehicle for illuminating the road surface and the like as shown in FIG. 38. Thus, when a failure occurs, the vehicle digital lighting apparatus according to the sixth embodiment can prevent the light of the moving-vehicle from being turned off and exhibit the fail-safe function against the failure similarly to the digital lighting system according to the sixth embodiment and exhibits the fail-safe function against the failure. Further, during the failure, as shown in FIG. 38, the indicator lamp 86 is turned on, whereby the driver can recognize that a failure occurs.

The vehicle digital lighting apparatus according to the sixth embodiment can attain substantially the same functions and advantages as those of the digital lighting system according to the sixth embodiment.

In particular, the vehicle digital lighting apparatus according to the sixth embodiment allows the driver to perform the functions of the surrounding environment detector 5 and the surrounding environment determination unit 61 in the digital lighting system according to the sixth embodiment. Therefore, the vehicle digital lighting apparatus according to the sixth embodiment can dispense with the surrounding environment detector 5 and the surrounding environment determination unit 61 and manufacturing cost can be reduced, accordingly.

FIG. 40 to FIG. 50 are schematic diagrams for illustrating a digital lighting system according to a seventh embodiment of the present invention. The same reference symbols as those in FIG. 1 to FIG. 39 denote the same elements.

The digital lighting system in this seventh embodiment can display information using a contrast in the light distribution pattern for illuminating the road surface and the like.

The symbol "F" denotes a front side of a vehicle C (a progress direction side of the vehicle C). The symbol "B" denotes a rear side of the vehicle C. The symbol "U" denotes an upper side relative to a driver side. The symbol "D" denotes a lower side relative to the driver side. The symbol "L" denotes a left side if the front side F is viewed from the driver side. The symbol "R" denotes a right side if the front side F is viewed from the driver side.

The digital lighting system according to the seventh embodiment includes the optical engine 1, the reflection digital light deflector 2, the light irradiation unit 3, the storage unit 4, the surrounding environment detector 5, the controller 6, an information display unit 90, and an information acquisition device 9.

The information acquisition device 9 acquires the surrounding information on the vehicle C and outputs the acquired information as the information signal. The information acquisition device 9 includes, for example, at least one of the GPS receiver (e.g., car navigation system) that receives the position information signal output from the GPS or the terrestrial station (e.g., electronic reference point), and the imaging device that images the surrounding information on the vehicle C and that outputs the signal (image signal) based on the image. The information acquisition device 9 can serve as the surrounding environment detector 5.

The information display unit 90 is mounted in the CPU 66 of the controller/computer 6 and connected to the external signal input unit 60 and the control signal output unit 63.

The information display unit 90 controls the reflection type digital light deflector 2 and displays information P2 that uses a contrast between the ON reflected light L4 and the OFF reflected light L5 from the reflection type digital light deflector 2 in a predetermined light distribution pattern (the optimum light distribution pattern P5 for the surrounding environment of the vehicle) for illuminating the road surface and the like through the light irradiation unit 3 based on the information signal from the information acquisition unit 9.

Figure 41:
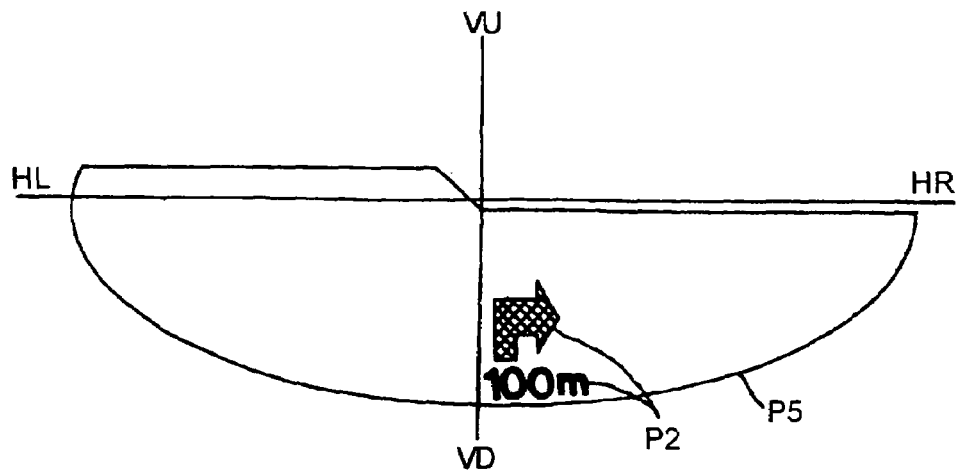
FIG. 41 is a schematic diagram for illustrating a state in which contrast information is displayed in a predetermined light distribution pattern in the digital lighting system according to the seventh embodiment.
Figure 42:
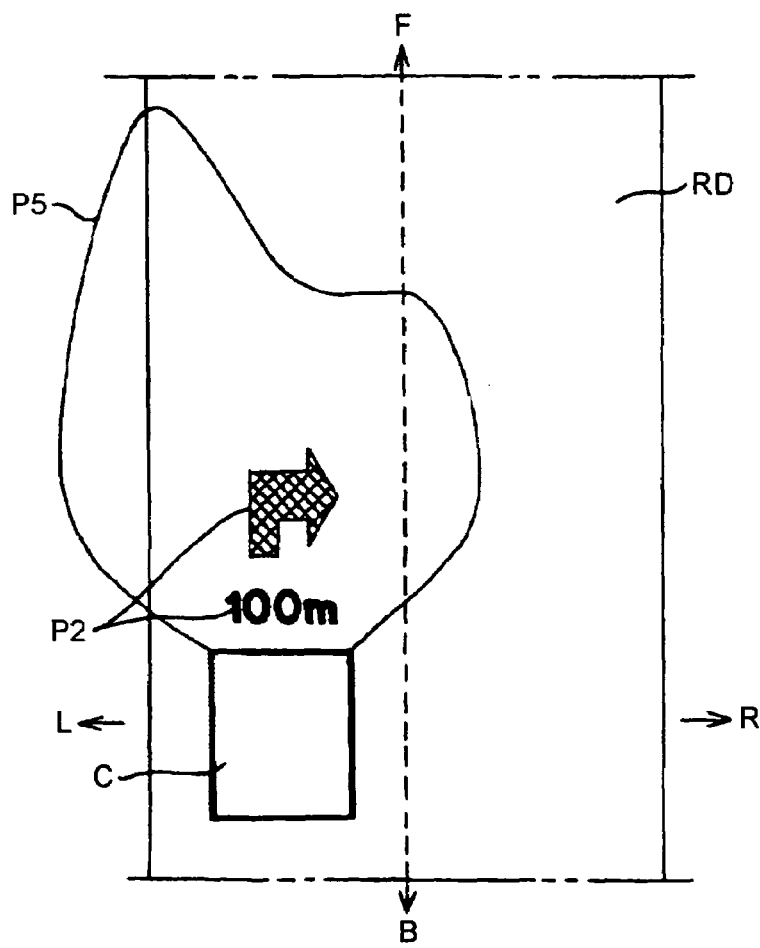
FIG. 42 is a schematic diagram for illustrating a state in which contrast information is displayed in a predetermined light distribution pattern irradiated on a road surface and the like in the digital lighting system according to the seventh embodiment.

The contrast information P2 includes, for example, a graphic, a symbol, a letter, a number, and the like. As shown in FIGS. 41 and 42, the contrast information P2 in this embodiment includes "an arrow curved to the right" and "a letter of '100 m'" based on the position information signal output from the GPS or the like of the information acquisition unit 9. The contrast information P2 is displayed in the light distribution pattern for the vehicle passing-by the other vehicle (the optimum light distribution pattern P5 for the surrounding environment of the vehicle) for illuminating the road surface and the like RD.

Figure 43:
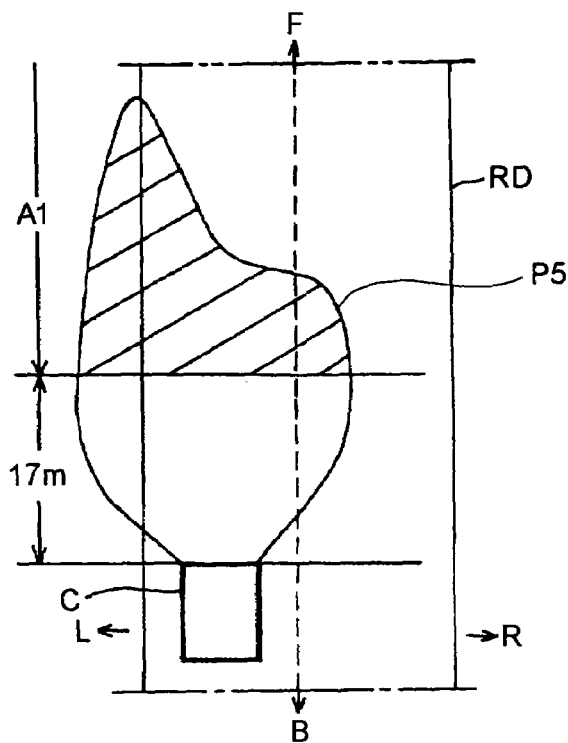
FIG. 43 is a schematic diagram for illustrating information display requirements for satisfying a driving task.
Figure 44:
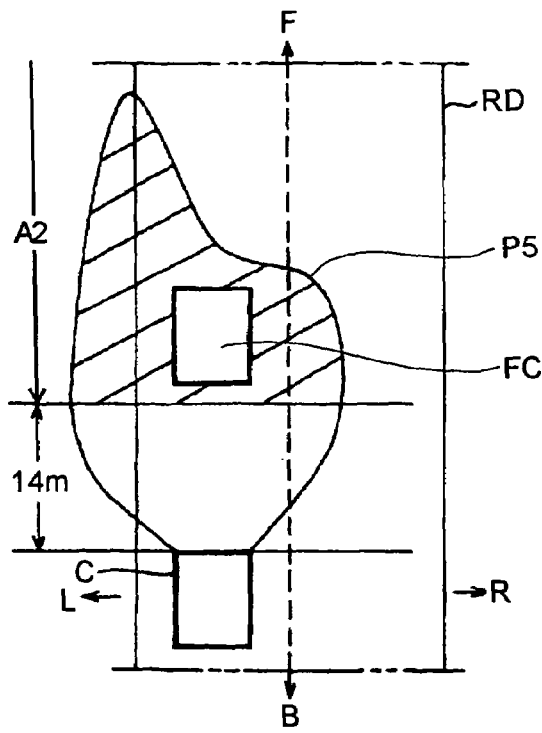
FIG. 44 is a schematic diagram for illustrating information display requirements for satisfying a condition that the information display is not obstructed by a preceding vehicle.

The contrast information P2 is displayed within the following range. As shown in FIG. 43, the contrast information P2 is displayed within about 17 meters ahead in the traveling direction of the vehicle C. Namely, in order to satisfy the driving task of the driver, preview for three seconds or more is required. If the vehicle C is running at 20 km/h or more (since the vehicle running at less than 20 km/h is considered a slow-moving vehicle, a necessary condition for the preview for three seconds or more is excluded), it is necessary for the lighting apparatus of the vehicle to illuminate at least about 17 meters ahead in the traveling direction of the vehicle C. A range A1 more than about 17 meters ahead in the traveling direction is a range for acquiring information on the field of view necessary for the driving task, e.g., the shape of the road and whether an obstacle is present. Therefore, if the contrast information P2 is displayed within the range A1 more than 17 meters ahead in the traveling direction, the display obstructs the driving task. Thus, it is preferable for traffic safety to display the contrast information P2 within about 17 meters ahead in the traveling direction of the vehicle C so as to meet the driving task of the driver.

The contrast information P2 is displayed within about 14 meters ahead in the traveling direction of the vehicle C. Namely, if a preceding vehicle FC is present, the driver of the vehicle C generally tends to maintain distance to the preceding vehicle FC corresponding to about 2.5 seconds. The distance that corresponds to about 2.5 seconds corresponds to about 14 meters if the vehicle C is running at 20 km/h. If the contrast information P2 is displayed within a range A2 more than about 14 meters in the traveling direction, the display of the contrast information P2 is obstructed by a tail end of the preceding vehicle FC. It is, therefore, preferable for traffic safety to display the contrast information P2 within about 14 meters ahead in the traveling direction of the vehicle C so as not to be obstructed by the tail end of the preceding vehicle FC.

Figure 45:
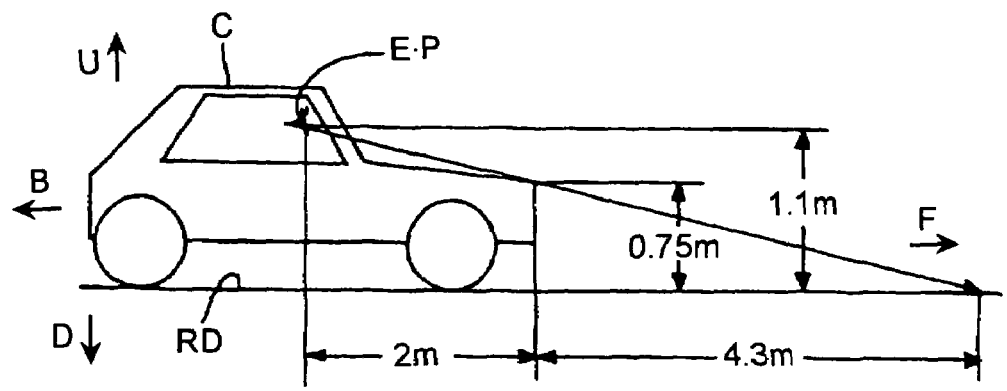
FIG. 45 is a schematic diagram for illustrating information display requirements for satisfying a condition that the information display is not obstructed by a hood of a vehicle.
Figure 46:
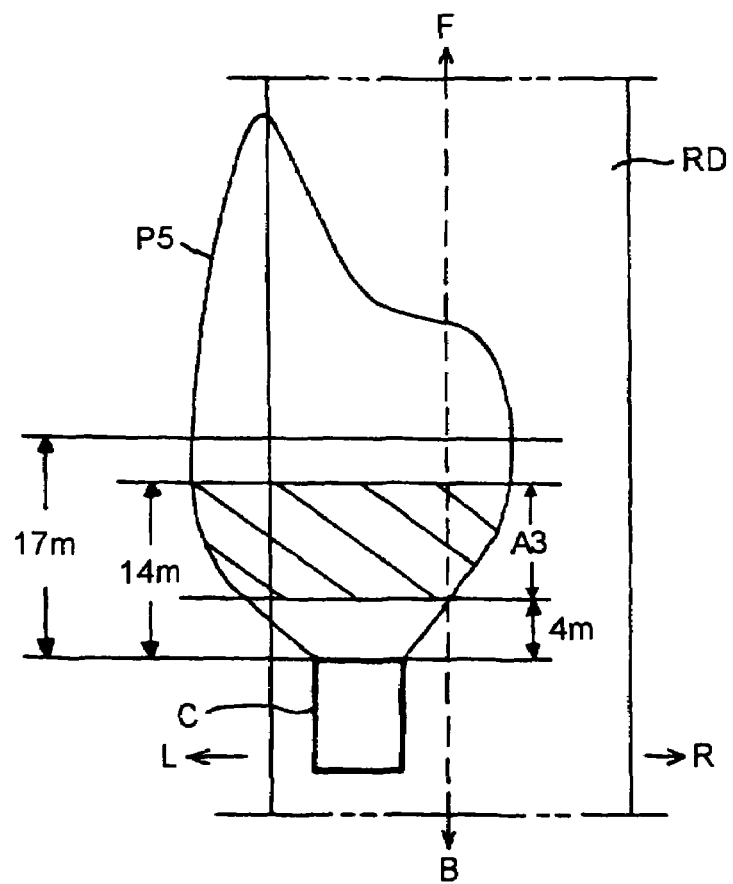
FIG. 46 is a schematic diagram for illustrating a state in which the information display requirements for satisfying the driving task, the condition that the information display is not obstructed by a preceding vehicle, and the condition that the information display is not obstructed by the hood of the vehicle are put together.

As shown in FIGS. 45 and 46, the contrast information P2 is displayed more than about 4 meters ahead in the traveling direction of the vehicle C. Namely, a body shape of the vehicle C causes a blind spot for the visibility of the driver toward the forward road surface. If the vehicle C is a normal sedan, the field of view from a driver's seat has a blind spot caused by the influence of the hood of the vehicle C. For example, if a height of the hood is 0.75 meters above the ground, a length of the hood from a driver's eye E·P is 2 meters, and a height of the driver's eye E·P is 1.1 meter above the ground, the range within about 4.3 meters or less ahead in the traveling direction of the vehicle C enters the blind spot of the field of view by the influence of the hood. For this reason, if the contrast information P2 is displayed within about 4 meters ahead in the traveling direction, the contrast information P2 enters the blind point caused by the hood. It is, therefore, preferable for traffic safety to display the contrast information P2 more than 4 meters ahead in the traveling direction of the vehicle C so as not to enter the blind spot caused by the hood.

Thus, it is preferable for traffic safety to display the contrast information P2 within a range A3 that is about 4 to 14 meters ahead in the traveling direction of the vehicle C.

Basically, the digital display system according to the seventh embodiment is constituted so that the vehicle digital lighting assemblies (each of which includes the optical engine 1, the reflection type digital light deflector 2, and the light irradiation unit 3 or includes the reflection optical deflector 2 and the light irradiation unit 3) are respectively loaded on the left and the right in the front portion of the vehicle C at predetermined intervals. Therefore, if the contrast information P2 is displayed from each of the left and right vehicle digital lighting assemblies, it is necessary to strictly calculate an irradiation position, an irradiation direction, a spacing between the left and right digital lighting apparatuses, and an attachment height of each of the left and right digital lighting apparatuses so that shapes of the contrast information P2 displayed from the left and right vehicle digital lighting assemblies do not deviate from each other. Nevertheless, because of attachment allowances of the left and right vehicle digital lighting assemblies or the like, the shapes of the contrast information P2 displayed from the left and right vehicle digital lighting assemblies often deviate from each other. The digital display apparatus in this embodiment, therefore, displays the contrast information P2 by the following method.

Figure 47:
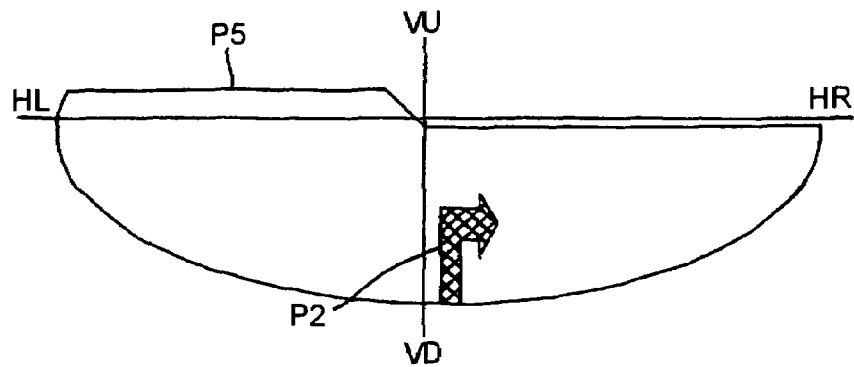
FIG. 47 is a schematic diagram for illustrating a state in which the contrast information is displayed and irradiated in the predetermined light distribution pattern on one side of the reflection type digital light deflector.

First, as shown in FIG. 47, the reflection digital light deflector 2 included in one of the left and right vehicle digital lighting assemblies irradiates and displays the information P2 formed by the OFF reflected light in the predetermined light distribution pattern P5 (e.g., the light distribution pattern P5 for the vehicle passing by the other vehicle) for illuminating the road surface and the like RD through the light irradiation unit 3 under the following control of an information display unit 90.

The other reflection digital light deflector 2 included in one of the left and right vehicle digital lighting assemblies irradiates and displays a non-lighting portion PD formed by the OFF reflected light in the predetermined light distribution pattern P5 for illuminating the road surface and the like RD so as to surround the information P2 through the light irradiation unit 3 under the following control of the information display unit 90.

The information P2 from one of the left and right vehicle digital lighting assemblies and the non-lighting portion PD from the other one of the left and right vehicle digital lighting assemblies are combined with each other, whereby the information P2 from one vehicle digital lighting assembly is located within a range of the non-lighting portion PD from the other assembly. By doing so, the shapes of the contrast information P2 do not deviate from each other, as compared with an instance in which the information is displayed from the left and right vehicle digital lighting assemblies, respectively. Namely, the contrast information P2 is displayed in a clear contrast.

Assuming that the algorithms for the control of the information display unit 90 are sub-algorithms, the sub-algorithms are added to a main algorithm (see FIG. 17) for the control by the controller 6.

If the information signal from the information acquisition unit 9 is input to the information display unit 90 through the external signal input unit 60, this information display unit 90 calculates a polygon that is the shape of the contrast information P2 and a rectangle of the non-lighting portion PD from the information signal based on the following sub-algorithm, and controls the OFF reflected lights of the left and right reflection type digital light deflectors 2.

Figure 50:
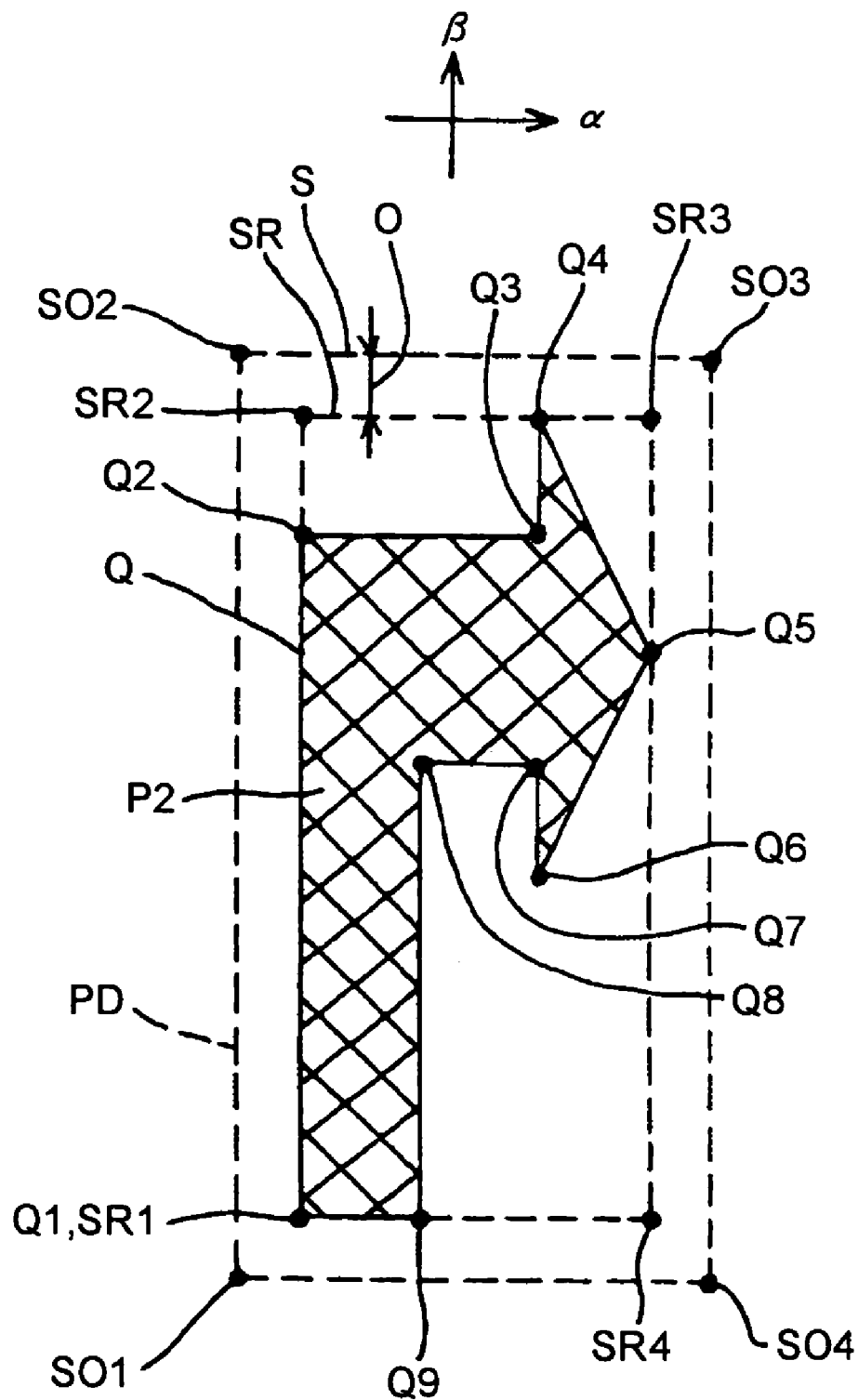
FIG. 50 is a schematic diagram for illustrating a method of forming a polygon of the contrast information.
Figure 51:
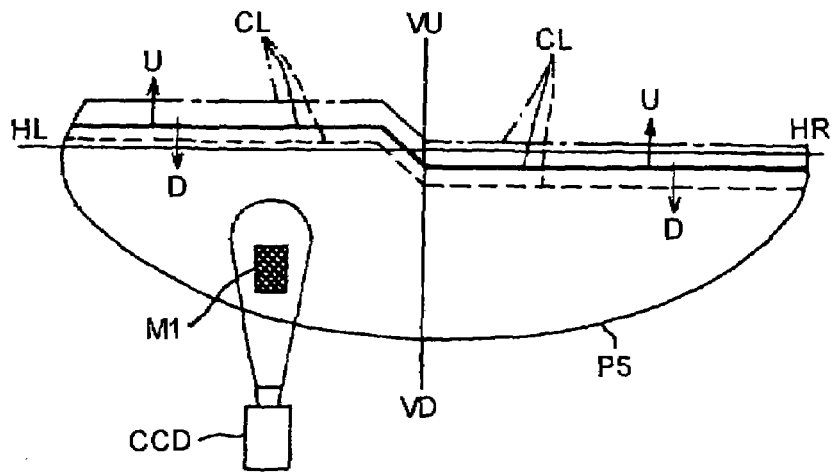
FIG. 51 is a schematic diagram for illustrating a light distribution pattern and an auto-leveling mark of a digital lighting apparatus according to a first modification of the seventh embodiment.

The information display unit 90 calculates the polygon Q that is the shape of the contrast information P2 from the information signal based on a sub-algorithm (1) of "Qi=($\alpha$i, $\beta$i) (i=1 to 9)" as shown in FIG. 50.

The information display unit 90 calculates a first rectangle SR that surrounds the polygon Q based on a sub-algorithm (2) of "SRj=($\alpha$j, $\beta$j) (j=1 to 4)" as shown in FIG. 50.

The information display unit 90 calculates a second rectangle S that surrounds the first rectangle SR, i.e., offset outward of the first rectangle SR based on a sub-algorithm (3) of "SOj=($\alpha$j+O (offset quantity), $\beta$j+O (offset quantity)) (j=1 to 4)" as shown in FIG. 50.

The information display unit 90 outputs the polygon Q (Qi, where i=1 to 9) obtained as a result of the calculation based on the sub-algorithm (1) to one reflection type digital light deflector 2 through the control signal output unit 63 based on a sub-algorithm (4). In addition, the information display unit 90 outputs the second rectangle S (SOj, where j=1 to 4) obtained as a result of the calculation based on the sub-algorithm (3) to the one reflection type digital light deflector 2 through the control signal output unit 63.

The surrounding environment detector 5 detects an environment surrounding the vehicle, and outputs a detection signal (see the step S1 shown in FIG. 17). The external signal input unit 60 inputs the detection signal and outputs the detection signal as a processing signal (see the step S2 shown in FIG. 17). The surrounding environment determination unit 61 inputs the processing signal and outputs the determination signal (see the step S3 shown in FIG. 17). The data selection unit 62 inputs the determination signal and selects the optimum light distribution data for the surrounding environment of the vehicle (see the step S4 shown in FIG. 17). The control signal output unit 63 outputs the control signal based on the selected light distribution data (see the step S5 shown in FIG. 17).

If the controller 6 outputs the control signal to the reflection digital light deflector 2, the reflection digital light deflector 2 controls the ON and OFF switching of the many micro mirror elements 25 based on the control signal, i.e., the digital data on the optimum light distribution pattern for the surrounding environment of the vehicle. The digital lighting system according to the seventh embodiment can thereby automatically select the optimum light distribution pattern P5 for the surrounding environment of the vehicle and illuminate the road surface and the like in the selected optimum light distribution pattern for the surrounding environment of the vehicle.

If the information signal from the information acquisition device 9 is input to the information display unit 90 through the external signal input unit 60, this information display unit 90 calculates the polygon Q that is the shape of the contrast information P2 and the second rectangle S of the non-lighting portion PD from the information signal based on the sub-algorithm, and outputs the calculation result to the left and right reflection digital light deflectors 2 through the control signal output unit 63.

Figure 48:
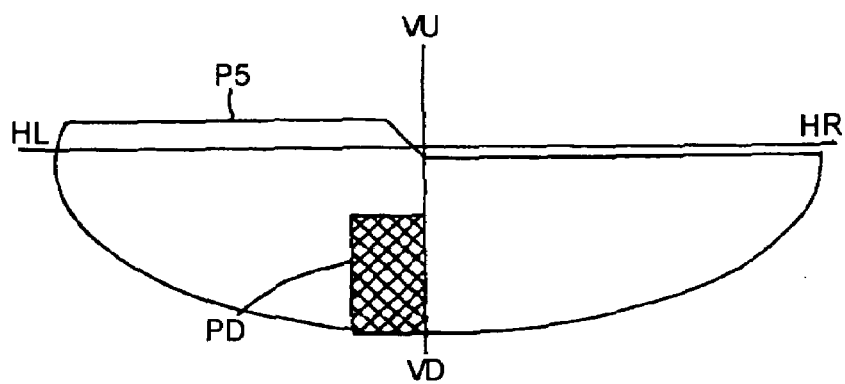
FIG. 48 is a schematic diagram for illustrating a state in which a non-lighting portion is displayed and irradiated in the predetermined light distribution pattern on other side of the reflection type digital light deflector.
Figure 49:
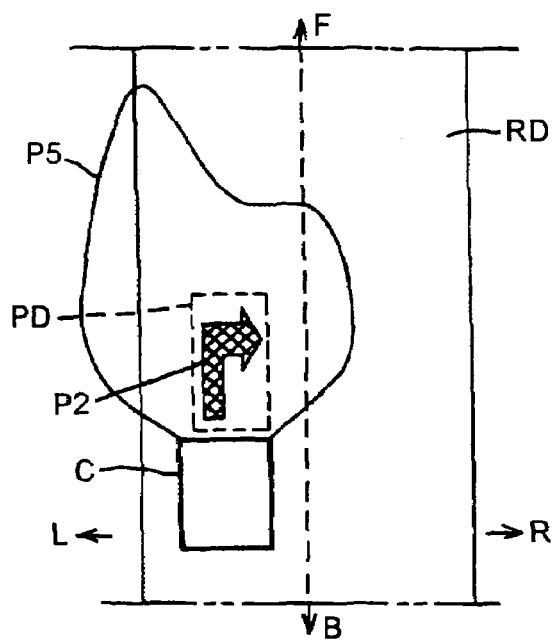

As shown in FIG. 47, one of the left and right reflection digital light deflectors 2 irradiates and displays the information P2 formed by the OFF reflected light in the predetermined light distribution pattern P5 for illuminating the road surface and the like through the light irradiation unit 3 under the control of the information display unit 90. As shown in FIG. 48, the other reflection digital light deflector 2 irradiates and displays the non-lighting portion PD formed by the OFF reflected light in the predetermined light distribution pattern P5 for illuminating the road surface and the like RD so as to surround the contrast information P through the light irradiation unit 3 under the control of the information display unit 90. As shown in FIG. 49, the contrast information P is displayed in the predetermined light distribution pattern P5 for illuminating the road surface and the like RD while the information P is located within the non-lighting portion PD.

The advantages of the digital lighting system according to the seventh embodiment, which is constituted as explained above, will be explained.

The digital lighting system according to the seventh embodiment can display the contrast information P in the predetermined light distribution pattern P5 for illuminating the road surface and the like RD by the information display unit 90. Therefore, the driver can drive the vehicle C based on the displayed information. Hence, the digital lighting system is preferable for traffic safety.

The digital lighting system according to the seventh embodiment can automatically display the surrounding information on the vehicle C in the predetermined light distribution pattern P5 for illuminating the road surface and the like RD as the contrast information P by the information acquisition device 9. Therefore, the digital lighting system according to the seventh embodiment allows the driver to instantly grasp the surrounding information on the vehicle C from the automatically displayed contrast information P and to drive the vehicle C based on the automatically displayed contrast information P. Hence, the digital lighting system is preferable for traffic safety.

The digital lighting system according to the seventh embodiment can display the contrast information P in the predetermined light distribution pattern P5 for illuminating the road surface and the like RD within the range of about four to 14 meters ahead in the progress direction of the vehicle C. Therefore, it is possible to satisfy the driving task of the driver. In addition, the display of the contrast information P is not obstructed by the tail end of the preceding vehicle FC and the contrast information P does not enter the blind spot of the field of view caused by the hood. Hence, the system is preferable for traffic safety.

According to the digital lighting system according to the seventh embodiment, as shown in FIG. 47, one of the left and right reflection digital light deflectors 2 irradiates and displays the information P2 formed by the OFF reflected light in the predetermined light distribution pattern P5 for illuminating the road surface and the like RD through the light irradiation unit 3 under the control of the information display unit 90. As shown in FIG. 48, the other reflection digital light deflector 2 irradiates and displays the non-lighting portion PD formed by the OFF reflected light in the predetermined light distribution pattern P5 for illuminating the road surface and the like RD so as to surround the contrast information P through the light irradiation unit 3 under the control of the information display unit 90. As a result, as shown in FIG. 49, the digital lighting system according to the seventh embodiment displays the contrast information P in the predetermined light distribution pattern P5 for illuminating the road surface and the like RD while the information P is located within the non-lighting portion PD. By doing so, the digital lighting system according to the seventh embodiment can display the information using the contrast between the ON reflected light and the OFF reflected light without fading or deviation, as compared with the instance in which the information formed by the OFF reflected light is displayed in the predetermined light distribution pattern from the left and right reflection digital light deflectors through the light irradiation units, respectively. Namely, the digital lighting system according to the seventh embodiment can display the polygon Q that is the shape of the contrast information P in a clear contrast and acquire clear information. Hence, the digital lighting system according to the seventh embodiment is preferable for traffic safety.

The digital lighting system according to the seventh embodiment can automatically select the predetermined light distribution pattern P5 optimum for the surrounding environment of the vehicle and constantly illuminate the road surface and the like RD in the optimum predetermined light distribution pattern P5 optimum for the surrounding environment of the vehicle. Hence, the digital lighting system according to the seventh embodiment is preferable for traffic safety.

FIG. 51, FIG. 52A, FIG. 52B, and FIG. 52C are schematic diagrams for illustrating a digital lighting system according to a first modification of the seventh embodiment. The same reference symbols as those in FIG. 1 to FIG. 50 denote the same constituent elements.

The digital lighting system in the first modification of the seventh embodiment has a self-completive auto-leveling function that includes an imaging device CCD. Namely, the information display unit 90 displays an auto-leveling mark M1 as the contrast information P5 in the light distribution pattern P5 for the vehicle passing by the other vehicle that is the optimum light distribution pattern for the surrounding environment of the vehicle. The imaging device CCD images the auto-leveling mark M1 and outputs an image signal to the controller 6 as the orientation signal. This imaging device CCD includes, for example, a CCD camera for visible light or infrared light. The controller 6 controls the reflection digital light deflector 2 based on the orientation signal from the imaging device CCD and vertically moves a cut line CL of the light distribution pattern P5 for the vehicle passing by the other vehicle.

Figure 52A:
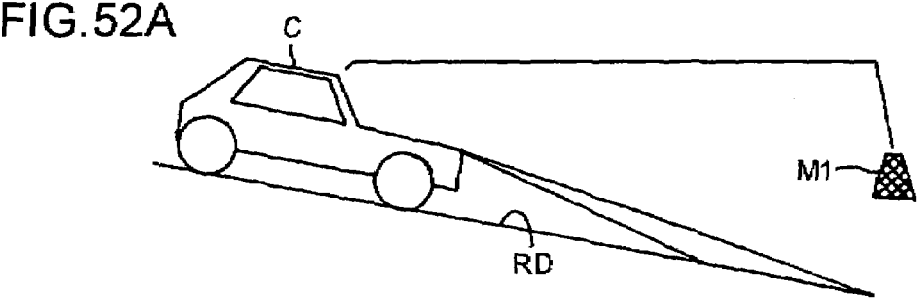
FIG. 52A is a schematic diagram for illustrating a state of the auto-leveling mark when a vehicle is running on a down-hill road.
Figure 52B:
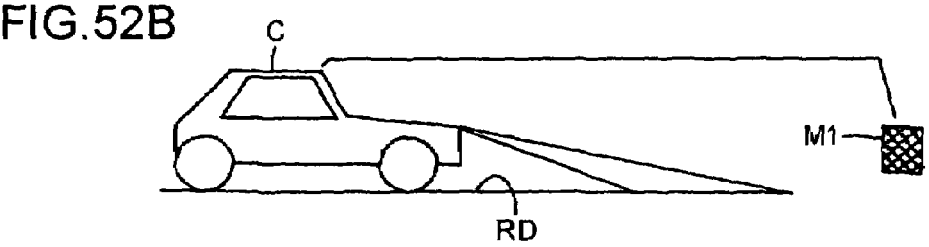
FIG. 52B is a schematic diagram for illustrating a state of the auto-leveling mark when a vehicle is running on a plain road.
Figure 52C:
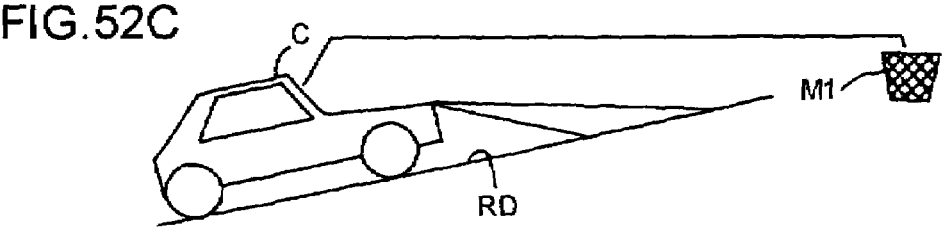
FIG. 52C is a schematic diagram for illustrating a state of the auto-leveling mark when a vehicle is running on an up-hill road.

For example, if the vehicle is running on a down-hill road surface and the like RD, the auto-leveling mark M1 is shaped to have a tapered upper end. As shown in FIG. 52B, if the vehicle is running on a horizontal road surface and the like RD, the auto-leveling mark M1 is shaped to be rectangular. As shown in FIG. 52C, if the vehicle is running on an up-hill road surface and the like RD, the auto-leveling mark M1 is shaped to have a tapered lower end.

The imaging device CCD images the auto-leveling mark M1 and outputs the image signal to the controller 6. The controller 6 determines that the vehicle is running on the down-hill road surface and the like RD and moves the cut line CL of the light distribution pattern P5 for the vehicle passing by the other vehicle in an arrow-U direction from a thick line or broken line to a one-dot chain line, i.e., upward or maintains the state indicated by the one-dot chain line if the auto-leveling mark M1 based on the orientation signal from the imaging device CCD is shaped to have the tapered upper end as shown in FIG. 52A.

The controller 6 determines that the vehicle is running on the horizontal road surface and the like RD and moves the cut line CL of the light distribution pattern P5 for the vehicle passing by the other vehicle in an arrow-D direction from the one-dot chain line to the thick line, i.e., downward, moves the cut line CL of the light distribution pattern P5 in an arrow-U direction from the broken line to the thick line, i.e., upward or maintains the state indicated by the thick line if the auto-leveling mark M1 based on the orientation signal from the imaging device CCD is shaped to be rectangular as shown in FIG. 52B.

The controller 6 determines that the vehicle is running on the up-hill road surface and the like RD and moves the cut line CL of the light distribution pattern P5 for the vehicle passing by the other vehicle in the arrow-U direction from the thick line or the one-dot chain line to the broken line, i.e., downward or maintains the state indicated by the broken line if the auto-leveling mark M1 based on the orientation signal from the imaging device CCD is shaped to have the tapered lower end as shown in FIG. 52C.

The digital lighting system in the first modification of the seventh embodiment includes the imaging device CCD as the information acquisition device 9. The digital lighting system can thereby automatically, vertically move the cut line CL of the light distribution pattern P5 for the vehicle passing by the other vehicle, i.e., perform so-called auto-leveling according to a vertical change in the orientation of the vehicle C. Besides, the digital lighting system in the first modification of the seventh embodiment grasps a deformation quantity of the auto-leveling mark M1 displayed in the light distribution pattern for the vehicle passing by the other vehicle as the variation of the orientation of the vehicle C. Therefore, it is unnecessary to provide the orientation sensor or the like that detects the orientation of the vehicle C and that outputs the orientation signal and manufacturing cost can be reduced, accordingly. The digital lighting system in the first modification of the seventh embodiment can dispense with the orientation sensor or the like and perform the auto-leveling by the vehicle digital lighting apparatus including the imaging device CCD that serves as the information acquisition device 9 in a self-completive manner.

Figure 53:
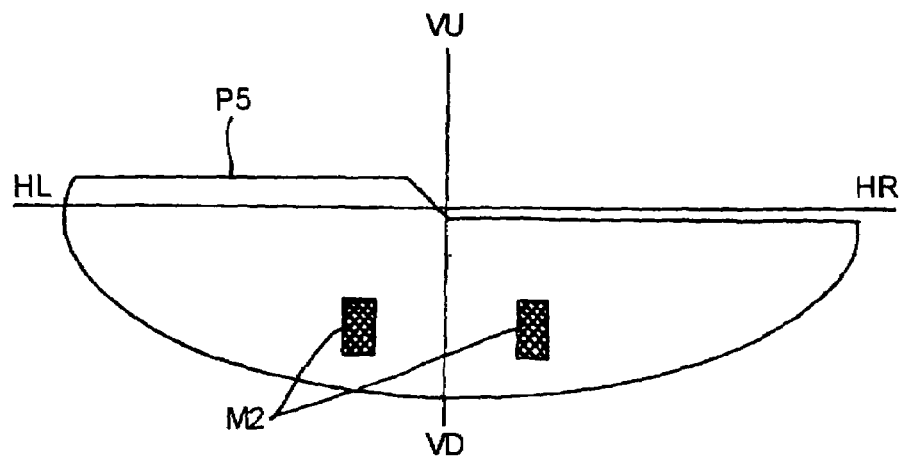
FIG. 53 is a schematic diagram for illustrating a light distribution pattern and a vehicle width mark of a digital lighting apparatus according to a second modification of the seventh embodiment.
Figure 54:
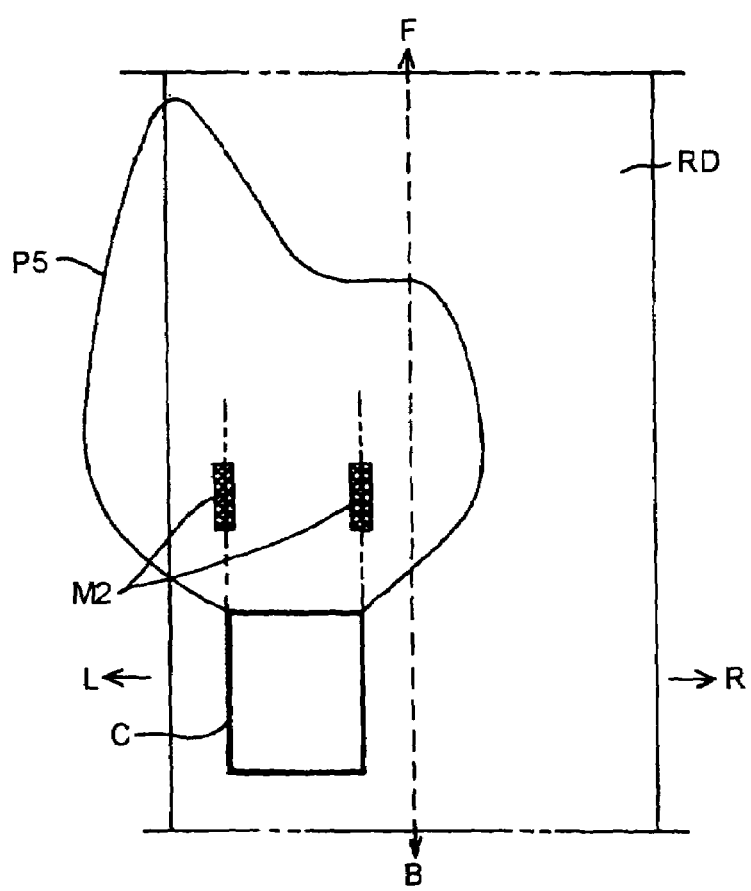
FIG. 54 is a schematic diagram for illustrating a state in which the vehicle width mark is displayed in a predetermined light distribution pattern that illuminates the road surface.

FIG. 53 and FIG. 54 are schematic diagrams for illustrating a digital lighting system according to a second modification of the seventh embodiment. The same reference symbols as those in FIG. 1 to FIG. 52C denote the same constituent elements.

In the digital lighting system in the second modification of the seventh embodiment, the information display unit 90 displays a vehicle width mark M2 that serves as the contrast information P5 in the predetermined light distribution pattern P5. As a result, the digital lighting system in the second modification of the seventh embodiment can grasp the vehicle width based on the vehicle width mark M2 and, therefore, the driver can grasp the surrounding information on the vehicle. Hence, the digital lighting system in the second modification of the seventh embodiment is preferable for traffic safety.

The digital lighting system in the second modification of the seventh embodiment can grasp can display such contrast information P as "WATCH DROPPINGS", "RAILROAD CROSSING IS QUITE NEAR", "VATCH STEEP CURVE", or "WATCH DOWNWARD PATH".

Figure 55:
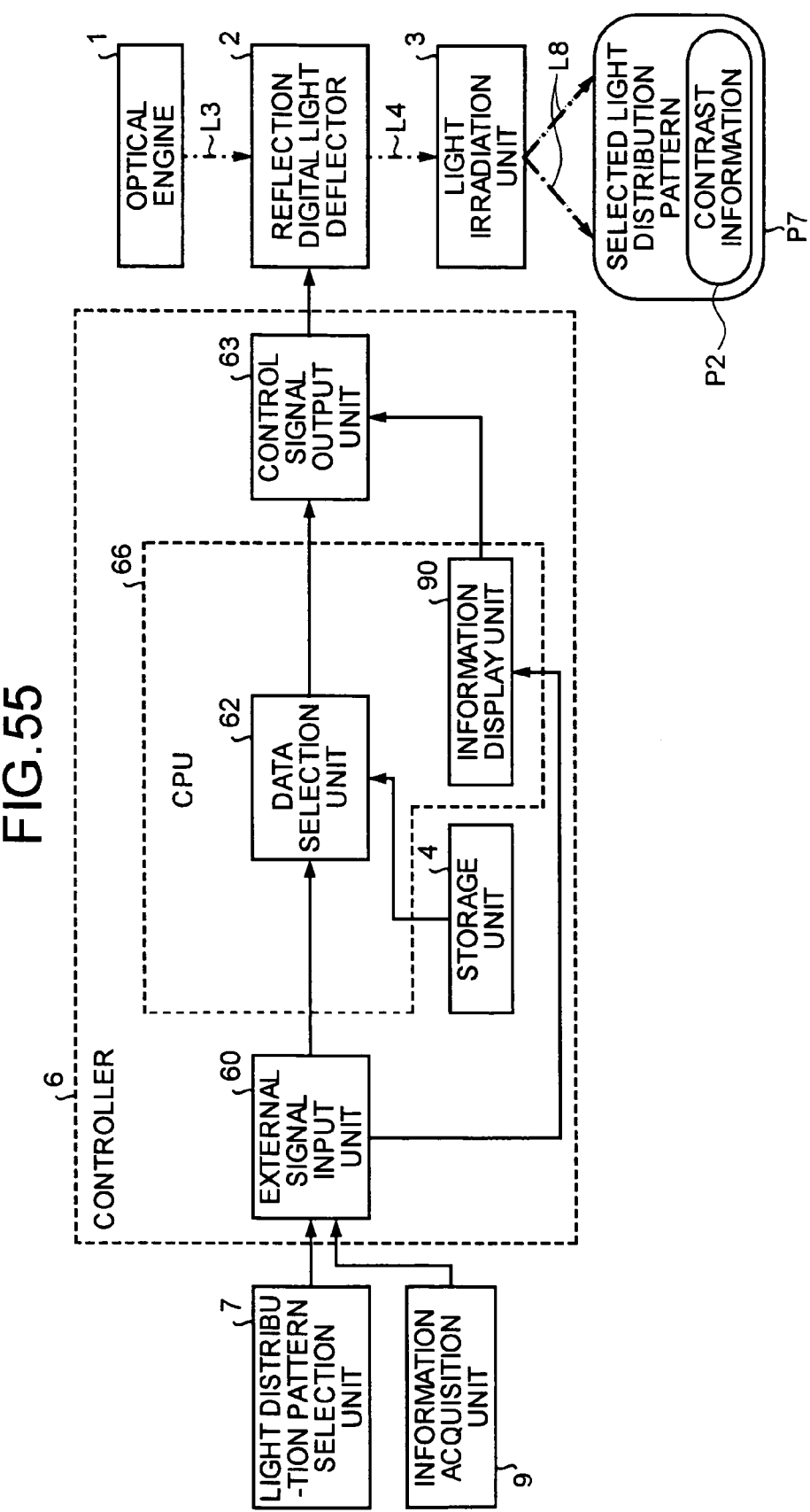
FIG. 55 is a block diagram of a digital lighting apparatus according to the seventh embodiment.
Figure 56:
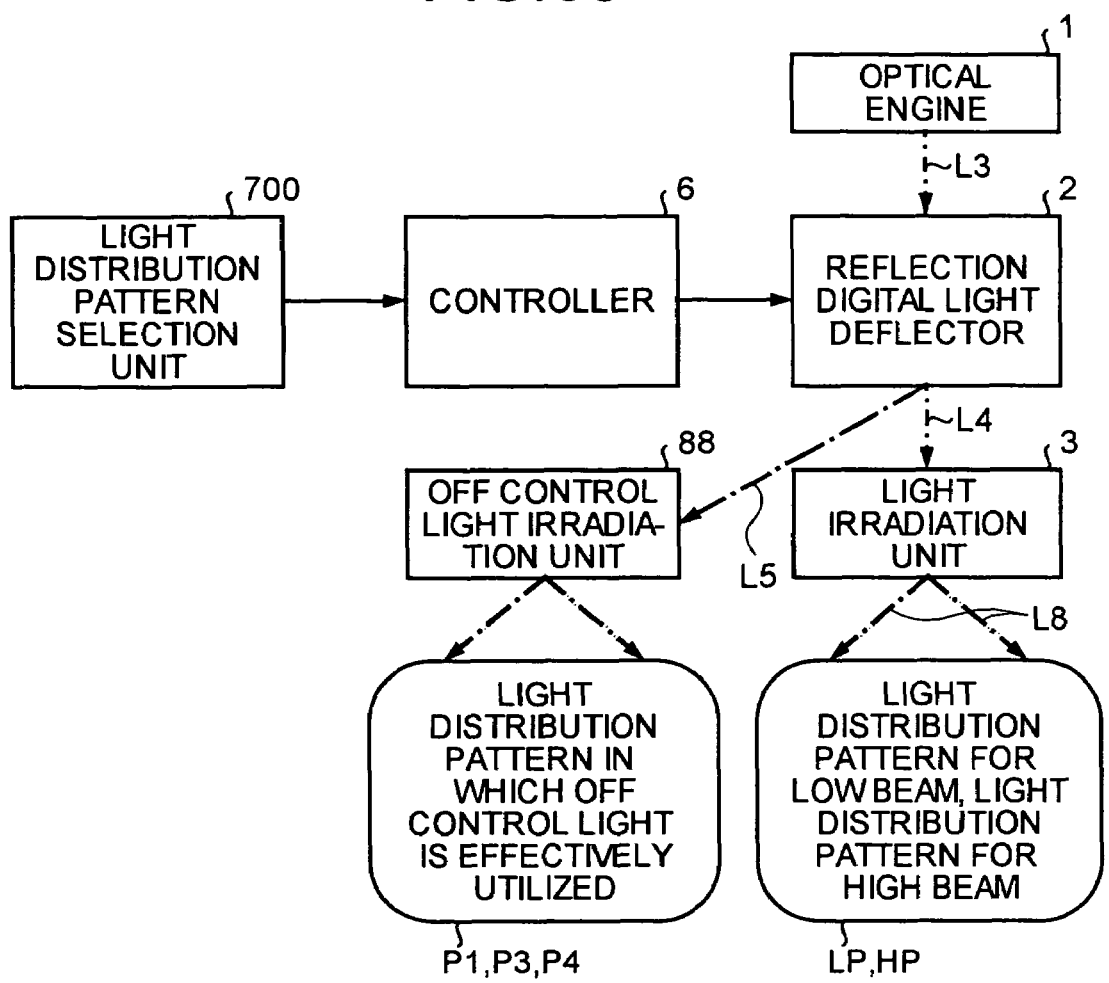
FIG. 56 is a block diagram of a digital lighting apparatus according to an eighth embodiment of the present invention.

FIG. 55 is a block diagram of a digital lighting apparatus according to a fifth embodiment of the present invention. The same reference symbols as those in FIG. 1 to FIG. 54 denote the same elements.

The digital lighting system according to the seventh embodiment automatically selects the optimum predetermined light distribution pattern P5 (see FIG. 40) and illuminates the road surface and the like in the selected, the optimum predetermined light distribution pattern P5. The vehicle digital lighting apparatus in this seventh embodiment, by contrast, selects the predetermined light distribution pattern P7 and illuminates the road surface and the like in the selected, predetermined light distribution pattern P7.

Figure 40:
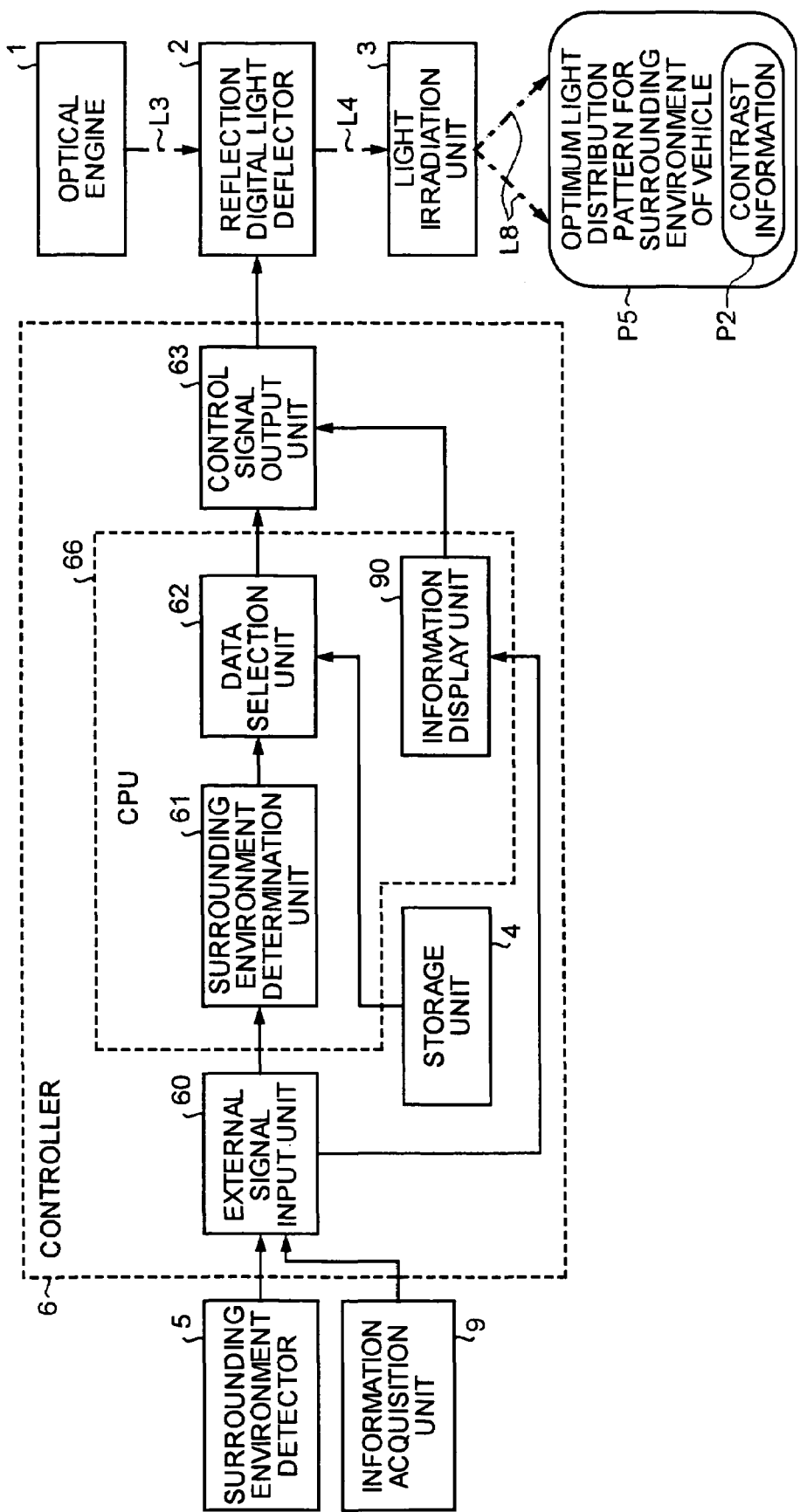
FIG. 40 is a block diagram of a digital lighting system according to a seventh embodiment of the present invention.

Namely, the digital lighting system according to the seventh embodiment automatically selects the optimum predetermined light distribution pattern P5 using the surrounding environment detector 5 (see FIG. 40) and the surrounding environment determination unit 61 (see FIG. 40). The vehicle digital lighting apparatus in this seventh embodiment allows the driver to select the predetermined light distribution pattern P7 using the light distribution pattern select device 7.

The light distribution pattern selection unit 7 is connected to the external signal input unit 60 in the controller 6 and the external signal input unit 60 is connected to the data selection unit 62 in the CPU 66. The light distribution pattern selection unit 7 allows the driver to select the light distribution pattern for illuminating the road surface and the like and outputs the selection signal based on driver's selection to the external signal input unit 60 in the controller 6.

The functions and advantages of the vehicle digital lighting apparatus according to the seventh embodiment, which is constituted as explained above, will be explained.

The driver selects the light distribution pattern for illuminating the road surface and the like using the light distribution pattern selection unit 7. If so, the light distribution pattern selection unit 7 outputs the selection signal based on driver's selection to the external signal input unit 60. The interface circuit of the external signal input unit 60 inputs the external signal such as the selection signal from the light distribution pattern selection unit 7, processes the external signal so that the controller 6 can handle the signal, and outputs the processing signal to the data selection unit 62.

The data selection unit 62 selects digital data on the driver's selected light distribution pattern from among the pieces of digital data on the light distribution patterns stored in the storage unit 4 based on the selection signal from the light distribution pattern selection unit 7 through the external signal input unit 60.

The driver circuit of the control signal output unit 63 outputs the control signal for individually, digitally controlling switchover of the tilt angles of the minimum error elements 25 (see FIG. 5 to FIG. 8) to the reflection digital light deflector 2 based on the digital data on the light distribution pattern selected by the data selection unit 62.

If the controller 6 outputs the control signal to the reflection digital light deflector 2, the reflection digital light deflector 2 controls ON and OFF switching of the many micro mirror elements 25 based on the control signal, i.e., the digital data on the driver's selected light distribution pattern. The vehicle digital lighting apparatus according to the seventh embodiment can thereby illuminate the road surface and the like in the light distribution pattern P7 selected by the driver.

If the information signal from the information acquisition device 9 is input to the information display unit 90 through the external signal input unit 60, the contrast information P is displayed in the predetermined light distribution pattern P7 for illuminating the road surface and the like RD while the contrast information P is located in the non-lighting portion PD.

As can be seen, the vehicle digital lighting apparatus according to the seventh embodiment can attain the functions and advantages substantially equal to those of the digital lighting system according to the seventh embodiment.

The vehicle digital lighting apparatus according to the seventh embodiment particularly allows the driver to conduct the functions of the surrounding environment detector 5 and the surrounding environment determination unit 61 of the digital lighting system according to the fifth embodiment. Therefore, the vehicle digital lighting apparatus can dispense with the surrounding environment detector 5 and the surrounding environment determination unit 61 and manufacturing cost can be reduced, accordingly.

FIG. 56 to FIG. 63 are schematic diagrams for illustrating a digital lighting apparatus according to an eighth embodiment of the present invention. The same reference symbols as those in FIG. 56 to FIG. 63 denote the same constituent elements.

The vehicle digital lighting apparatus in this eighth embodiment can effectively utilize the invalidated OFF control signal. The vehicle digital lighting apparatus according to the eighth embodiment includes the optical engine 1, the reflection digital light deflector 2, the light irradiation unit 3, a light distribution pattern selection unit 700, the controller 6, and an OFF control signal irradiation unit 88.

In the reflection digital light deflector 2, each of the micro mirror elements 25 (see FIG. 5 to FIG. 8) in an OFF state reflects the light L3 from the optical engine 1 in an OFF or a second reflection direction indicated by a one-dot chain line arrow as shown in FIG. 8. The reflected light L5 indicated by the one-dot chain line arrow is an OFF control light, reflected toward the OFF control light irradiation unit 88 at an angle of 6θ against the incident light L3, and illuminates the road surface and the like in the predetermined light distribution pattern. Thus, the vehicle digital lighting apparatus according to the eighth embodiment can effectively utilize the OFF control light L5 that has been invalidated, using the OFF control light irradiation unit 88. The vehicle digital lighting apparatus according to the eighth embodiment does not include an optical absorber 26 shown in FIG. 8.

The light irradiation unit 3 irradiates the road surface and the like with the ON light 4 (ON control light 4) from the reflection digital light deflector 2 as a low beam forming the light distribution pattern LP for the vehicle passing by the other vehicle or as a high beam forming a light distribution pattern HP for the running vehicle.

The light distribution pattern selection unit 700 allows the driver to perform a switchover and selection operation for switching over the light distribution pattern for illuminating the road surface and the like from the vehicle digital lighting apparatus according to the eighth embodiment to the light distribution pattern LP for the vehicle passing by the other vehicle or the light distribution pattern HP for the running vehicle.

The controller 6 individually, digitally controlling switchover of the minimum mirror elements 25 based on the digital data on the light distribution pattern LP for the vehicle passing by the other vehicle or that on the light distribution pattern LP for the running vehicle by a switchover and selection operation of the light distribution pattern selection unit 70.

Figure 57:
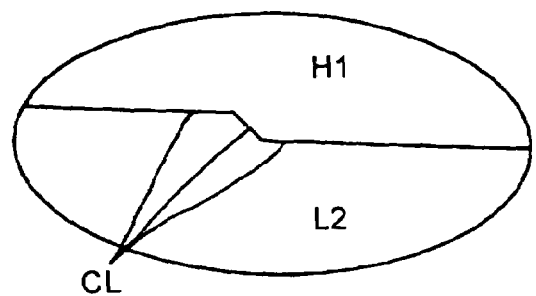
FIG. 57 is a schematic diagram for illustrating a state in which micro mirror elements of the reflection digital light deflector are divided into a first group and a second group in the digital lighting apparatus according to the eighth embodiment.

Namely, as shown in FIG. 57, the controller 6 controlling each of the many micro mirror elements 25 of the reflection digital light deflector 2 while dividing each element 25 to a first group H1 and a second group H2 at the cut line CL as a boundary. Each of the many micro mirror elements 25 of the reflection digital light deflector 2 of the reflection digital light deflector 2 shown in FIG. 57 is an ellipse corresponding to the light distribution pattern HP for the running vehicle shown in FIG. 58, the light distribution pattern LP for the vehicle passing by the other vehicle shown in FIG. 59 and FIG. 60, or a light distribution pattern DP for the OFF control light shown in FIG. 60. The many micro mirror elements 25 are actually arranged rectangularly.

Figure 58:
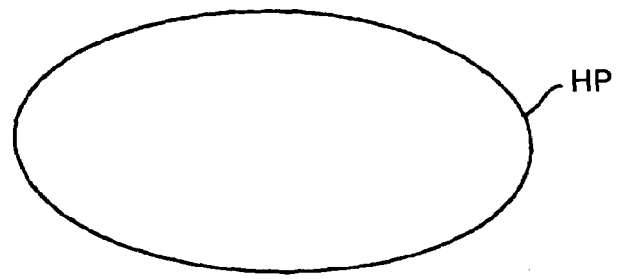
FIG. 58 is a schematic diagram of a light distribution pattern for a high beam in the digital lighting apparatus according to the eighth embodiment.
Figure 59:
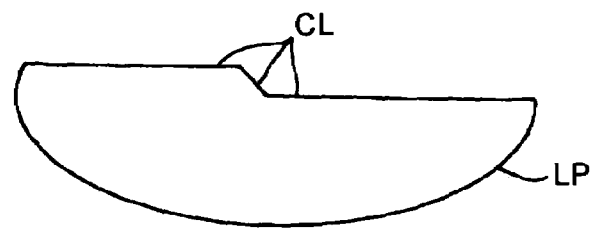
FIG. 59 is a schematic diagram of a light distribution pattern for a low beam in the digital lighting apparatus according to the eighth embodiment.

If the controller 6 controls the micro mirror elements 25 in the first group H1 and those in the second group H2 to be turned on, the light distribution pattern HP for the running vehicle shown in FIG. 58 is obtained. If the controller 6 controls the micro mirror elements 25 in the first group H1 to be turned off and those in the second group H2 to be turned on, the light distribution pattern LP for the vehicle passing by the other vehicle shown in FIG. 59 is obtained. The pattern (which is checkered a pattern shown in FIG. 60) DP above the cut line CL in this light distribution pattern LP for the vehicle passing by the other vehicle is the light distribution pattern of the OFF control light 5 from the micro mirror elements 25 in the first group H1 that are controlled to be turned off by the controller 6.

The OFF control light irradiation unit 88 irradiates the road surface and the like with the OFF control light that has been invalidated in the predetermined light distribution pattern in a predetermined direction.

Figure 61:
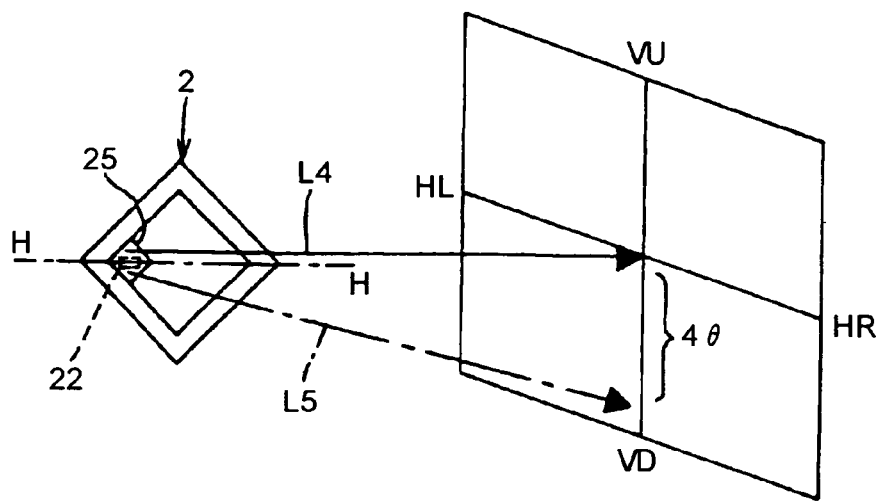
FIG. 61 is a schematic diagram for illustrating a correlation between ON control light and OFF control light when a tilt axis of the micro mirror element is horizontal in the digital lighting apparatus according to the eighth embodiment.
Figure 62:
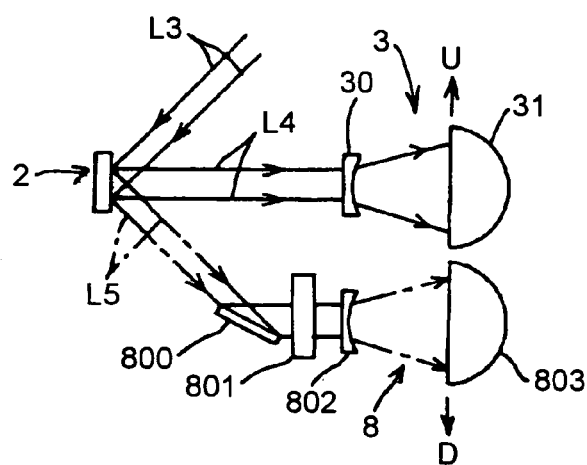
FIG. 62 is a schematic diagram of an OFF control light irradiation unit of the digital lighting apparatus according to the eighth embodiment.

As shown in FIG. 61, in the vehicle digital lighting apparatus according to the eighth embodiment, the tilt axis H—H of the micro mirror element 25 of the reflection digital light deflector 2 is horizontal. In this state, the OFF control light L5 is emitted downward (or upward) of the ON control light L4 emitted from the reflection digital light deflector 2 in the first reflection direction. In this specification, "the tilt axis (H—H) of the micro mirror element 25 of the reflection digital light deflector 2 is horizontal" signifies a set position of the reflection digital light deflector 2 at which the micro mirror element 25 is inclined around the tilt axis (H—H) in a vertical direction and at which the OFF control light L5 is reflected upward or downward of the ON control light L4.

Figure 60:
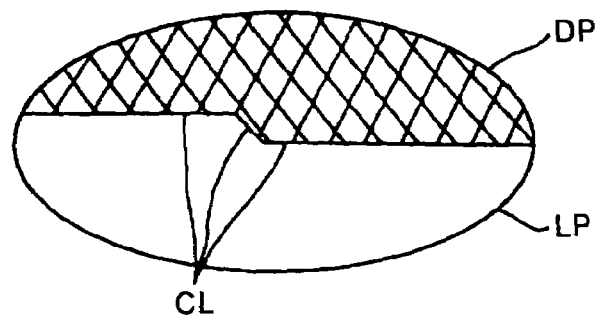
FIG. 60 is a schematic diagram of the light distribution pattern for the low beam and a light distribution pattern for OFF control light in the digital lighting apparatus according to the eighth embodiment.

Therefore, during the irradiation of light in the light distribution pattern LP for the vehicle passing by the other vehicle shown in FIG. 59, the light distribution pattern DP for the OFF control light shown in FIG. 60 is irradiated downward (or upward) as a vertically, horizontally inverted pattern relative to the light distribution pattern LP for the vehicle passing by the other vehicle shown in FIG. 59. An angle between the first reflection direction of this ON control light L4 and the second reflection direction of the OFF control light L5 is 40 (e.g., 40 degrees or 48 degrees).

The OFF control light irradiation unit 88 includes a mirror 800 that reflects the OFF control light L5 from the reflection digital light deflector 2 while vertically inverting the light L5, a cylindrical lens 801 that horizontally inverts a reflected light from the mirror 800, a divergent lens 802 that diverges a light emitted from the cylindrical lens 801, a convergent lens (projection lens) 803 that irradiates a light emitted from the divergent lens 802 on the road surface and the like as an irradiation light.

The functions of the vehicle digital lighting apparatus according to the eighth embodiment, which is constituted as explained above, will be explained.

By driver's operation of the light distribution pattern selection unit 700, the controller 6 controls the reflection digital light deflector 2 to illuminate the road surface and the like from the light irradiation unit in the light distribution pattern LP for the vehicle passing by the other vehicle shown in FIG. 59 or the light distribution pattern HP for the running vehicle shown in FIG. 58.

Figure 63:
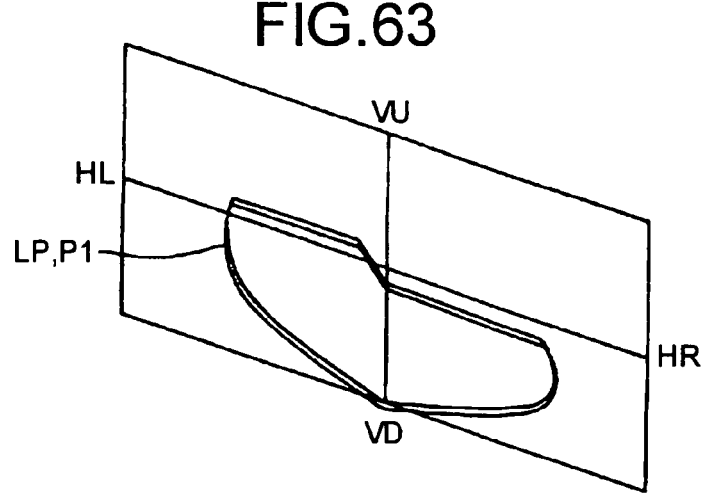
FIG. 63 is a schematic diagram of the light distribution patterns for the low beam and a light distribution pattern in which the OFF control light is effectively used in the digital lighting apparatus according to the eighth embodiment.

If the road surface and the like are irradiated with the light in the light distribution pattern LP for the vehicle passing by the other vehicle shown in FIG. 59, the OFF control light L5 from the reflection digital light deflector 2 is vertically inverted and reflected by the mirror 800, horizontally inverted and transmitted by the cylindrical lens 801, diverged and transmitted by the divergent lens 802, transmitted by the convergent lens (projection lens) 803, and irradiated on the road surface and the like in the predetermined light distribution pattern in the predetermined direction. Namely, as shown in FIG. 63, the OFF control light L5 is irradiated so that the light distribution pattern P1 that is formed by the OFF control light L5 and effectively utilized is superposed on the light distribution pattern LP for the vehicle passing by the other vehicle substantially equally in shape and position.

Thus, the vehicle digital lighting apparatus according to the eighth embodiment can irradiate the OFF control light L5 emitted downward (or upward) of the low beam on the road surface and the like while superposing the pattern P1 on the light distribution pattern LP for the vehicle passing by the other vehicle using the OFF control light irradiation unit 88. Therefore, the vehicle digital lighting apparatus according to the eighth embodiment can obtain the light distribution pattern LP for the vehicle passing by the other vehicle that is formed by the low beam and the predetermined light distribution pattern P1 formed by the OFF control light L5 and effectively utilize the OFF control light L5 that has been invalidated when the light is irradiated in the light distribution pattern LP for the vehicle passing by the other vehicle.

Figure 64:
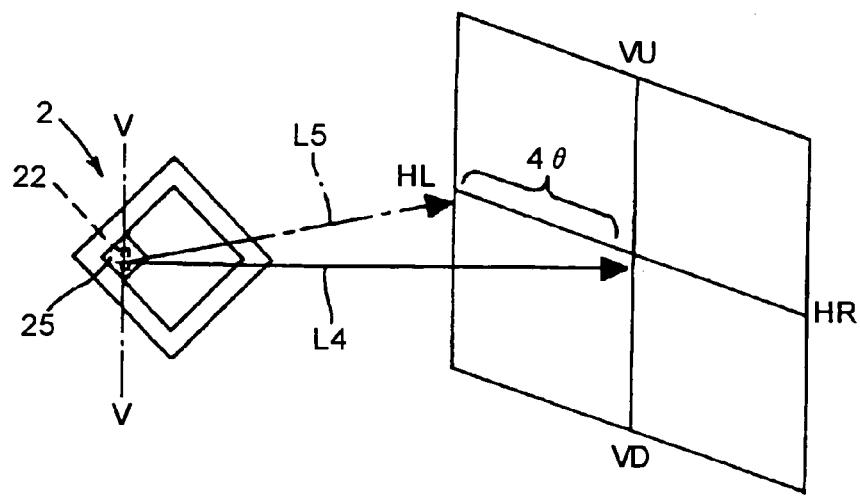
FIG. 64 is a schematic diagram for illustrating a correlation between ON control light and OFF control light when a tilt axis of the micro mirror element is vertical in the digital lighting apparatus according to a first modification of the eighth embodiment.
Figure 65:
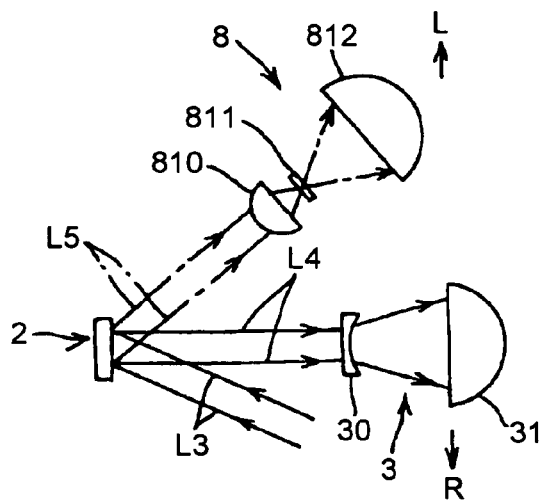
FIG. 65 is a schematic diagram of an OFF control light irradiation unit of the digital lighting apparatus according to the first modification of the eighth embodiment.
Figure 66:
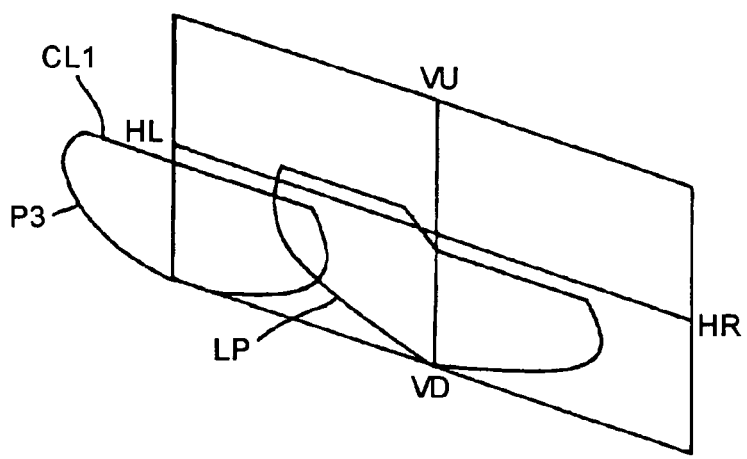
FIG. 66 is a schematic diagram of the light distribution patterns for the low beam and a light distribution pattern in which the OFF control light is effectively used in the digital lighting apparatus according to the first modification of the eighth embodiment.

FIG. 64 to FIG. 66 are schematic diagrams for illustrating a digital lighting apparatus according to a first modification of the eighth embodiment. The same reference symbols as those in FIG. 1 to FIG. 63 denote the same constituent elements.

In the vehicle digital lighting apparatus according to the first modification of the eighth embodiment, the tilt axis V—V of each of the micro mirror elements 25 of the reflection digital light deflector 2 is vertical. In this state, the OFF control light L5 is irradiated in the second reflection direction leftward (or rightward) of the ON control light L4 emitted from the reflection digital light deflector 2 in the first reflection direction. In this specification, "the tilt axis V—V of each of the micro mirror elements 25 of the reflection digital light deflector 2 is vertical" signifies the set position of the reflection digital light deflector 4 at which each of the micro mirror elements 25 is inclined horizontally around the tilt axis V—V and at which the OFF control light L5 is reflected leftward or rightward of the ON control light L4.

Therefore, if the light distribution pattern LP for the vehicle passing by the other vehicle as shown in FIG. 59 is irradiated, the light distribution pattern DP for the OFF control light shown in FIG. 60 is also irradiated leftward (or rightward) as a pattern inverted substantially vertically and horizontally relative to the light distribution pattern LP for the vehicle passing by the other vehicle shown in FIG. 59.

The OFF control light irradiation unit 88 includes a convex lens 810 that vertically and horizontally inverts and transmits the OFF control light L5 from the reflection digital light deflector 2, a shield 811 that is arranged near a focal point of the convex lens 810 and that cuts of part of a transmitted light from the convex lens 810, and a convergent lens (projection lens) 812 that irradiates a transmitted light from the shield 811 on the road surface and the like as an irradiation light.

The functions of the vehicle digital lighting apparatus in the first modification of the eighth embodiment, which is constituted as explained above, will be explained. If the OFF control light L5 is irradiated in the light distribution pattern LP for the vehicle passing by the other vehicle shown in FIG. 59, the OFF control light L5 from the reflection digital light deflector 2 is vertically and horizontally inverted and reflected by the convex lens 810, passed through the shield 811 while part of the light L5 is cut off, transmitted by the convergent lens (projection lens) 812, and irradiated on the road surface and the like in the predetermined light distribution pattern in the predetermined direction. Namely, as shown in FIG. 66, the light distribution pattern P3 that is formed by the OFF control light L5 and effectively utilized is irradiated as a side light in the light distribution pattern P3 cut off at the horizontal cut line CL1 leftward (or rightward) of the light distribution pattern LP for the vehicle passing by the other vehicle.

Thus, the vehicle digital lighting apparatus in the first modification of the eighth embodiment, similarly to the vehicle digital lighting apparatus according to the eighth embodiment, can irradiate the OFF control light L5 emitted leftward (or rightward) of the low beam on the road surface and the like as the side light relative to the light distribution pattern LP for the vehicle passing by the other vehicle using the OFF control light irradiation unit 8. Therefore, the vehicle digital lighting apparatus in the first modification of the eighth embodiment, substantially similarly to the vehicle digital lighting apparatus according to the eighth embodiment, can obtain the light distribution pattern LP for the vehicle passing by the other vehicle that is formed by the low beam and the predetermined light distribution pattern P3 formed by the OFF control light L5 and effectively utilize the OFF control light L5 that has been invalidated when the light is irradiated in the light distribution pattern LP for the vehicle passing by the other vehicle.

Figure 67:
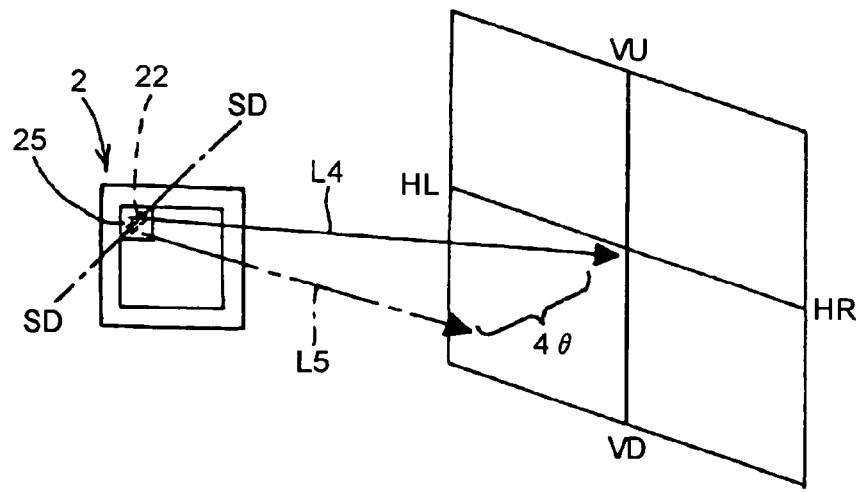
FIG. 67 is a schematic diagram for illustrating a correlation between ON control light and OFF control light when a tilt axis of the micro mirror element is slant in the digital lighting apparatus according to a second modification of the eighth embodiment.
Figure 68:
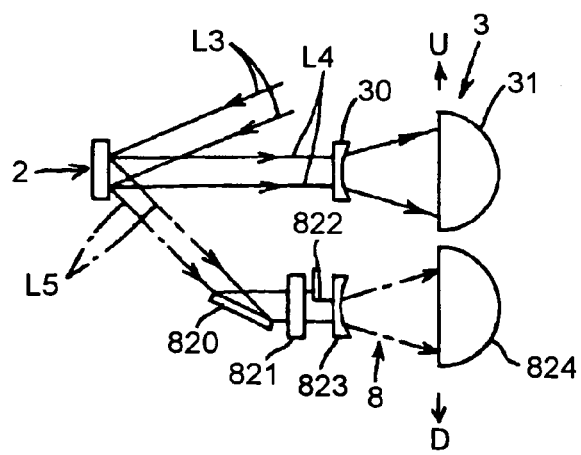
FIG. 68 is a schematic diagram of an OFF control light irradiation unit of the digital lighting apparatus according to the second modification of the eighth embodiment.
Figure 69:
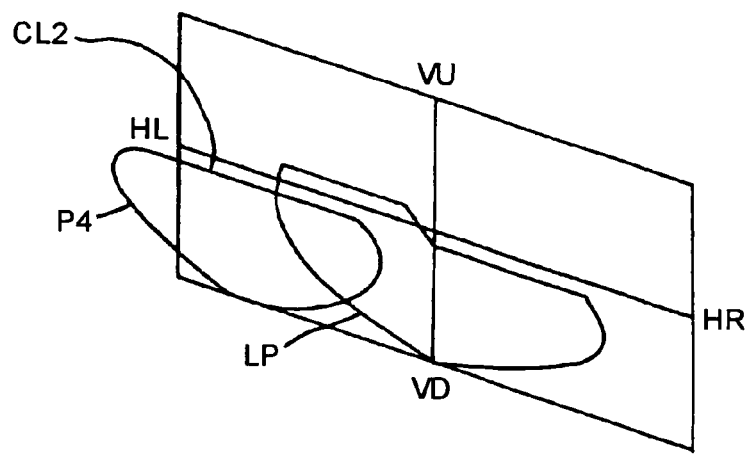
FIG. 69 is a schematic diagram of the light distribution patterns for the low beam and a light distribution pattern in which the OFF control light is effectively used in the digital lighting apparatus according to the second modification of the eighth embodiment.

FIG. 67 to FIG. 69 are schematic diagrams for illustrating digital lighting apparatus according to a second modification of the eighth embodiment. The same reference symbols as those in FIG. 1 to FIG. 66 denote the same constituent elements.

In the digital lighting apparatus in the second modification of the eighth embodiment, the tilt axis SD—SD of each of the micro mirror elements 25 of the reflection digital light deflector 2 is inclined (e.g., inclined relative to the horizontal axis H—H or the vertical axis V—V substantially at 45 degrees). In this state, the OFF control light L5 is irradiated in the second reflection direction on a lower left (or upper right, upper left, or upper right) side of the ON control light L4 emitted from the reflection digital light deflector 2 in the first reflection direction. In this specification, "the tilt axis V—V of each of the micro mirror elements 25 of the reflection digital light deflector 2 is inclined" signifies the set position of the reflection digital light deflector 4 at which each of the micro mirror elements 25 is inclined around the tilt axis SF-SD and at which the OFF control light L5 is reflected on the lower left, upper right, upper left, or upper right side of the ON control light L4.

Therefore, if the light distribution pattern LP for the vehicle passing by the other vehicle as shown in FIG. 59 is irradiated, the light distribution pattern DP shown in FIG. 60 is irradiated on the lower left, upper right, upper left, or upper right side, as a pattern inverted substantially vertically and horizontally, relative to the light distribution pattern LP for the vehicle passing by the other vehicle shown in FIG. 59.

The OFF control light irradiation unit 88 includes a mirror 820 that vertically and horizontally inverts and reflects the OFF control light L5 from the reflection digital light deflector 2, a cylindrical lens 821 that horizontally inverts a reflected light from the mirror 820, a shield 822 that cuts off part of a light emitted from the cylindrical lens 821, a divergent lens 823 that diverges a light passed through the shield 821, and a convergent lens (projection lens) 824 that irradiates a light emitted from the divergent lens 824 on the road surface and the like as an irradiation light.

The functions of the vehicle digital lighting apparatus in the second modification of the eighth embodiment, which is constituted as explained above, will be explained. If the OFF control light L5 is irradiated in the light distribution pattern LP for the vehicle passing by the other vehicle shown in FIG. 59, the OFF control light L5 from the reflection digital light deflector 2 is vertically and horizontally inverted and reflected by the mirror 820, vertically inverted and transmitted by the cylindrical lens 821, horizontally inverted and transmitted by the cylindrical lens 821, passed through the shield 822 while part of the light L5 is cut off, diverged and transmitted by the divergent lens 823, transmitted by the convergent lens (projection lens) 824, and irradiated on the road surface and the like in the predetermined light distribution pattern in the predetermined direction. Namely, as shown in FIG. 69, the light is irradiated in a light distribution pattern P4 cut off at the horizontal cut line CL2 relative to the light distribution pattern LP for the vehicle passing by the other vehicle as a side light on the lower left (lower right, upper left, or upper right) side of the pattern LP.

Thus, the vehicle digital lighting apparatus in the second modification of the eighth embodiment, similarly to the vehicle digital lighting apparatus in the first modification of the eighth embodiment, can irradiate the OFF control light L5 emitted on the lower left (or the lower right, upper left, or upper right) of the low beam on the road surface and the like as the side light relative to the light distribution pattern LP for the vehicle passing by the other vehicle using the OFF control light irradiation unit 8. Therefore, the vehicle digital lighting apparatus in the second modification of the eighth embodiment, substantially similarly to the vehicle digital lighting apparatus in the first modification of the eighth embodiment, can obtain the light distribution pattern LP for the vehicle passing by the other vehicle that is formed by the low beam and the predetermined light distribution pattern P4 formed by the OFF control light L5 and effectively utilize the OFF control light L5 that has been invalidated when the light is irradiated in the light distribution pattern LP for the vehicle passing by the other vehicle.

Figure 70:
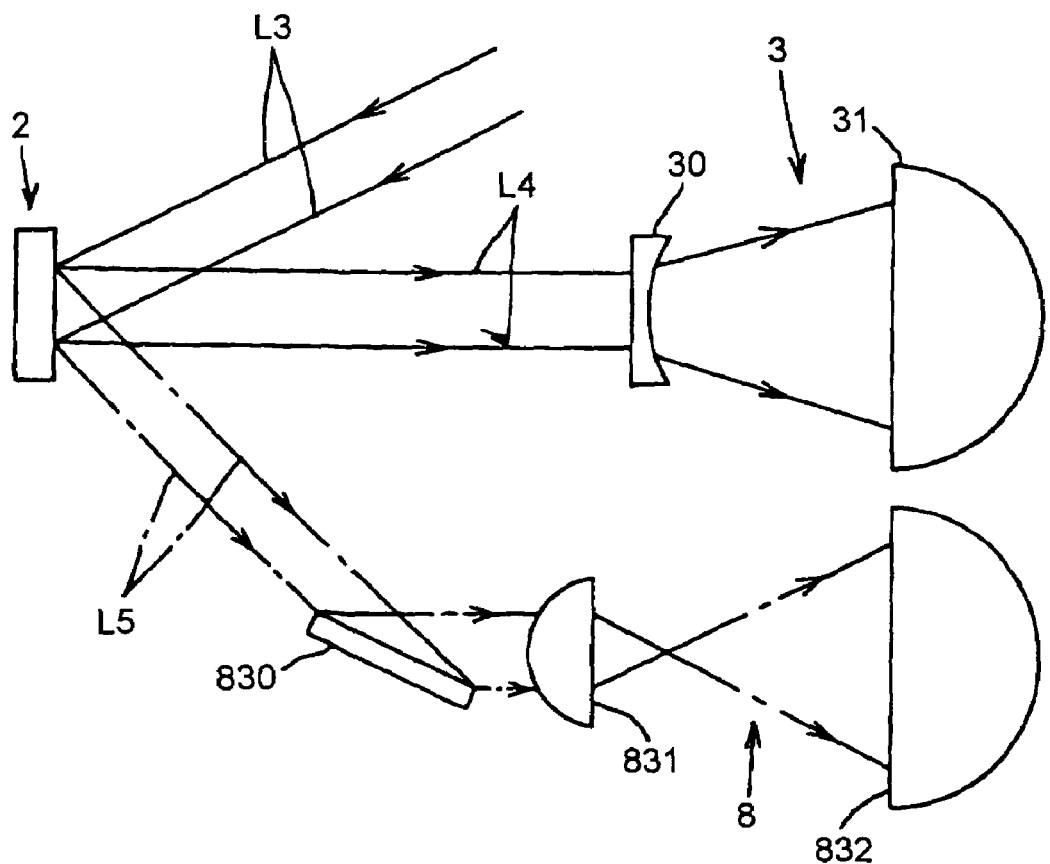
FIG. 70 is a schematic diagram of an OFF control light irradiation unit of the digital lighting apparatus according to a third modification of the eighth embodiment.
Figure 71:
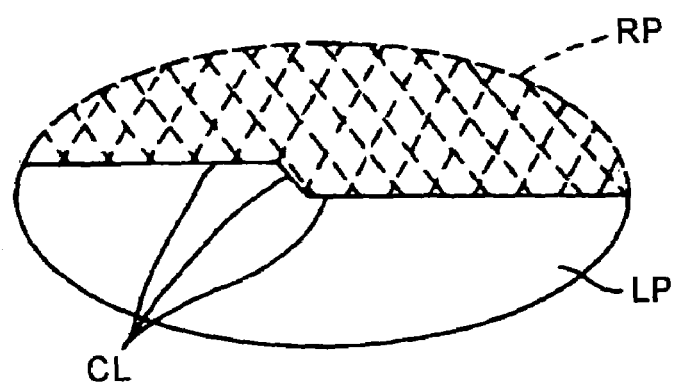
FIG. 71 is a schematic diagram of the light distribution pattern for the low beam and a light distribution pattern for infrared light of the OFF control signal in the digital lighting apparatus according to the third modification of the eighth embodiment.
Figure 72:
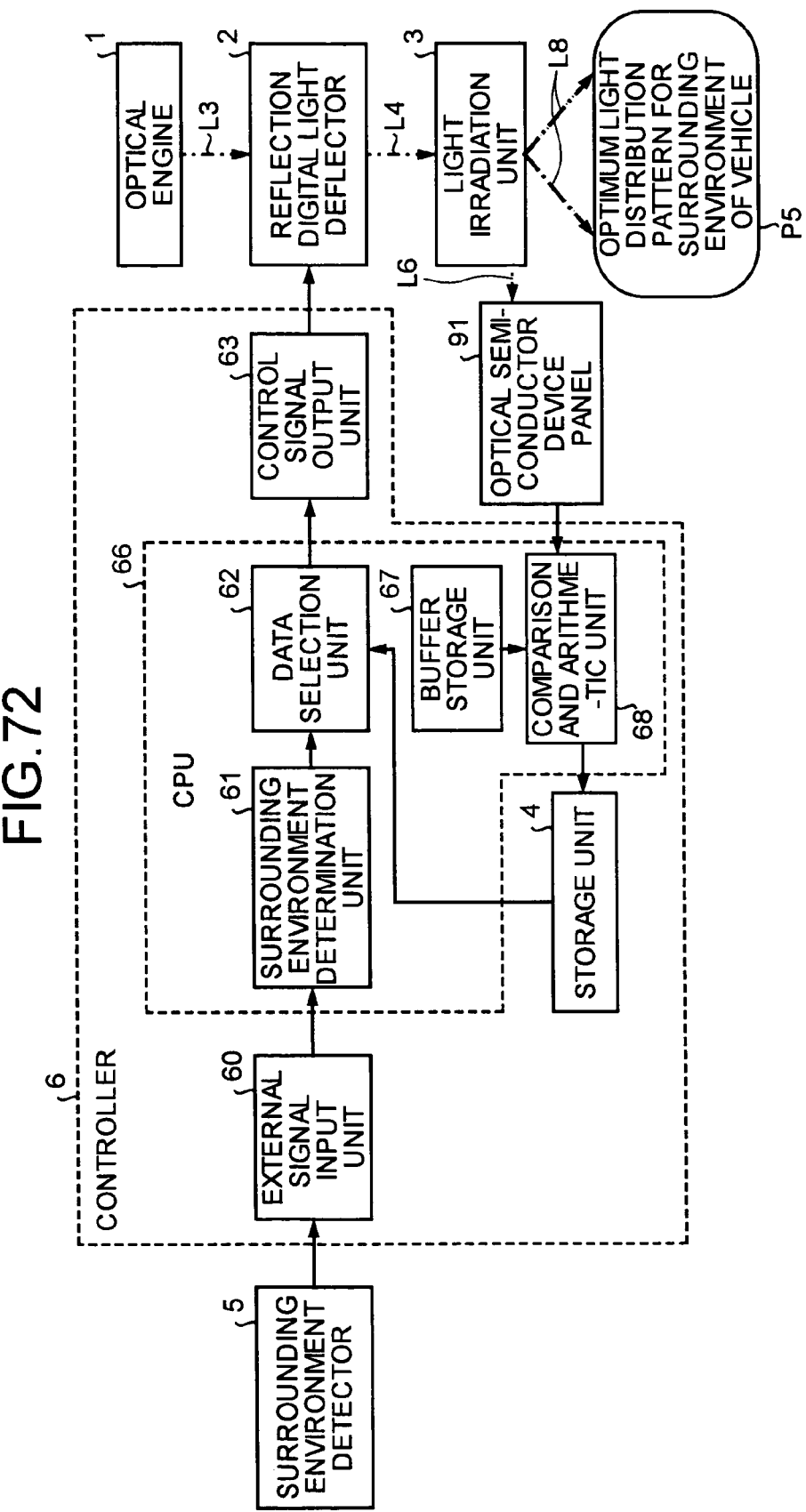
FIG. 72 is a block diagram of a digital lighting system according to the eighth embodiment.

FIG. 70 and FIG. 71 are schematic diagrams for illustrating a digital lighting apparatus according to a third modification of the eighth embodiment. The same reference symbols as those in FIG. 1 to FIG. 69 denote the same constituent elements.

In the vehicle digital lighting apparatus in the third modification of the eighth embodiment, similarly to the vehicle digital lighting apparatus according to the eighth embodiment, the tilt axis H—H of each of the micro mirror elements 25 of the reflection digital light deflector 2 is horizontal.

The OFF control light irradiation unit 88 includes a mirror 830 that vertically and horizontally inverts and reflects the OFF control light L5 from the reflection digital light deflector 2, a convex lens 831 that vertically and horizontally inverts a reflected light from the mirror 830, and a convergent lens (projection lens) 832 that irradiates a light emitted from the convex lens 832 on the road surface and the like as an irradiation light.

In the vehicle digital lighting apparatus in the third modification of the eighth embodiment, the mirror 830 is set to reflect an infrared light or at least one of the convex lens 831 and the convergent lens (projection lens) 832 is set to reflect the infrared light. Alternatively, a tungsten lamp is employed as a light source.

The functions of the vehicle digital lighting apparatus in the third modification of the eighth embodiment, which is constituted as explained above, will be explained. If the OFF control light L5 is irradiated in the light distribution pattern LP for the vehicle passing by the other vehicle shown in FIG. 59, the OFF control light L5 from the reflection digital light deflector 2 is vertically and horizontally inverted and reflected by the mirror 830, vertically and horizontally inverted and transmitted by the convex lens 831, transmitted by the convergent lens (projection lens) 832, and irradiated on the road surface and the like in the predetermined light distribution pattern of the infrared light in the predetermined direction. Namely, as shown in FIG. 71, the light is irradiated in a light distribution pattern PR substantially equal in shape to the pattern cut off at the horizontal cut line CL2 relative to the light distribution pattern LP for the vehicle passing by the other vehicle and located upward of the cut line CL.

Thus, the vehicle digital lighting apparatus in the third modification of the eighth embodiment, similarly to the vehicle digital lighting apparatuss in the first and second modifications of the eighth embodiment, can irradiate the OFF control light L5 on the road surface and the like as the infrared light in the light distribution pattern (checkered light distribution pattern shown in FIG. 71) RP relative to the light distribution pattern LP for the vehicle passing by the other vehicle using the OFF control light irradiation unit 88. Therefore, the vehicle digital lighting apparatus in the third modification of the eighth embodiment, substantially similarly to the vehicle digital lighting apparatuss in the first and second modifications of the eighth embodiment, can obtain the light distribution pattern LP for the vehicle passing by the other vehicle that is formed by the low beam and the predetermined light distribution pattern RP of the infrared light formed by the OFF control light L5. In addition, the vehicle digital lighting apparatus in the third modification of the eighth embodiment can effectively utilize the OFF control light L5 that has been invalidated when the light is irradiated in the light distribution pattern LP for the vehicle passing by the other vehicle.

The vehicle digital lighting apparatus in the third modification of the eighth embodiment can particularly obtain the light distribution pattern RP of the infrared light. Therefore, the vehicle digital lighting apparatus in the third modification of the eighth embodiment can effectively utilize the OFF control light L5 as the infrared light for an infrared system that monitors the surroundings of the vehicle using an infrared imaging device.

In the vehicle digital lighting apparatus according to the eighth embodiment, the first, second, and third modifications of the eighth embodiment, the OFF control light irradiation unit 88 includes the mirror 800, 820, and 830, the cylindrical lens 801 and 821, the divergent lens 802 and 823, and the convergent lens (projection lens) 803, 812, 824, and 832, the convex lens 810 and 831, the shield 811 and 822. However, the configuration of the OFF control light irradiation unit 88 is not limited to a specific one as long as the device can irradiate the OFF control light L5 o the road surface and the like in the predetermined light distribution pattern in the predetermined direction.

FIG. 72 to FIG. 76 are schematic diagrams for illustrating a digital lighting system according to the eighth embodiment. The same reference symbols as those in FIG. 1 to FIG. 71 denote the same constituent elements.

The digital lighting system according to the eighth embodiment can make an initialization correction to an error of the light distribution pattern irradiated from the reflection digital light deflector 2 following manufacturing irregularities of the optical engine or deteriorations with the passage of time. That is, the digital lighting system according to the eighth embodiment has a light distribution pattern initialization function.

The digital lighting system according to the eighth embodiment includes the optical engine 1, the reflection digital light deflector 2, the light irradiation unit 3, the storage unit 4, the surrounding environment detector 5, the controller 6, and an optical semiconductor device panel 91.

In the reflection digital light deflector 2, the micro mirror element 25 in the state in which no current is carried (see FIG. 5 to FIG. 8) is in the horizontal state (neutral state) as indicated by the dotted line shown in FIG. 8 and reflects the parallel light L3 from the optical engine 1 in a third reflection direction indicated by a dotted-line arrow. A reflected light L6 indicated by the dotted-line arrow is reflected at an angle of 4θ against the incident light L3. The optical semiconductor device panel 91 is arranged on an optical path of the reflected light L6 from the reflection digital light deflector 2 in the state in which no current is carried.

Figure 73:
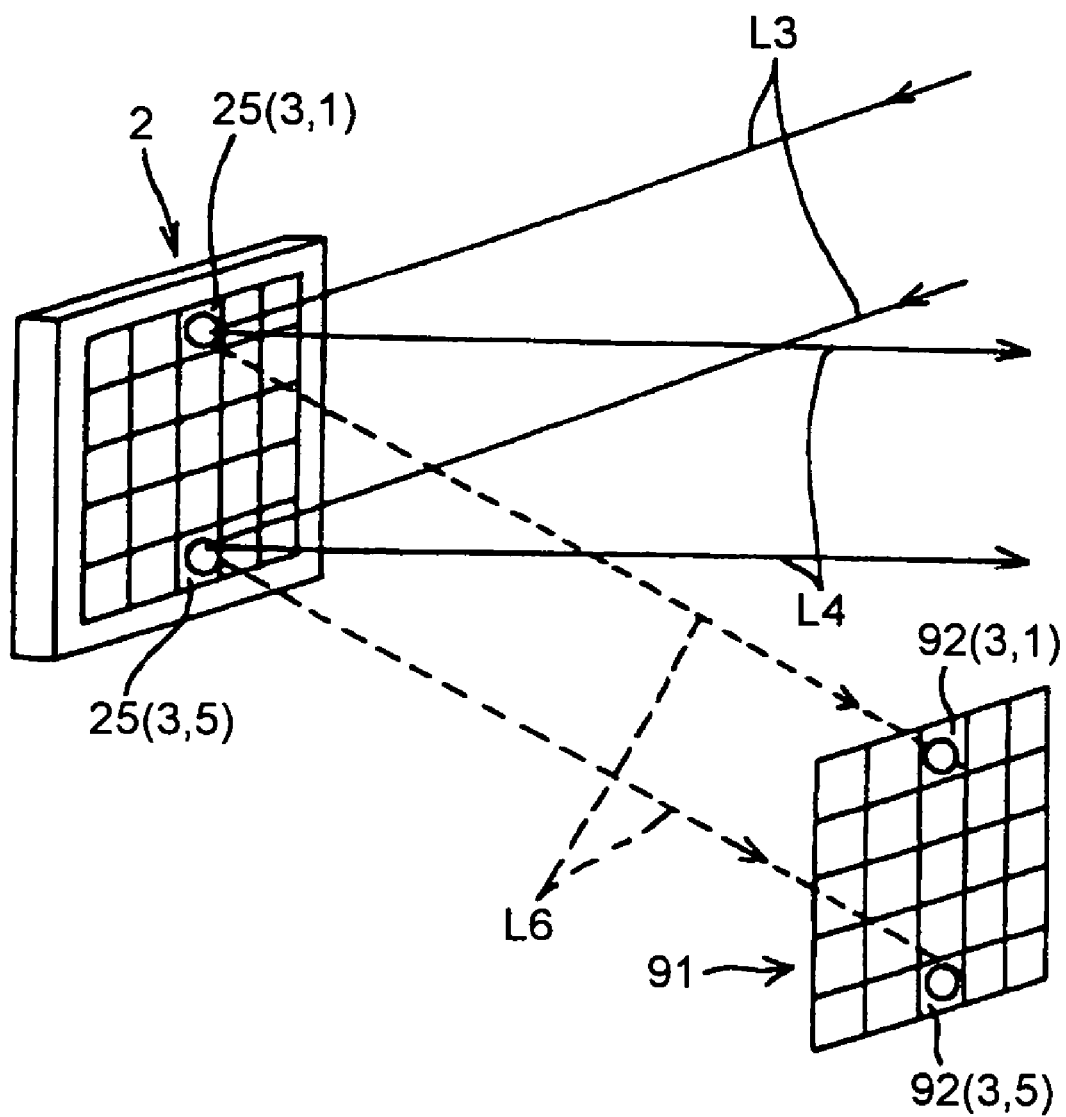
FIG. 73 is a schematic diagram of a reflection digital light deflector and an optical semiconductor device panel of the digital lighting system according to the eighth embodiment.

The optical semiconductor device panel 91 is arranged on the optical path of the reflected light L6 from the reflection digital light deflector 2 in the state in which no current is carried. As shown in FIG. 73, the optical semiconductor device panel 91 includes many optical semiconductor devices 92 that receive the reflected light L6 from the reflection digital light deflector 2 in the state in which no current is carried in a one-by-one correspondence to the many micro mirror elements 25. Namely, the optical semiconductor devices 92 are as many as the micro mirror elements 25 and substantially equal in size to the micro mirror elements 25.

The number of the optical semiconductor devices 92 or the micro mirror elements 25 is (x, y)=5×5=25. Actually, the number is, for example, 1,024×768=786,432. FIG. 73 depicts a state in which the reflected light L6 reflected by the micro mirror element 25 (pixel) in (x, y)=(3, 1) is received by the optical semiconductor device 92 in (x, y)=(3, 1) and in which the reflected light L6 reflected by the micro mirror element 25 (pixel) in (x, y)=(3, 5) is received by the optical semiconductor device 92 in (x, y)=(3, 5). That is, FIG. 73 depicts that the many optical semiconductor devices 92 and the many micro mirror elements 25 have a one-by-one correlation.

Each of the optical semiconductor device 92 includes a CCD, converts the received reflected light L6 from the micro mirror element 25 to received light data by photoelectric conversion, converts the received light data to measurement data by A/D conversion, and outputs the resultant measurement data to a comparison and arithmetic device 68 in the controller 6.

A buffer storage unit 67 that serves as a reference data storage unit is mounted in the CPU 66 in the controller 6. This buffer storage unit 67 stores refer data D1 that is bit data sown in FIG. 74.

X indicates a pixel position in an x direction of the micro mirror elements 25 shown in FIG. 9 and takes a value, for example, from 0 to 1,024. Likewise, Y indicates a pixel position in a y direction of the micro mirror elements 25 shown in FIG. 9 and takes a value, for example, from 0 to 768. Z indicates a pixel value and takes a value, for example, from zero to eight bits.

The comparison and arithmetic device 68 is mounted in the CPU 66 in the controller 6. This comparison and arithmetic device 68 compares the reference data D1 from the buffer storage unit 67 (the reference value D1 shown in FIG. 74) with the measurement data D2 from the optical semiconductor device panel 91 (the measurement data D2 shown in FIG. 75) to calculate an error, and outputs corrected data obtained by correcting the reference data D1 by as much as the error (corrected data D3 shown in FIG. 76) to the storage unit 4. The reference data D1, the measurement data D2, and the corrected data D3 are bit data.

The functions of the digital lighting system according to the eighth embodiment, which is constituted as explained above, will be explained.

The surrounding environment detector 5 detects the surrounding environment of the vehicle and outputs the detection signal (see the step S1 shown in FIG. 17). The external signal input unit 60 inputs the detection signal and outputs the detection signal as a processing signal (see the step S2 shown in FIG. 17). The surrounding environment determination unit 61 inputs the processing signal and outputs the determination signal (see the step S3 shown in FIG. 17). The data selection unit 62 inputs the determination signal and selects the optimum light distribution data for the surrounding environment of the vehicle (see the step S4 shown in FIG. 17). The control signal output unit 63 outputs the control signal based on the selected light distribution data (see the step S5 shown in FIG. 17).

If the controller 6 outputs the control signal to the reflection digital light deflector 2, the reflection digital light deflector 2 controls the ON and OFF switching of the many micro mirror elements 25 (see FIG. 5 to FIG. 8) based on the control signal, i.e., the digital data on the optimum light distribution pattern for the surrounding environment of the vehicle. The digital lighting system according to the eighth embodiment can thereby automatically select the optimum light distribution pattern P5 for the surrounding environment of the vehicle and illuminate the road surface and the like in the selected optimum light distribution pattern for the surrounding environment of the vehicle.

In the digital lighting system according to the eighth embodiment, manufacturing irregularities of the discharge lamp 10 and the reflector 11 of the optical engine are present and the discharge lamp 10 deteriorates with the passage of time. For these reasons, an error (a deviation) may possibly occur between an input light intensity of the incident light L3 emitted from the optical engine 1 and incident on each of the micro mirror elements 25 of the reflection digital light deflector 2 and reference bits of the incident light L3 emitted from the optical engine 1 and incident on each micro mirror element 25 of the reflection digital light deflector 2. As a result, a desired, appropriate output distribution from the reflection digital light deflector 2 cannot be obtained. That is, the predetermined light distribution pattern P5 is not irradiated from the reflection digital light deflector 2 on the road surface and the like.

Considering these disadvantages, the digital lighting system according to the eighth embodiment makes the initialization correction to the manufacturing irregularities of the optical engine and the error of the light distribution pattern P5 irradiated from the reflection digital light deflector 2. Namely, the digital lighting system according to the eighth embodiment initializes the light distribution pattern P5. A timing at which this initialization is performed can be arbitrarily set. For example, the initialization is performed when the digital lighting system according to the eighth embodiment is actuated, when the system is finished, or the optical engine 1 is stabilized (about ten minutes after start), or the like.

The reflection digital light deflector 2 is set in the state in which no current is carried and the discharge lamp 10 is turned on. If so, the light L3 from the optical engine 1 is incident on the micro mirror elements 25 of the reflection digital light deflector 2 in the state in which no current is carried, and reflected by the micro mirror elements 25. The optical semiconductor devices 92 receive the reflected light L6 in the one-by-one correspondence to the micro mirror elements 25.

The optical semiconductor devices 92 of the optical semiconductor device panel 91 convert the received reflected light L6 from the micro mirror elements 25 in the one-by-one correspondence to the received light data by photoelectric conversion, and convert the received light data to the measurement data D2 by A/D conversion, and output the measurement data D2 to the comparison and arithmetic device 68 in the controller 6.

Figure 74:
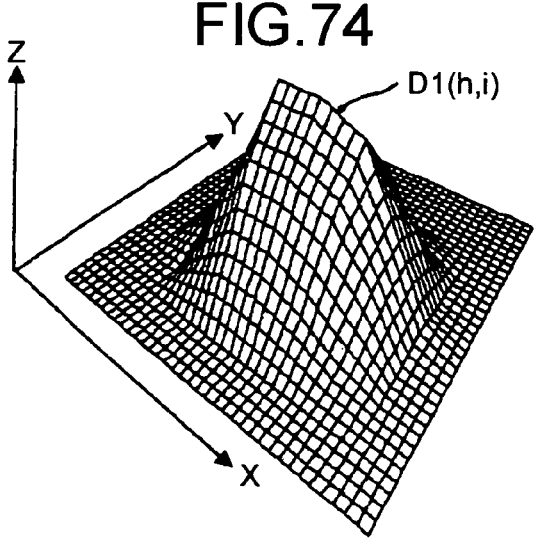
FIG. 74 is a plot of reference bit data of the digital lighting system according to the eighth embodiment.
Figure 75:
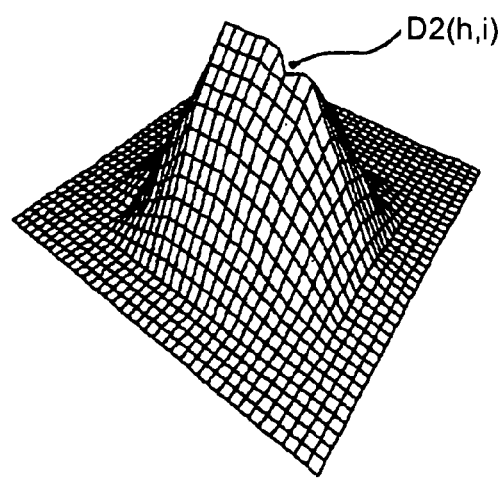
FIG. 75 is a plot of measured bit data of the digital lighting system according to the eighth embodiment.
Figure 76:
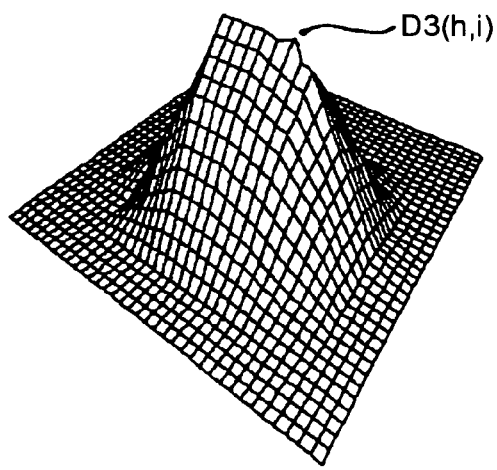
FIG. 76 is a plot of corrected bit data of the digital lighting system according to the eighth embodiment.

The comparison and arithmetic device 68 compares the reference data D1 stored in the buffer storage unit 67 and shown in FIG. 74 with the measurement data D2 received from the optical semiconductor device panel 91 shown in FIG. 75 to calculate an error and outputs the corrected data D3 obtained by correcting the reference data D1 by as much as the error and shown in FIG. 76 to the storage unit 4.

It is assumed herein that there is a minus (−) error (or a plus (+) error) between the bit data in (h, i) (the reference bit of the reference data D1 allocated relative to the input light intensity of the incident light L3 emitted from the optical engine 1 and incident on each micro mirror element 25 of the reflection digital light deflector 2) in the reference data D1 shown in FIG. 74 and bit data in (h, i) (the input light intensity of the incident light L3 emitted from the optical engine 1 and incident on each micro mirror element 25 of the reflection digital light deflector 2) in the measurement data D2 shown in FIG. 75. If so, the bit data in (h, i) in the reference data D1 shown in FIG. 74 is corrected by as much as the minus (−) error (or the plus (+) error). In other words, the bit data in (h, i) in the corrected data D3 shown in FIG. 76 is corrected by as much as the minus (−) error (or the plus (+) error).

The corrected data D3 is saved and updated by the storage unit 4. The controller 6 controls the reflection digital light deflector 2 based on the corrected data D3. That is, the corrected data D3 is fed back to the control over the reflection digital light deflector 2.

The advantages of the digital lighting system according to the eighth embodiment, which is constituted as explained above, will be explained.

The digital lighting system according to the eighth embodiment can make the initialization correction to the manufacturing irregularities of the optical engine 1 and the error of the light distribution pattern P5 irradiated from the reflection digital light deflector 2 following the deterioration of the discharge lamp 10. That is, the digital lighting system according to the eighth embodiment has the function of initializing the light distribution pattern P5.

Further, the digital lighting system according to the eighth embodiment can automatically select the optimum predetermined light distribution pattern P5 for the surrounding environment of the vehicle and constantly illuminate the road surface and the like in the selected, optimum predetermined light distribution pattern P5 for the surrounding environment of the vehicle. Therefore, the digital lighting system according to the eighth embodiment is preferable for traffic safety.

Figure 77:
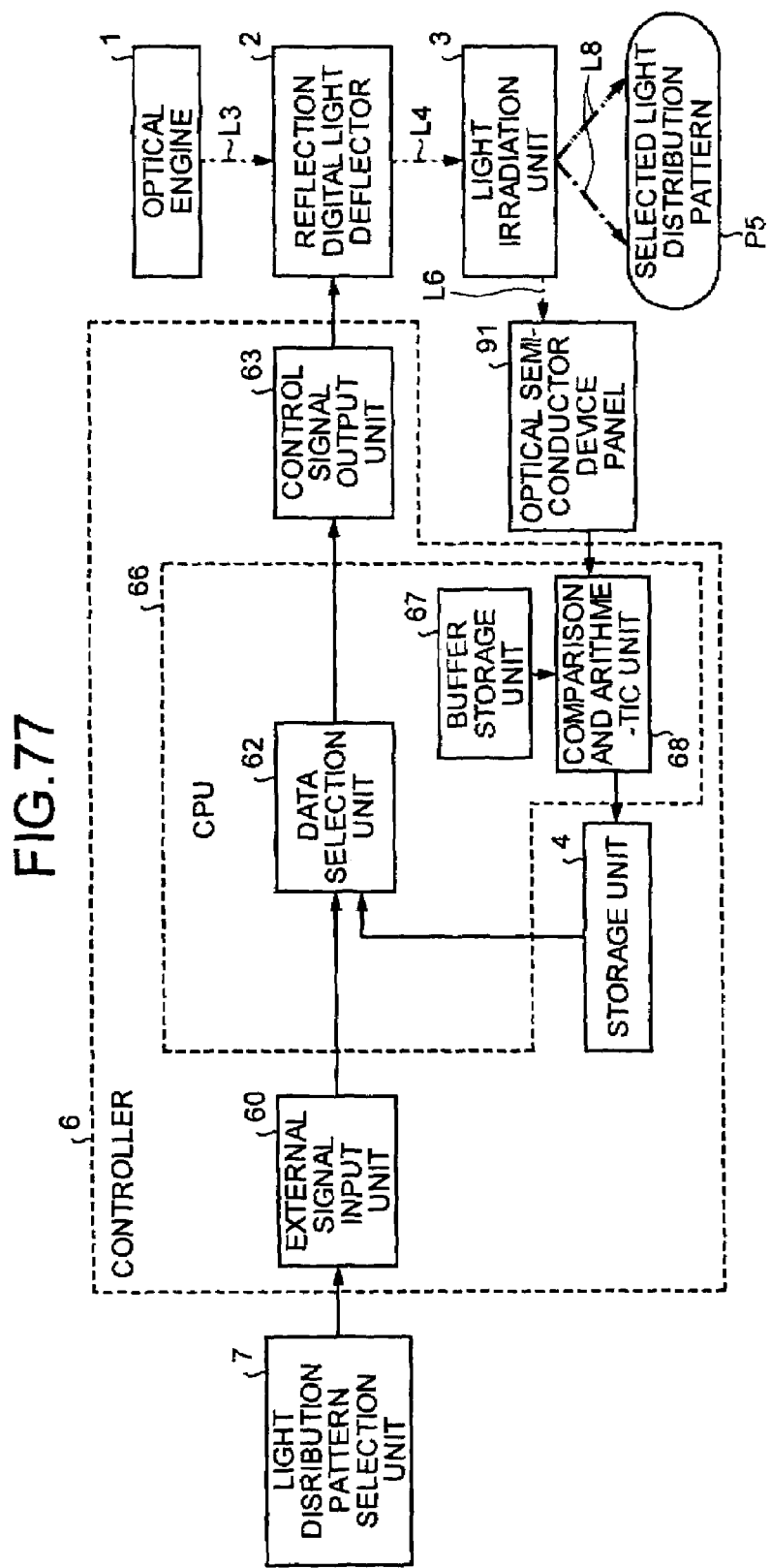
FIG. 77 is a block diagram of a digital lighting apparatus according to a ninth embodiment of the present invention.

FIG. 77 is a block diagram of a digital lighting apparatus according to a ninth embodiment of the present invention. The same reference symbols as those in FIG. 1 to FIG. 76 denote the same constituent elements.

The digital lighting system according to the eighth embodiment automatically selects the optimum predetermined light distribution pattern P5 (see FIG. 72) for the surrounding environment of the vehicle and outputs the road surface and the like in the selected the optimum predetermined light distribution pattern P5 for the surrounding environment of the vehicle. The vehicle digital lighting apparatus in this ninth embodiment, by contrast, selects the predetermined light distribution pattern P7 and illuminates the road surface and the like in the selected predetermined light distribution pattern P7.

Namely, the digital lighting system according to the eighth embodiment automatically selects the optimum predetermined light distribution pattern P5 for the surrounding environment of the vehicle using the surrounding environment detector 5 (see FIG. 72), the surrounding environment determination unit 61 (see FIG. 72), and the like. The vehicle digital lighting apparatus in the ninth embodiment, by contrast, allows the driver to select the predetermined light distribution pattern P7 using the light distribution pattern selection unit 7.

The light distribution pattern selection unit 7 is connected to the external signal input unit 60 in the controller 6 and the external signal input unit 60 is connected to the data selection unit 62 in the CPU 66. The light distribution pattern selection unit 7 allows the driver to select the light distribution pattern for illuminating the road surface and the like using the light distribution pattern selection unit 7 and thereby outputs the selection signal based on driver's selection to the external signal input unit 60 in the controller 6.

The functions and advantages of the vehicle digital lighting apparatus in the ninth embodiment, which is constituted as explained above, will be explained.

The driver selects the light distribution pattern for illuminating the road surface and the like using the light distribution pattern selection unit 7. If so, the light distribution pattern selection unit 7 outputs the selection signal based on driver's selection to the external signal input unit 60. The interface circuit of the external signal input unit 60 inputs the external signal such as the selection signal from the light distribution pattern selection unit 7, processes the external signal so that the controller 6 can handle the signal, and outputs the processing signal to the data selection unit 62.

The data selection unit 62 selects digital data on the driver's selected light distribution pattern from among the pieces of digital data on the light distribution patterns stored in the storage unit 4 based on the selection signal from the light distribution pattern selection unit 7 through the external signal input unit 60.

The driver circuit of the control signal output unit 63 outputs the control signal for individually, digitally controlling switchover of the tilt angles of the minimum error elements 25 (see FIG. 5 to FIG. 8) to the reflection digital light deflector 2 based on the digital data on the light distribution pattern selected by the data selection unit 62.

If the controller 6 outputs the control signal to the reflection digital light deflector 2, the reflection digital light deflector 2 controls ON and OFF switching of the many micro mirror elements 25 based on the control signal, i.e., the digital data on the driver's selected light distribution pattern. The vehicle digital lighting apparatus in the ninth embodiment can thereby illuminate the road surface and the like in the light distribution pattern P7 selected by the driver.

The vehicle digital lighting apparatus in the ninth embodiment, similarly to the digital lighting system according to the eighth embodiment, makes the initialization correction to the error of the light distribution pattern P7 irradiated from the reflection digital light deflector 2. Namely, the vehicle digital lighting apparatus in the ninth embodiment can initialize the light distribution pattern P7.

The vehicle digital lighting apparatus in the ninth embodiment can attain the functions and advantages substantially equal to those of the digital lighting system according to the eighth embodiment.

The vehicle digital lighting apparatus in the ninth embodiment particularly allows the driver to conduct the functions of the surrounding environment detector Sand the surrounding environment determination unit 61 of the digital lighting system according to the fifth embodiment. Therefore, the vehicle digital lighting apparatus can dispense with the surrounding environment detector 5 and the surrounding environment determination unit 61 and manufacturing cost can be reduced, accordingly.

In each of the digital lighting system and the vehicle digital lighting apparatus according to the present invention, the light distribution pattern (the light distribution pattern P5 optimum for the surrounding environment of the vehicle or the light distribution pattern P7 selected by the driver) irradiated from the light irradiation unit 3 to the road surface and the like is controlled to be formed based on the light distribution data (digital data on the light distribution pattern) stored in the storage unit 4 or the buffer storage unit 64. AN example of control over light distribution patterns other than those based on the light distribution data shown in FIG. 12 and FIG. 13 will be explained. It is noted that the light distribution patterns according to the present invention are obtained by using the logic of an adaptive front lighting system (AFS) as it is.

Figure 14:
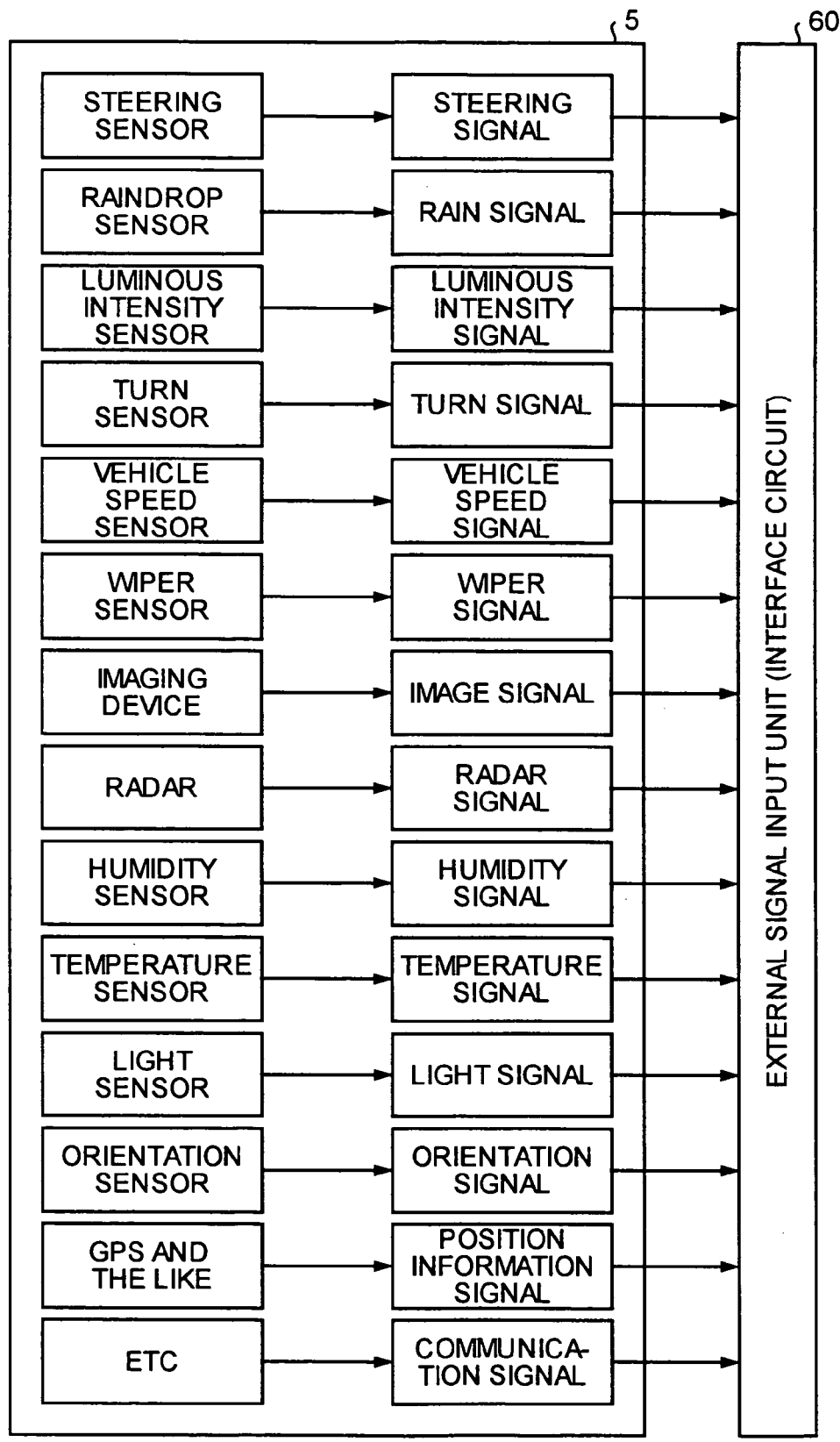
FIG. 14 is a block diagram of a surrounding environment detector of the digital lighting system according to the first embodiment.

In the auto-leveling of the change of the orientation of the vehicle in the interrupt routine, each of the cut lines in "2. light distribution pattern data for general road, straight road, and vehicle passing by the other vehicle", "3. light distribution pattern data for urban district, straight road, and vehicle passing by the other vehicle", "4. light distribution pattern data for highway, straight road, and vehicle passing by the other vehicle", and "5. light distribution pattern data for highway, curved road, and vehicle passing by the other vehicle" shown in FIG. 12 is automatically, vertically moved by the determination of the orientation determination unit shown in FIG. 15 based on the orientation signal from the orientation sensor shown in FIG. 14. Namely, the orientation determination unit determines that the orientation of the vehicle changes based on the orientation signal from the orientation sensor. The data selection unit 62 selects the light distribution data including the vertical cut line CL optimum for the orientation of the vehicle from among the pieces of light distribution data including vertical cut lines CL different from one another and stored in the storage unit 4. The light distribution pattern including the optimum cut line CL for the orientation of the vehicle can be automatically obtained. Alternatively, the driver may select the light distribution data including the optimum vertical cut line CL for the orientation of the vehicle using the light distribution patter selection unit 7. Since the cut line CL can be vertically moved in response to the change of the orientation of the vehicle, the digital lighting system or device according to the present invention is preferable for traffic safety.

The light distribution pattern for the vehicle passing by the other vehicle may be controlled based on the light distribution data including the obscured cut line CL in each of "2. light distribution pattern data for general road, straight road, and vehicle passing by the other vehicle", "3. light distribution pattern data for urban district, straight road, and vehicle passing by the other vehicle", "4. light distribution pattern data for highway, straight road, and vehicle passing by the other vehicle", and "5. light distribution pattern data for highway, curved road, and vehicle passing by the other vehicle" so that the light intensity (luminous intensity) gradually changes from a dark part to a bright part. By thus obscuring the cut line CL, a light change in the cut line CL natural to driver's eyes can be obtained. This can relieve the fatigue of the driver's eyes, which is preferable for traffic safety.

As for the light distribution pattern for the running vehicle, the light distribution pattern may be controlled by camera sensing based on the light distribution data so as to remove a part of the light corresponding to the driver's eyes or face of the oncoming vehicle and to move the non-lighting portion along a locus of the driver's eyes or face in accordance with a temporal change in the non-lighting portion. If the light is to be removed, the color is transformed to the full-black color or a gray color at an arbitrary gradation is given relative to the full-white color. As can be seen, even if the light distribution pattern for the running vehicle is used, the vehicle does not cast any glare at driver of the oncoming vehicle and pedestrians, which is preferable for traffic safety.

As for the light distribution pattern for the vehicle passing by the other vehicle, if a pedestrian is found, the light distribution pattern may be controlled by the camera sensing based on the light distribution data so as to raise the cut line in the pattern. Further, the light distribution pattern for the vehicle passing by the other vehicle may be controlled to emit a spot light that illuminate only the pedestrian. As can be seen, even if the light distribution pattern for the vehicle passing by the other vehicle is used, the driver of the vehicle can promptly visually recognize the pedestrian, which is preferable for traffic safety.

The light distribution pattern may be controlled based on the light distribution data according to a turning angle of the steering wheel so that a left end part or a right end part of the predetermined light distribution pattern widens outward. Further, the light distribution pattern may be controlled based on the light distribution data so that the left end part or the right end part of the predetermined light distribution pattern is used as a winker or a turn signal lamp. In this control, one light distribution pattern is controlled or three light distribution patterns for a central part, the left end part, and the right end part, respectively are controlled.

If it is determined by the camera sensing that the weather is bad, the light distribution pattern may be controlled based on the light distribution data so that if it rains, for example, a locally bright part of the light distribution pattern is changed to a dark part, if it is foggy, the sharp cut line CL can be obtained, and if it snows, the light distribution pattern is made dark against reflections.

The light distribution pattern may be controlled based on the light distribution data so that a front part of the light distribution pattern turns bright white and a driver side thereof turns gray. By turning the front part of the light distribution pattern bright white and the driver side thereof gray, the driver turns his or her eyes upon the front white part, i.e., the progress direction of the vehicle, which is preferable for traffic safety. The light distribution pattern may be controlled by the camera sensing based on the light distribution data so that part of the light distribution pattern is irradiated on an overhead sign (OHS).

The driver can grasp the road condition such as a crossing, a tunnel, or a curved road, a few seconds before from the position information output from the GPS or the terrestrial station (e.g., the electronic reference point) and received by the GPS receiver (e.g., the car navigation system) and thereby switch over one light distribution pattern to the other pattern in advance, which is preferable for traffic safety.

The head lamp has been explained so far in the embodiments. However, the present invention can be also applied to the other lamp, e.g., a fog lamp, a turn signal lamp, a brake lamp (a brake flash lamp, in particular, capable of dealing with an instance in which the driver hits the brake and notifying the driver of the following vehicle that the drive hit the brake), or a combination thereof.

The vehicle digital lighting assemblies are respectively loaded on the left and the right in the front portion of the vehicle at predetermined intervals. Therefore, the left and right vehicle digital lighting assemblies emit different light distribution patterns. According to the present invention, the light distribution pattern may be constituted so that the predetermined light distribution pattern can be obtained by a combination of the left and right different light distribution patterns.

An aspect ratio of the micro mirror elements 25 of the reflection digital light deflector 2 is set at 720×480, 800×600, 1,024×768, or 1,280×1,024 in the embodiments. According to the present invention, an aspect ration suited for the light distribution patterns for the vehicle may be set.

The discharge lamp 10 is used as the light source of the optical engine in the embodiments. According to the present invention, the light source other than the discharge lamp 10, e.g., an incandescent electric lamp, a halogen lamp, a tungsten lamp, an LED, or an infrared LED may be used. Besides, the number of the light sources is not limited to one but a plurality of light sources may be used.

The layout of the optical engine 1 and the reflection digital light deflector 2 may be other than that shown in FIG. 2. If the vehicle is, for example, a motor-truck, the optical engine 1 and the reflection digital light deflector 2 may be arranged in an oblong layout. If the vehicle is a light vehicle, they may be arranged in a portrait layout. Namely, since the reflected light L4 finally reflected by the reflection digital light deflector 2 is digitally controlled, an analogous deviation of an intermediate light from the optical engine 1 to the reflection digital light deflector 2 is ignorable. Therefore, the optical engine 1 and the reflection digital light deflector 2 can be arranged longitudinally, laterally, upward, downward, or aslant according to the specifications of the vehicle. The optical engine 1 and the reflection digital light deflector 2 may be arranged near an air duct that has a cooling effect.

The collimator lens 12 is interposed between the reflector 11 of the optical engine 1 and the reflection digital light deflector 2. According to the present invention, the reflected light from the reflector 11 may be directly incident on the reflection digital light deflector 2. If so, the digital lighting system or device according to the present invention is advantageously free from color aberrations or light irregularities caused by the lenses.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital lighting apparatus that illuminates a road surface with a predetermined light distribution pattern, comprising:
    an optical engine that includes a light source;
    a reflection type digital light deflector that has a plurality of micro mirror elements arranged to be respectively tiltable, that digitally switches a tilt angle of each of the micro mirror elements between a first tilt angle and a second tilt angle to switch a reflection direction of a light from the optical engine between a first reflection direction as an ON state and a second reflection direction as an OFF state;
    a light irradiation unit that irradiates an ON state light reflected from the reflection type digital light deflector on a road surface;
    a storage unit that stores digital data of a plurality of light distribution patterns; and
    a controller that selects a specific digital data corresponding to the predetermined light distribution pattern from among the digital data stored in the storage unit based on an input signal, and that digitally switches a tilt angle of each of the micro mirror elements based on the digital data selected.

2. The digital lighting apparatus according to claim 1, wherein
    each of the digital data is created by computer simulation in designing a light distribution of the digital lighting apparatus, including a plurality of binary bits with which a plurality of light intensity gradations are obtained, and
    each of the light intensity gradations corresponds to a state of the micro mirror elements, respectively.

3. The digital lighting apparatus according to claim 1, further comprising:
    a light distribution pattern selection unit that allows a driver to select a light distribution pattern, and that outputs a selection signal corresponding to the light distribution pattern selected to the controller, wherein
    the input signal to the controller is the selection signal from the light distribution pattern selection unit, and
    a light distribution pattern irradiated from the light irradiation unit is the light distribution pattern selected by the driver.

4. The digital lighting apparatus according to claim 3, wherein the controller includes
    an external signal input unit that inputs an external signal including the selection signal, and that outputs the external signal as a processing signal;
    a data selection unit that selects the specific digital data based on the processing signal; and
    a control signal output unit that outputs, to the reflection digital light deflector, a control signal for digitally switching the tilt angle of each of the micro mirror elements based on the specific digital data.

5. The digital lighting apparatus according to claim 1, further comprising:
    a surrounding environment detector that detects an environment surrounding a vehicle, and that outputs a detection signal, wherein
    the input signal to the controller is the detection signal from the surrounding environment detector to determine the environment surrounding the vehicle, and
    the light distribution pattern irradiated from the light irradiation unit is an optimum light distribution pattern that is selected by the controller based on the environment surrounding the vehicle determined.

6. The digital lighting apparatus according to claim 5, wherein the surrounding environment detector includes at least one of
    a steering sensor that detects one of or both of an angle and a speed of rotating a steering wheel, and that outputs a steering signal;
    a raindrop sensor that detects a rain fall, and that outputs a rain signal;
    a luminous intensity sensor that detects a brightness of surroundings of the vehicle, and that outputs a luminous intensity signal;
    a turn sensor that detects an ON signal of a turn signal switch and that outputs a turn signal;
    a vehicle speed sensor that detects a speed of the vehicle, and that outputs a vehicle speed signal;
    a wiper sensor that detects an ON signal of a wiper switch and that outputs a wiper signal;
    an imaging device that takes an image of information surrounding the vehicle, and that outputs an image signal;
    a radar that detects a reflected wave from a target object in surroundings of the vehicle, and that outputs a radar signal;
    a humidity sensor that detects a humidity of the surroundings of the vehicle, and that outputs a humidity signal;
    a temperature sensor that detects a temperature of the surroundings of the vehicle, and that outputs a temperature signal;
    a light sensor that detects an ON signal of a light switch, and that outputs a light signal;
    an orientation sensor that detects an orientation of the vehicle, and that outputs an orientation signal;
    a global positioning system that outputs a position information signal;
    an electronic toll collection unit that outputs a communication signal when the vehicle enters a highway.

7. The digital lighting apparatus according to claim 5, wherein the controller includes
    an external signal input unit that inputs an external signal including the selection signal, and that outputs the external signal as a processing signal;
    a surrounding environment determination unit that determines the environment surrounding the vehicle based on the processing signal, and that outputs a determination signal;
    a data selection unit that selects, based on the determination signal, a digital data corresponding to a light distribution pattern optimum for the environment from among the digital data stored in the storage unit; and
    a control signal output unit that outputs, to the reflection digital light deflector, a control signal for digitally switching the tilt angle of each of the micro mirror elements based on the digital data selected by the data selection unit.

8. The digital lighting apparatus according to claim 7, wherein the surrounding environment determination unit includes at least one of:
    a vehicle determination unit that determines whether an oncoming vehicle or a preceding vehicle is present based on an image signal and that outputs an oncoming vehicle or preceding vehicle presence signal or an oncoming vehicle or preceding vehicle absence signal;
    a road determination unit that determines whether a road is a highway or a general road based on at least one of the image signal, a vehicle speed signal, a position information signal, and a communication signal, and that outputs a highway signal or a general road signal;

an urban district determination unit that determines whether the vehicle is in an urban district based on at least one of the image signal, a luminous intensity signal, and a position information signal, and that outputs an urban signal indicating that the vehicle is in the urban district or a non-urban signal indicating that the vehicle is not in the urban district;

a crossing determination unit that determines whether the vehicle is at a crossing based on at least one of the image signal, a turn signal, and the position information signal, and that outputs a signal indicating that the vehicle is at the crossing or a signal indicating that the vehicle is not at the crossing;

a straight road and curved road determination unit that determines whether a road is straight or curved based on at least one of a steering signal, the vehicle speed signal, and the position information signal, and that outputs a straight signal or a curve signal;

a rain determination unit that determines whether it rains based on a rain signal and a wiper signal, and that outputs a signal indicating that it rains or a signal indicating that it does not rain;

a fog determination unit that determines whether it is foggy based on at least one of the image signal, a radar signal, and a humidity signal and a temperature signal, and that outputs a signal indicating that it is foggy or a signal indicating that it is not foggy;

a snow determination unit that determines whether it snows based on at least one of the image signal, the wiper signal, and the temperature signal, and that outputs a signal indicating that it snows or a signal indicating that it does not snow;

an orientation determination unit that determines whether an orientation of the vehicle changes based on an orientation signal, and that outputs an orientation change signal according to a variation of the orientation of the vehicle; and a wait-at-stoplight determination unit that determines whether the vehicle is waiting at a stoplight based on one of or all of the vehicle speed signal, the position information signal, and the image signal, and that outputs a signal indicating that the vehicle is waiting at the stoplight the signal or a signal indicating that the vehicle is not waiting at stoplight.

9. The digital lighting apparatus according to claim 8, wherein the surrounding environment determination unit includes a cancellation unit that cancels a determination of one of the oncoming vehicle and preceding vehicle determination unit, the highway and general road determination unit, the urban district determination unit, the crossing determination unit, the straight road and curved road determination unit, the rain determination unit, the fog determination unit, the snow determination unit, the orientation determination unit, and the wait-at-stoplight determination unit.

10. The digital lighting apparatus according to claim 9, wherein the cancellation unit includes a storage unit that stores a content of the cancelled determination of one of the determination units.

11. The digital lighting apparatus according to claim 8, wherein the data selection unit includes a main data selection unit that selects the digital data on the optimum light distribution pattern for the surrounding environment of the vehicle from among the pieces of the digital data on the light distribution patterns stored in the storage unit based on the determination signal from at least one of the oncoming vehicle and preceding vehicle determination unit, the highway and general road determination unit, the urban district determination unit, the crossing determination unit, the straight road and curved road determination unit, the rain determination unit, the fog determination unit, the snow determination unit, the orientation determination unit, and the wait-at-stoplight determination unit; and an interrupt data selection unit that halts and interrupts selection of the main data selection unit and that selects the digital data on the optimum light distribution pattern for one of the vehicle waiting at a stoplight and the orientation of the vehicle from among the pieces of the digital data on the light distribution patterns stored in the storage unit based on the determination signal from one of the wait-at-stoplight determination unit and the orientation determination unit in the surrounding environment determination unit.

12. The digital lighting apparatus according to claim 1, wherein the storage unit is a buffer storage unit that reads the pieces of the digital data on the light distribution patterns stored in a storage medium in groups according to regions and countries through a reader and that stores the read digital data.

13. The digital lighting apparatus according to claim 1, wherein the storage unit stores pieces of dimming control digital data for decreasing or increasing a light intensity of the predetermined light distribution pattern besides the pieces of the digital data on the light distribution patterns, and the controller selects predetermined dimming control digital data from among the pieces of the dimming control digital data stored in the storage unit based on the input signal, and that digitally, individually controls the switchover of the tilt angle of the each micro mirror element based on the selected, predetermined dimming control digital data.

14. The digital lighting apparatus according to claim 13, further comprising:

a light distribution pattern and dimming control selection unit that allows a driver to select the predetermined light distribution pattern or a predetermined dimming-controlled light, and that outputs a selection signal based on driver's selection, wherein the input signal input to the controller is the selection signal input from the light distribution pattern and dimming control device, and the light distribution pattern irradiated from the light irradiation unit is the light distribution pattern selected by the driver using the light distribution pattern and dimming control selection unit.

15. The digital lighting apparatus according to claim 13, further comprising:

a surrounding environment detector that detects a surrounding environment of a vehicle and that outputs a detection signal, wherein the input signal input to the controller is the detection signal input from the surrounding environment detector so that the controller determines the surrounding environment of the vehicle, and the light distribution pattern irradiated from the light irradiation unit is the light distribution pattern that is selected by the controller by determining the surrounding environment of the vehicle based on the detection signal and that is optimum for the surrounding environment of the vehicle.

16. The digital lighting apparatus according to claim 13, wherein
   each piece of the dimming-control data is digital data comprising a plurality of binary bits with which a plurality of light intensity gradations can be obtained, and
   dimming control for decreasing or increasing the light-intensity of the predetermined light distribution pattern based on one of the pieces of the dimming-control digital data is binary pulse width modulation and exerted by decreasing or increasing a duty ratio of an ON signal pulse width or a duty ratio of an OFF signal pulse width.

17. The digital lighting apparatus according to claim 13, wherein dimming control for the vehicle waiting at a stoplight is exerted by decreasing the light intensity of the predetermined light distribution pattern to a predetermined light intensity since the vehicle starts waiting at a stoplight until predetermined light intensity decrease time or by increasing the predetermined light intensity to the light intensity of the predetermined light distribution pattern since the vehicle finishes waiting at a stoplight until predetermined light intensity increase time.

18. The digital lighting apparatus according to claim 13, wherein dimming control for daytime and nighttime is exerted by decreasing the light intensity of the predetermined light distribution pattern at the nighttime to a predetermined light intensity, at the daytime or by increasing the light intensity of the predetermined light distribution pattern at the daytime to the predetermined light intensity, at the nighttime.

19. The digital lighting apparatus according to claim 13, wherein dimming control for a general road and a highway and the dimming control for an urban district and suburbs are exerted by increasing the light intensity of the predetermined light distribution pattern for the general road or the urban district to a predetermined light intensity, on the highway or in the suburbs, or by decreasing the light intensity of the predetermined light distribution pattern for the highway or the suburbs to the predetermined light intensity, on the general road or in the urban district.

20. The digital lighting apparatus according to claim 1, wherein
   the pieces of the digital data on the light distribution patterns stored in the storage unit are stored in groups according to regions and countries, and
   the controller identifies a region and a country where the vehicle is running based on the input signal, accesses the storage unit, obtains the pieces of the digital data on the light distribution patterns for the region and the country where the vehicle is running, selects the digital data on the predetermined light distribution pattern from among the pieces of the digital data on the light distribution patterns obtained based on the input signal, and digitally, individually controls the switch over of the tilt angle of each of the micro mirror elements based on the selected digital data on the predetermined light distribution pattern.

21. The digital lighting apparatus according to claim 20, wherein the input signal for identifying the region and the country where the vehicle is running is a position information signal input from a global positioning system.

22. The digital lighting apparatus according to claim 1, further comprising:
   a data change device that can change the pieces of the digital data on the light distribution patterns stored in the storage unit.

23. The digital lighting apparatus according to claim 22, wherein the data change device comprises a storage unit that stores the changed digital data on the light distribution patterns.

24. The digital lighting apparatus according to claim 1, further comprising:
   a display unit that displays the selected digital data on the predetermined light distribution pattern to image data and that displays the image data as an image.

25. The digital lighting apparatus according to claim 1, wherein
   each of the micro mirror elements of the reflection type digital light deflector is digitally switched over between the first tilt angle and the second tilt angle if the reflection digital light deflector is in a neutral state in which no current is carried, and
   the digital lighting apparatus further comprises a low beam irradiation unit that irradiates the reflected light from the reflection digital light deflector in the state in which no current is carried on the road surface in the light distribution pattern for the vehicle passing by the other vehicle.

26. The digital lighting apparatus according to claim 25, further comprising:
   a failure detection and display unit that detects the reflected light from the reflection digital light deflector in the state in which no current is carried and that displays that a failure occurs to the digital lighting apparatus.

27. The digital lighting apparatus according to claim 25, wherein
   the low beam irradiation unit comprises a shield forms a cut off line in the light distribution pattern for the vehicle passing by the other vehicle,
   the digital lighting apparatus further comprises a failure detection and display unit that detects the reflected light from the reflection digital light deflector in the state in which no current is carried and that displays that a failure occurs to the digital lighting apparatus, and
   the failure detection and display unit is arranged near the reflection digital light deflector relative to the shield, and comprises an optical sensor that detects a part of a light cut off by the shield in the reflected light from the reflection digital light deflector in the state in which no current is carried.

28. The digital lighting apparatus according to claim 1, further comprising:
   an information display unit that allows the controller to control the reflection digital light deflector, that displays information using a contrast between the ON reflected light and an OFF reflected light from the reflection digital light deflector in the predetermined light distribution pattern for illuminating the road surface, through the light irradiation unit.

29. The digital lighting apparatus according to claim 28, further comprising:
   an information acquisition device that acquires surrounding information on a vehicle and that outputs the acquired information as an information signal, wherein
   the information display unit allows the controller to control the reflection digital light deflector, that displays the information using the contrast between the ON reflected light and the OFF reflected light from the reflection digital light deflector in the predetermined light distribution pattern for illuminating the road surface, through the light irradiation unit, based on the information signal from the information acquisition device.

30. The digital lighting apparatus according to claim 28, wherein the information using the contrast is displayed in the predetermined light distribution pattern for illuminating the road surface and within about 17 meters ahead in a progress direction of a vehicle.

31. The digital lighting apparatus according to claim 28, wherein
the reflection digital light deflector and the light irradiation unit are loaded on each of a left and a right of the vehicle at predetermined intervals,
one of the left and the right reflection digital light deflectors irradiates and displays the information formed by the OFF reflected light in the predetermined light distribution pattern for illuminating the road surface through the light irradiation unit under control of the information display unit, and
the other one of the left and right reflection digital light deflectors irradiates and displays the predetermined light distribution pattern for illuminating the road surface so as to surround a non-lighting portion formed by the OFF reflected light by the information, through the light irradiation unit.

32. The digital lighting apparatus according to claim 28, further comprising:
an imaging device that images the information displayed in the light distribution pattern for the vehicle passing by the other vehicle and that outputs an image signal as an orientation signal, wherein
the controller vertically controls the reflection digital light deflector based on the orientation signal from the imaging device to thereby move a cut line in the light distribution pattern for the vehicle passing by the other vehicle.

33. The digital lighting apparatus according to claim 1, wherein
the pieces of the digital data on the light distribution patterns stored in the storage unit are the digital data on the light distribution pattern for a vehicle passing by the other vehicle and the digital data on the light distribution pattern for the vehicle that is running,
the controller digitally, individually controls the tilt angle of each of the micro mirror elements of the reflection digital light deflector based on the digital data on the light distribution pattern for the vehicle passing by the other vehicle and the digital data on the vehicle that is running stored in the storage unit,
the light distribution patterns for the ON reflected light from the reflection digital light deflector controlled by the controller and irradiated from the light irradiation unit are the light distribution pattern for the vehicle passing by the other vehicle and the light distribution pattern for the vehicle that is running, and
the digital lighting apparatus further comprises an OFF control light irradiation unit that irradiates the OFF reflected light from the reflection digital light deflector controlled by the controller, the OFF reflected light being a beam that does not form the light distribution pattern for the vehicle passing by the other vehicle, on the road surface in the predetermined light distribution pattern in a predetermined direction.

34. The digital lighting apparatus according to claim 33, wherein
the tilt angle of each of the micro mirror elements of the reflection digital light deflector is horizontal, and
the OFF control light irradiation unit irradiates the beam that is the OFF reflected light emitted upward or downward of the low beam that is an ON reflected light emitted from the reflection digital light deflector, on the road surface in the predetermined light distribution pattern in the predetermined direction.

35. The digital lighting apparatus according to claim 33, wherein
the tilt angle of each of the micro mirror elements of the reflection digital light deflector is vertical, and
the OFF control light irradiation unit irradiates the beam that is the OFF reflected light emitted left or right relative to the low beam that is the ON reflected light emitted from the reflection digital light deflector, on the road surface in the predetermined light distribution pattern in the predetermined direction.

36. The digital lighting apparatus according to claim 33, wherein
the tilt angle of each of the micro mirror elements of the reflection digital light deflector is inclined, and
the OFF control light irradiation unit irradiates the beam that is the OFF reflected light emitted aslant relative to the low beam that is the ON reflected light emitted from the reflection digital light deflector, on the road surface in the predetermined light distribution pattern in the predetermined direction.

37. The digital lighting apparatus according to claim 33, wherein the OFF control light irradiation unit irradiates the beam that is the OFF reflected light from the reflection digital light deflector on the road surface in the predetermined light distribution pattern in the predetermined direction as an infrared light.

38. The digital lighting apparatus according to claim 1, wherein
each of the micro mirror elements of the reflection digital light deflector is digitally switched over between the first tilt angle and the second tilt angle if the reflection digital light deflector is in a state in which no current is carried, and wherein
the digital lighting apparatus further comprises:
an optical semiconductor device panel comprising a plurality of optical semiconductor devices that receive the reflected light from the reflection digital light deflector in the state in which no current is carried in a one-by-one correspondence to the micro mirror elements;
a reference data storage unit that is provided in the controller and that stores reference data; and
a comparison and arithmetic device that is provided in the controller, that compares the reference data from the reference data storage unit with measurement data from the optical semiconductor device panel to calculate an error, and that outputs corrected data corrected by as much as the error to the storage unit.

39. A controller of a digital lighting apparatus, for illuminating a road surface in an optimum light distribution pattern for a surrounding environment of a vehicle by the digital lighting apparatus, the digital lighting apparatus comprising:
an optical engine that includes a light source;
a reflection digital light deflector that has a plurality of micro mirror elements respectively arranged to be tiltable, that digitally switches over a tilt angle of each of the micro mirror elements between a first tilt angle and a second tilt angle, and that thereby digitally switches over a reflection direction of a light from the optical engine between an ON or a first reflection direction and an OFF or a second reflection direction;

a storage unit that stores pieces of digital data on a plurality of light distribution patterns;

a surrounding environment detector that detects the surrounding environment of the vehicle and that outputs a detection signal; and a light irradiation unit that irradiates an ON reflected light emitted from the reflection digital light deflector and having the optimum light distribution pattern for the surrounding environment of the vehicle, on the road surface, the controller comprising:

an external signal input unit that inputs an external signal such as the selection signal from the surrounding environment detector and that outputs the input external signal as a processing signal;

a surrounding environment determination unit that determines the surrounding environment of the vehicle based on the processing signal from the external signal input unit and that outputs a determination signal;

a data selection unit that selects the digital data on the optimum light distribution pattern for the surrounding environment of the vehicle from among the pieces of the digital data on the light distribution patterns stored in the storage unit based on the determination signal from the surrounding environment determination unit; and a control signal output unit that outputs a control signal for digitally, individually controlling the switchover of the tilt angle of each of the micro mirror element based on the digital data on the light distribution pattern optimum for the surrounding environment of the vehicle and selected by the data selection unit, to the reflection digital light deflector.

40. The controller of the digital lighting apparatus according to claim 39, wherein each of the pieces of the digital data on the light distribution patterns is created by computer simulation in designing a light distribution of the digital lighting apparatus, digital data comprising a plurality of binary bits with which a plurality of light intensity gradations can be obtained, and digital data allocated one of the light intensity gradation corresponding to one of the micro mirror elements.

41. The controller of the digital lighting apparatus according to claim 39, wherein the surrounding environment determination unit includes at least one of an oncoming vehicle and preceding vehicle determination unit that determines whether an oncoming vehicle or a preceding vehicle is present based on an image signal obtained by imaging surrounding information on the vehicle by an imaging device of the surrounding environment detector and output from the imaging device, and that outputs an oncoming vehicle or preceding vehicle presence signal or an oncoming vehicle or preceding vehicle absence signal;

a highway and general road determination unit that determines whether a road is a highway or a general road based on at least one of the image signal, a vehicle speed signal obtained by detecting a vehicle speed by a vehicle speed sensor in the surrounding environment detector and output from the vehicle speed sensor, a position information signal output from a global positioning system in the surrounding environment detector, and a communication signal output from an electronic toll collection in the surrounding environment detector, and that outputs a highway signal or a general road signal;

an urban district determination unit that determines whether the vehicle is in an urban district based on at least one of the image signal, a luminous intensity signal obtained by detecting a brightness of surroundings of the vehicle by a luminous intensity sensor in the surrounding environment detector and output from the luminous intensity sensor, and the position information signal, and that outputs a signal indicating that the vehicle is in the urban district or a signal indicating that the vehicle is not in the urban district;

a crossing determination unit that determines whether the vehicle is at a crossing based on at least one of the image signal, a turn signal obtained by detecting an ON signal of a turn signal switch by a turn sensor in the surrounding environment detector and output from the turn sensor, and the position information signal, and that outputs a signal indicating that the vehicle is at the crossing or a signal indicating that the vehicle is not at the crossing;

a straight road and curved road determination unit that determines whether a road is straight or curved based on at least one of a steering signal obtained by detecting one of or both of a steering angle and a steering speed of a steering wheel by a steering sensor in the surrounding environment detector and output from the steering sensor and the vehicle speed signal, and the position information signal, and that outputs a straight signal or a curve signal;

a rain determination unit that determines whether it rains based on a rain signal obtained by detecting that it rains by a rain sensor in the surrounding environment detector and output from the rain sensor and a wiper signal obtained by detecting an ON signal of a wiper switch by a wiper sensor in the surrounding environment detector and output from the wiper sensor, and that outputs a signal indicating that it rains or a signal indicating that it does not rain;

a fog determination unit that determines whether it is foggy based on at least one of the image signal, a radar signal obtained by detecting a reflected wave from a target object in the surroundings of the vehicle by a radar in the surrounding environment detector and output from the radar, and a humidity signal obtained by detecting a humidity of the surroundings of the vehicle by a humidity sensor in the surrounding environment detector and output from the humidity sensor and a temperature signal obtained by detecting a temperature of the surroundings of the vehicle by a temperature sensor in the surrounding environment detector and output from the temperature sensor, and that outputs a signal indicating that it is foggy or a signal indicating that it is not foggy;

a snow determination unit that determines whether it snows based on at least one of the image signal, the wiper signal, and the temperature signal, and that outputs a signal indicating that it snows or a signal indicating that it does not snow;

an orientation determination unit that determines whether an orientation of the vehicle changes based on an orientation signal obtained by detecting an orientation of the vehicle by an orientation sensor in the surrounding environment detector ad output from the orientation sensor, and that outputs an orientation change signal according to a variation of the orientation of the vehicle; and a wait-at-stoplight determination unit that determines whether the vehicle is waiting at a stoplight based on one of or all of the vehicle speed signal, the position information signal, and the image signal, and that outputs a signal indicating that the vehicle is waiting at a stoplight or a signal indicating that the vehicle is not waiting at a stoplight.

42. The controller of the digital lighting apparatus according to claim 41, wherein the data selection unit includes
a main data selection unit that selects the digital data on the optimum light distribution pattern for the surrounding environment of the vehicle from among the pieces of the digital data on the light distribution patterns stored in the storage unit based on the determination signal from at least one of the oncoming vehicle and preceding vehicle determination unit, the highway and general road determination unit, the urban district determination unit, the crossing determination unit, the straight road and curved road determination unit, the rain determination unit, the fog determination unit, the snow determination unit, the orientation determination unit, and the wait-at-stoplight determination unit; and
an interrupt data selection unit that halts and interrupts selection of the main data selection unit and that selects the digital data on the optimum light distribution pattern for one of the vehicle waiting at a stoplight and the orientation of the vehicle from among the pieces of the digital data on the light distribution patterns stored in the storage unit based on the determination signal from one of the wait-at-stoplight determination unit and the orientation determination unit in the surrounding environment determination unit.

43. A control program of a digital lighting apparatus for illuminating a road surface in an optimum light distribution pattern for a surrounding environment of a vehicle by the digital lighting apparatus, the digital lighting apparatus comprising:
an optical engine that includes a light source;
a reflection digital light deflector that has a plurality of micro mirror elements respectively arranged to be tiltable, that digitally switches over a tilt angle of each of the micro mirror elements between a first tilt angle and a second tilt angle, and that thereby digitally switches over a reflection direction of a light from the optical engine between an ON or a first reflection direction and an OFF or a second reflection direction;
a light irradiation unit that irradiates an ON reflected light emitted from the reflection digital light deflector and having the optimum light distribution pattern for the surrounding environment of the vehicle, on the road surface;
a surrounding environment detector that detects the surrounding environment of the vehicle and that outputs a detection signal; and
a storage unit that stores pieces of digital data on a plurality of light distribution patterns, wherein
in order to illuminate the road surface in the optimum light distribution pattern for the surrounding environment of the vehicle, the control program makes a computer to execute:
allowing an external signal input unit to input an external signal such as the selection signal from the surrounding environment detector, and to output the input external signal as a processing signal;
allowing a surrounding environment determination unit to determine the surrounding environment of the vehicle based on the processing signal from the external signal input unit, and to output a determination signal;
allowing a data selection unit to select the digital data on the optimum light distribution pattern for the surrounding environment of the vehicle from among the pieces of the digital data on the light distribution patterns stored in the storage unit based on the determination signal from the surrounding environment determination unit; and
allowing a control signal output unit to output a control signal for digitally, individually controlling switchover of the tilt angle of each of the micro mirror element based on the digital data on the light distribution pattern that is optimum for the surrounding environment of the vehicle and that is selected by the data selection unit, to the reflection digital light deflector.

44. The control program of the digital lighting apparatus according to claim 43, wherein each of the pieces of the digital data on the light distribution patterns is created by computer simulation in designing a light distribution of the digital lighting apparatus, digital data comprising a plurality of binary bits with which a plurality of light intensity gradations can be obtained, and digital data allocated one of the light intensity gradation corresponding to one of the micro mirror elements.

45. The control program of the digital lighting apparatus according to claim 43, wherein the surrounding environment determination unit executes at least one of:
allowing an oncoming vehicle and preceding vehicle determination unit to determine whether an oncoming vehicle or a preceding vehicle is present based on an image signal obtained by imaging surrounding information on the vehicle by an imaging device of the surrounding environment detector and output from the imaging device, and to output an oncoming vehicle or preceding vehicle presence signal or an oncoming vehicle or preceding vehicle absence signal;
allowing a highway and general road determination unit to determine whether a road is a highway or a general road based on at least one of the image signal, a vehicle speed signal obtained by detecting a vehicle speed by a vehicle speed sensor in the surrounding environment detector and output from the vehicle speed sensor, a position information signal output from a global positioning system in the surrounding environment detector, and a communication signal output from an electronic toll collection in the surrounding environment detector, and to output a highway signal or a general road signal;
allowing an urban district determination unit to determine whether the vehicle is in an urban district based on at least one of the image signal, a luminous intensity signal obtained by detecting a brightness of surroundings of the vehicle by a luminous intensity sensor in the surrounding environment detector and output from the luminous intensity sensor, and the position information signal, and to output a signal indicating that the vehicle is in the urban district or a signal indicating that the vehicle is not in the urban district;
allowing a crossing determination unit to determine whether the vehicle is at a crossing based on at least one of the image signal, a turn signal obtained by detecting an ON signal of a turn signal switch by a turn sensor in the surrounding environment detector and output from the turn sensor, and the position information signal, and to output a signal indicating that the vehicle is at the crossing or a signal indicating that the vehicle is not at the crossing;
allowing a straight road and curved road determination unit to determine whether a road is straight or curved based on at least one of a steering signal obtained by detecting one of or both of a steering angle and a steering speed of a steering wheel by a steering sensor in the surrounding environment detector and output from the steering sensor and the vehicle speed signal, and the position information signal, and to output a straight signal or a curve signal;

allowing a rain determination unit to determine whether it rains based on a rain signal obtained by detecting that it rains by a rain sensor in the surrounding environment detector and output from the rain sensor and a wiper signal obtained by detecting an ON signal of a wiper switch by a wiper sensor in the surrounding environment detector and output from the wiper sensor, and that outputs a signal indicating that it rains or a signal indicating that it does not rain;

a fog determination unit that determines whether it is foggy based on at least one of the image signal, a radar signal obtained by detecting a reflected wave from a target object in the surroundings of the vehicle by a radar in the surrounding environment detector and output from the radar, and a humidity signal obtained by detecting a humidity of the surroundings of the vehicle by a humidity sensor in the surrounding environment detector and output from the humidity sensor and a temperature signal obtained by detecting a temperature of the surroundings of the vehicle by a temperature sensor in the surrounding environment detector and output from the temperature sensor, and to output a signal indicating that it is foggy or a signal indicating that it is not foggy;

allowing a snow determination unit to determine whether it snows based on at least one of the image signal, the wiper signal, and the temperature signal, and to output a signal indicating that it snows or a signal indicating that it does not snow;

allowing an orienteration determination unit to determine whether an orienteration of the vehicle changes based on an orienteration signal obtained by detecting an orienteration of the vehicle by an orienteration sensor in the surrounding environment detector ad output from the orienteration sensor, and to output an orienteration change signal according to a variation of the orienteration of the vehicle; and allowing a wait-at-stoplight determination unit to determine whether the vehicle is waiting at a stoplight based on one of or all of the vehicle speed signal, the position information signal, and the image signal, and to output a signal indicating that the vehicle is waiting at a stoplight or a signal indicating that the vehicle is not waiting at a stoplight.

46. The control program of the digital lighting apparatus according to claim 45, wherein the data selection unit executes a main data selection step of allowing a main data selection unit to select the digital data on the optimum light distribution pattern for the surrounding environment of the vehicle from among the pieces of the digital data on the light distribution patterns stored in the storage unit based on the determination signal from at least one of the oncoming vehicle and preceding vehicle determination unit, the highway and general road determination unit, the urban district determination unit, the crossing determination unit, the straight road and curved road determination unit, the rain determination unit, the fog determination unit, the snow determination unit, the orienteration determination unit, and the wait-at-stoplight determination unit; and an interrupt data selection step of allowing an interrupt data selection unit to halt and interrupt selection of the main data selection unit and to select the digital data on the optimum light distribution pattern for one of the vehicle waiting at a stoplight and the orienteration of the vehicle from among the pieces of the digital data on the light distribution patterns stored in the storage unit based on the determination signal from one of the wait-at-stoplight determination unit and the orienteration determination unit in the surrounding environment determination unit.

* * * * *